United States Patent
Cier et al.

(10) Patent No.: US 11,632,602 B2
(45) Date of Patent: *Apr. 18, 2023

(54) AUTOMATED DETERMINATION OF IMAGE ACQUISITION LOCATIONS IN BUILDING INTERIORS USING MULTIPLE DATA CAPTURE DEVICES

(71) Applicant: MFTB Holdco, Inc., Seattle, WA (US)

(72) Inventors: Sean P. Cier, Ravensdale, WA (US); Sing Bing Kang, Redmond, WA (US); Mitchell David Dawson, Redmond, WA (US); Pierre Moulon, Seattle, WA (US)

(73) Assignee: MFIB Holdco, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,465

(22) Filed: Jan. 11, 2022

(65) Prior Publication Data

US 2022/0224833 A1    Jul. 14, 2022

Related U.S. Application Data

(63) Continuation of application No. 17/150,958, filed on Jan. 15, 2021, now Pat. No. 11,252,329.

(Continued)

(51) Int. Cl.
*H04N 5/445* (2011.01)
*H04N 23/698* (2023.01)
(Continued)

(52) U.S. Cl.
CPC ............. *H04N 23/698* (2023.01); *G06T 7/50* (2017.01); *H04N 5/445* (2013.01); *H04N 23/53* (2023.01); *H04N 23/6812* (2023.01)

(58) Field of Classification Search
None
See application file for complete search history.

(56) References Cited

U.S. PATENT DOCUMENTS

| 5,140,352 A | 8/1992 | Moore et al. |
| 6,031,540 A | 2/2000 | Golin et al. |

(Continued)

FOREIGN PATENT DOCUMENTS

| EP | 2413097 A2 | 2/2012 |
| EP | 2505961 A2 | 10/2012 |

(Continued)

OTHER PUBLICATIONS

CubiCasa | From video to floor plan in under 5 minutes, retrieved on Mar. 26, 2019, from https://www.cubi.casa/, 6 pages.

(Continued)

*Primary Examiner* — Eileen M Adams
(74) *Attorney, Agent, or Firm* — VLP Law Group LLP; James A. D. White

(57) ABSTRACT

Techniques are described for using multiple devices to automatically determine the acquisition location of an image from a camera device, such as within a building interior and by using data from the multiple devices (e.g., visual data from the camera device's image, and additional data captured by a separate mobile computing device in the same area as the camera device), and for subsequently using determined image acquisition location information in one or more further automated manners. The image may be a panorama image or of another type, and the determined acquisition location for such an image may be at least a location on the building's floor plan—in addition, the automated image acquisition location determination may be further performed without having or using information from any depth sensors or other distance-measuring devices about (Continued)

distances from an image's acquisition location to walls or other objects in the surrounding building.

20 Claims, 21 Drawing Sheets

Related U.S. Application Data

(60) Provisional application No. 63/135,312, filed on Jan. 8, 2021.

(51) Int. Cl.
G06T 7/50 (2017.01)
H04N 23/53 (2023.01)
H04N 23/68 (2023.01)

(56) References Cited

U.S. PATENT DOCUMENTS

| | | |
|---|---|---|
| 6,141,034 A | 10/2000 | McCutchen |
| 6,317,166 B1 | 11/2001 | McCutchen |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,654,019 B2 | 11/2003 | Gilbert et al. |
| 6,683,608 B2 | 1/2004 | Golin et al. |
| 6,690,374 B2 | 2/2004 | Park et al. |
| 6,731,305 B1 | 5/2004 | Park et al. |
| 6,738,073 B2 | 5/2004 | Park et al. |
| 7,050,085 B1 | 5/2006 | Park et al. |
| 7,129,971 B2 | 10/2006 | McCutchen |
| 7,196,722 B2 | 3/2007 | White et al. |
| 7,525,567 B2 | 4/2009 | McCutchen |
| 7,620,909 B2 | 11/2009 | Park et al. |
| 7,627,235 B2 | 12/2009 | McCutchen et al. |
| 7,782,319 B2 | 8/2010 | Ghosh et al. |
| 7,791,638 B2 | 9/2010 | McCutchen |
| 7,909,241 B2 | 3/2011 | Stone et al. |
| 7,973,838 B2 | 7/2011 | McCutchen |
| 8,072,455 B2 | 12/2011 | Temesvari et al. |
| 8,094,182 B2 | 1/2012 | Park et al. |
| RE43,786 E | 11/2012 | Cooper |
| 8,463,020 B1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,654,180 B2 | 2/2014 | Zomet et al. |
| 8,666,815 B1 | 3/2014 | Chau |
| 8,699,005 B2 | 4/2014 | Likholyot |
| 8,705,892 B2 | 4/2014 | Aguilera et al. |
| RE44,924 E | 6/2014 | Cooper et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,953,871 B2 | 2/2015 | Zomet |
| 8,989,440 B2 | 3/2015 | Klusza et al. |
| 8,996,336 B2 | 3/2015 | Malka et al. |
| 9,021,947 B2 | 5/2015 | Landa |
| 9,026,947 B2 | 5/2015 | Lee et al. |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,324,190 B2 | 4/2016 | Bell et al. |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,489,775 B1 | 11/2016 | Bell et al. |
| 9,495,783 B1 | 11/2016 | Samarasekera et al. |
| 9,576,401 B2 | 2/2017 | Zomet |
| 9,619,933 B2 | 4/2017 | Spinella-Marno et al. |
| 9,635,252 B2 | 4/2017 | Accardo et al. |
| 9,641,702 B2 | 5/2017 | Bin-Nun et al. |
| 9,760,994 B1 | 9/2017 | Bell et al. |
| 9,786,097 B2 | 10/2017 | Bell et al. |
| 9,787,904 B2 | 10/2017 | Birkler et al. |
| 9,836,885 B1 | 12/2017 | Eraker et al. |
| 9,852,351 B2 | 12/2017 | Aguilera Perez et al. |
| 9,953,111 B2 | 4/2018 | Bell et al. |
| 9,953,430 B1 | 4/2018 | Zakhor |
| 9,990,760 B2 | 6/2018 | Aguilera Perez et al. |
| 9,990,767 B1 | 6/2018 | Sheffield et al. |
| 10,026,224 B2 | 7/2018 | Bell et al. |
| 10,030,979 B2 | 7/2018 | Bjorke et al. |
| 10,055,876 B2 | 8/2018 | Ford et al. |
| 10,068,344 B2 | 9/2018 | Jovanovic et al. |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B1 | 3/2019 | Sheffield et al. |
| 10,242,400 B1 | 3/2019 | Eraker et al. |
| 10,339,716 B1 | 7/2019 | Powers et al. |
| 10,366,531 B2 | 7/2019 | Sheffield |
| 10,395,435 B2 | 8/2019 | Powers et al. |
| 11,252,329 B1 * | 2/2022 | Cier ............... G06V 10/454 |
| 2006/0256109 A1 | 11/2006 | Acker et al. |
| 2007/0185681 A1 * | 8/2007 | McKitterick ........ G01C 21/16 |
| | | 702/159 |
| 2010/0232709 A1 | 9/2010 | Zhang et al. |
| 2012/0075414 A1 | 3/2012 | Park et al. |
| 2012/0293613 A1 | 11/2012 | Powers et al. |
| 2013/0050407 A1 | 2/2013 | Brinda et al. |
| 2013/0342533 A1 | 12/2013 | Bell et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 | 8/2014 | Dorum et al. |
| 2014/0267631 A1 | 9/2014 | Powers et al. |
| 2014/0307100 A1 | 10/2014 | Myllykoski et al. |
| 2014/0320674 A1 | 10/2014 | Kuang |
| 2015/0116691 A1 | 4/2015 | Likholyot |
| 2015/0189165 A1 | 7/2015 | Milosevski et al. |
| 2015/0262421 A1 | 9/2015 | Bell et al. |
| 2015/0269785 A1 | 9/2015 | Bell et al. |
| 2015/0302636 A1 | 10/2015 | Amoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0217225 A1 | 7/2016 | Bell et al. |
| 2016/0260250 A1 | 9/2016 | Jovanovic et al. |
| 2016/0286119 A1 | 9/2016 | Rondinelli |
| 2016/0300385 A1 | 10/2016 | Bell et al. |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |

(56) References Cited

U.S. PATENT DOCUMENTS

| | | | |
|---|---|---|---|
| 2017/0263050 A1 | 9/2017 | Ha et al. | |
| 2017/0324941 A1 | 11/2017 | Birkler | |
| 2017/0330273 A1 | 11/2017 | Holt et al. | |
| 2017/0337737 A1 | 11/2017 | Edwards et al. | |
| 2018/0007340 A1 | 1/2018 | Stachowski | |
| 2018/0025536 A1 | 1/2018 | Bell et al. | |
| 2018/0075168 A1 | 3/2018 | Tiwari et al. | |
| 2018/0096527 A1* | 4/2018 | Eraker | G06Q 30/0643 |
| 2018/0139431 A1 | 5/2018 | Simek et al. | |
| 2018/0143023 A1 | 5/2018 | Bjorke et al. | |
| 2018/0143756 A1 | 5/2018 | Mildrew et al. | |
| 2018/0144487 A1 | 5/2018 | Bell et al. | |
| 2018/0144535 A1 | 5/2018 | Ford et al. | |
| 2018/0144547 A1 | 5/2018 | Shakib et al. | |
| 2018/0144555 A1 | 5/2018 | Ford et al. | |
| 2018/0146121 A1 | 5/2018 | Hensler et al. | |
| 2018/0146193 A1 | 5/2018 | Safreed et al. | |
| 2018/0146212 A1 | 5/2018 | Hensler et al. | |
| 2018/0165871 A1 | 6/2018 | Mrowca | |
| 2018/0189565 A1* | 7/2018 | Lukierski | H04N 5/23238 |
| 2018/0203955 A1 | 7/2018 | Bell et al. | |
| 2018/0241985 A1 | 8/2018 | O'Keefe et al. | |
| 2018/0293793 A1 | 10/2018 | Bell et al. | |
| 2018/0300936 A1 | 10/2018 | Ford et al. | |
| 2018/0306588 A1 | 10/2018 | Bjorke et al. | |
| 2018/0348854 A1 | 12/2018 | Powers et al. | |
| 2018/0365496 A1 | 12/2018 | Hovden et al. | |
| 2019/0012833 A1 | 1/2019 | Eraker et al. | |
| 2019/0026956 A1 | 1/2019 | Gausebeck et al. | |
| 2019/0026957 A1 | 1/2019 | Gausebeck | |
| 2019/0026958 A1 | 1/2019 | Gausebeck et al. | |
| 2019/0035165 A1 | 1/2019 | Gausebeck | |
| 2019/0041972 A1 | 2/2019 | Bae | |
| 2019/0050137 A1 | 2/2019 | Mildrew et al. | |
| 2019/0051050 A1 | 2/2019 | Bell et al. | |
| 2019/0051054 A1 | 2/2019 | Jovanovic et al. | |
| 2019/0087067 A1 | 3/2019 | Hovden et al. | |
| 2019/0122422 A1 | 4/2019 | Sheffield et al. | |
| 2019/0164335 A1 | 5/2019 | Sheffield et al. | |
| 2019/0180104 A1 | 6/2019 | Sheffield et al. | |
| 2019/0251645 A1 | 8/2019 | Winans | |
| 2019/0287164 A1 | 9/2019 | Eraker et al. | |
| 2021/0073449 A1* | 3/2021 | Segev | G06F 30/20 |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016154306 A1 | 9/2016 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |

OTHER PUBLICATIONS

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

Guide: 3D Virtual Tours, retrieved on Mar. 26, 2019, from https://goiguide.com/, 6 pages.

immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

Insidemaps, retrieved on Mar. 27, 2019, from https://www.insidemaps.com/, 7 pages.

Staging | Augmented & Virtual Reality Platform for Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "How to Make a 3-D Model of Your Home Renovation Vision," in The New York Times, Feb. 13, 2019, retrieved Mar. 28, 2019, 6 pages.

Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.

Immersive 3D for the Real World, retrieved from https://matterport.com/, on Mar. 27, 2017, 5 pages.

Learn About Our Complete 3D System, retrieved from https://matterport.com/how-it-works/, on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.

Tango (platform), Wikipedia, retrieved from https://en.wikipedia.org/wiki/Tango_(platform), on Jun. 12, 2018, 5 pages.

Zou et al. "LayoutNet: Reconstructing the 3D Room Layout from a Single RGB Image" in arXiv:1803.08999, submitted Mar. 23, 2018, 9 pages.

Lee et al. "RoomNet: End-to-End Room Layout Estimation" in arXiv:1703.00241v2, submitted Aug. 7, 2017, 10 pages.

Time-of-flight camera, Wikipedia, retrieved from https://en.wikipedia.org/wiki/Time-of-flight_camera, on Aug. 30, 2018, 8 pages.

Magicplan—Android Apps on Go . . . , retrieved from https://play.google.com/store/apps/details?id=com.sensopia.magicplan, on Feb. 21, 2018, 5 pages.

* cited by examiner

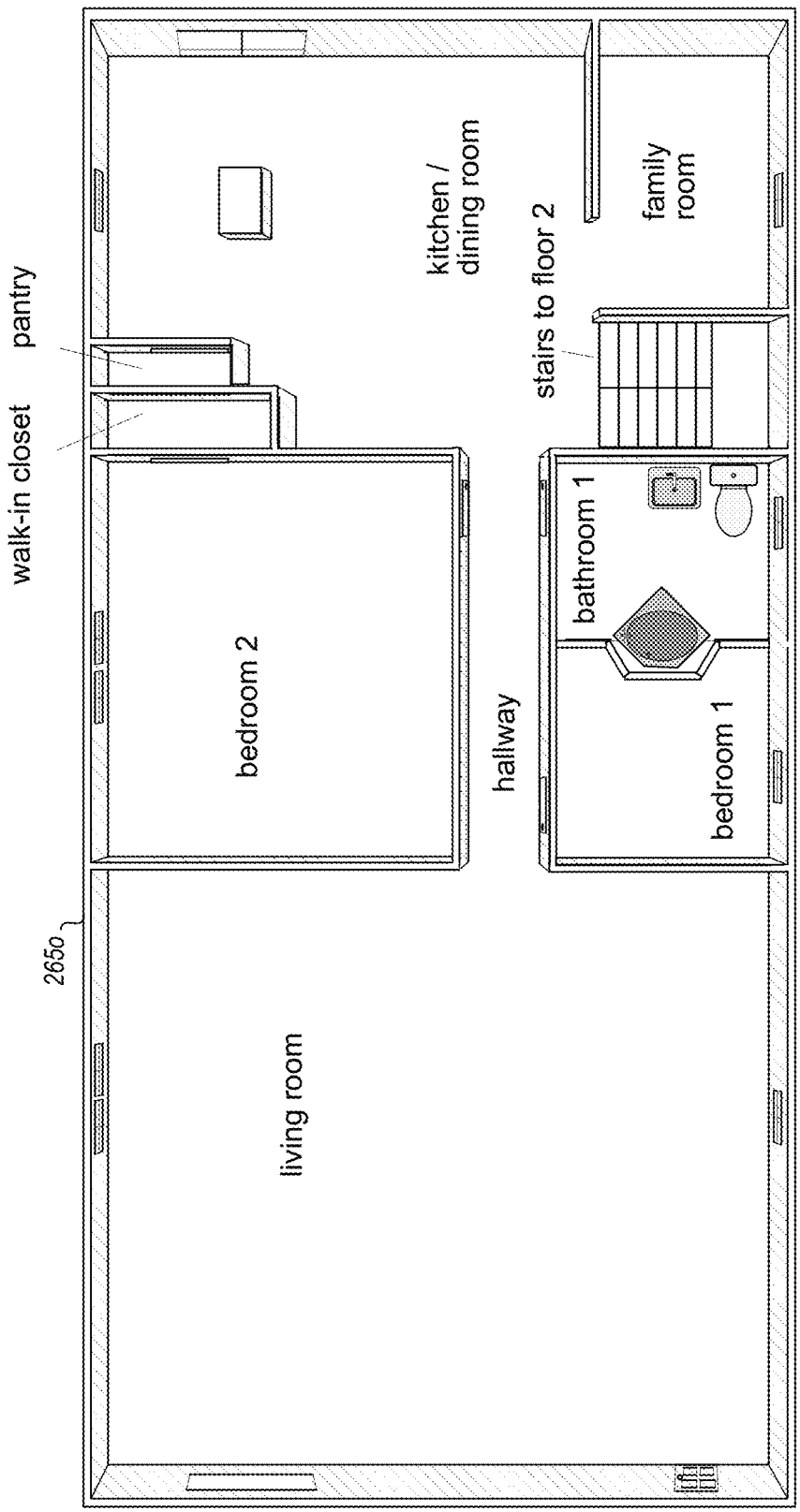
*Fig. 2-O*

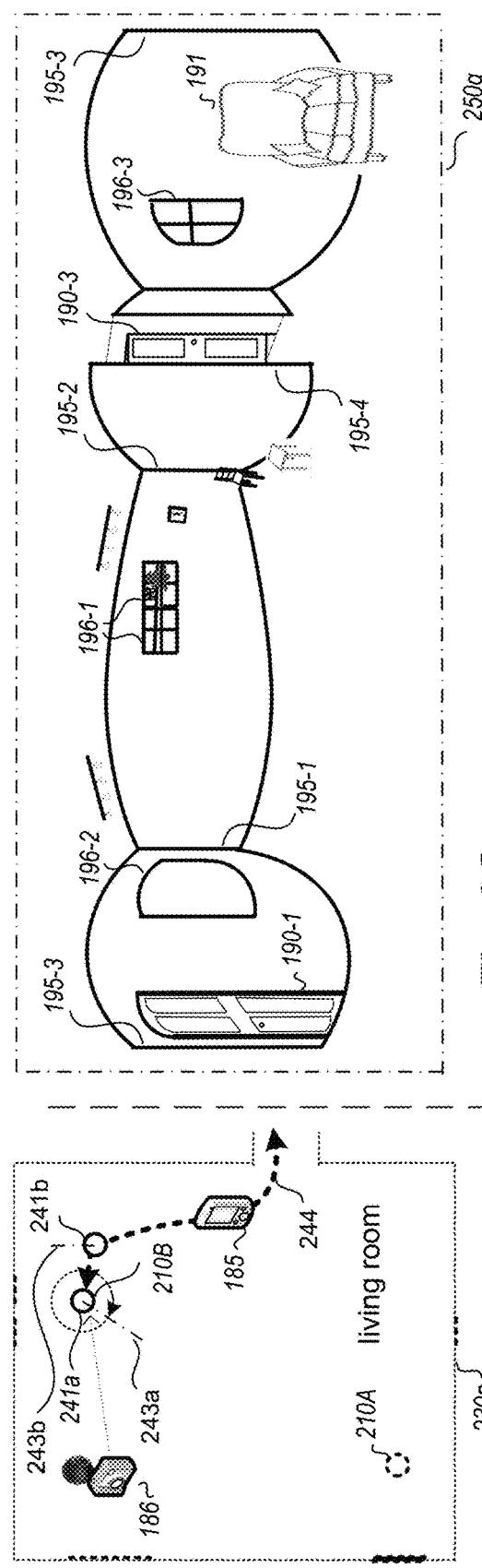

AUTOMATED DETERMINATION OF IMAGE ACQUISITION LOCATIONS IN BUILDING INTERIORS USING MULTIPLE DATA CAPTURE DEVICES

CROSS-REFERENCE TO RELATED APPLICATIONS

This application is a continuation of co-pending U.S. patent application Ser. No. 17/150,958, filed Jan. 15, 2021 and entitled "Automated Determination Of Image Acquisition Locations In Building Interiors Using Multiple Data Capture Devices", which is hereby incorporated by reference in its entirety. U.S. patent application Ser. No. 17/150,958 claims the benefit of U.S. Provisional Patent Application No. 63/135,312, filed Jan. 8, 2021 and entitled "Automated Determination Of Image Acquisition Locations In Building Interiors Using Multiple Data Capture Devices," which is hereby incorporated by reference in its entirety.

TECHNICAL FIELD

The following disclosure relates generally to techniques for automatically determining the acquisition locations of images in building interiors by using data captured from multiple devices, and for subsequently using the determined acquisition location information in one or more manners, such as to determine a location of an image of an interior of a building's room on a floor plan of the building based on a combination of acquired visual data from a camera device and additional acquired data from a separate mobile computing device, and to use the determined image location to improve navigation of the building.

BACKGROUND

In various fields and circumstances, such as architectural analysis, property inspection, real estate acquisition and development, remodeling and improvement services, general contracting and other circumstances, it may be desirable to view information about the interior of a house, office, or other building without having to physically travel to and enter the building, including to determine actual as-built information about the building rather than design information from before the building is constructed. However, it can be difficult to effectively capture, represent and use such building interior information, including to display visual information captured within building interiors to users at remote locations (e.g., to enable a user to fully understand the layout and other details of the interior, including to control the display in a user-selected manner). In addition, while a floor plan of a building may provide some information about layout and other details of a building interior, such use of floor plans has some drawbacks in certain situations, including that floor plans can be difficult to construct and maintain, to accurately scale and populate with information about room interiors, to visualize and otherwise use, etc.

DETAILED DESCRIPTION

Figure 1A:
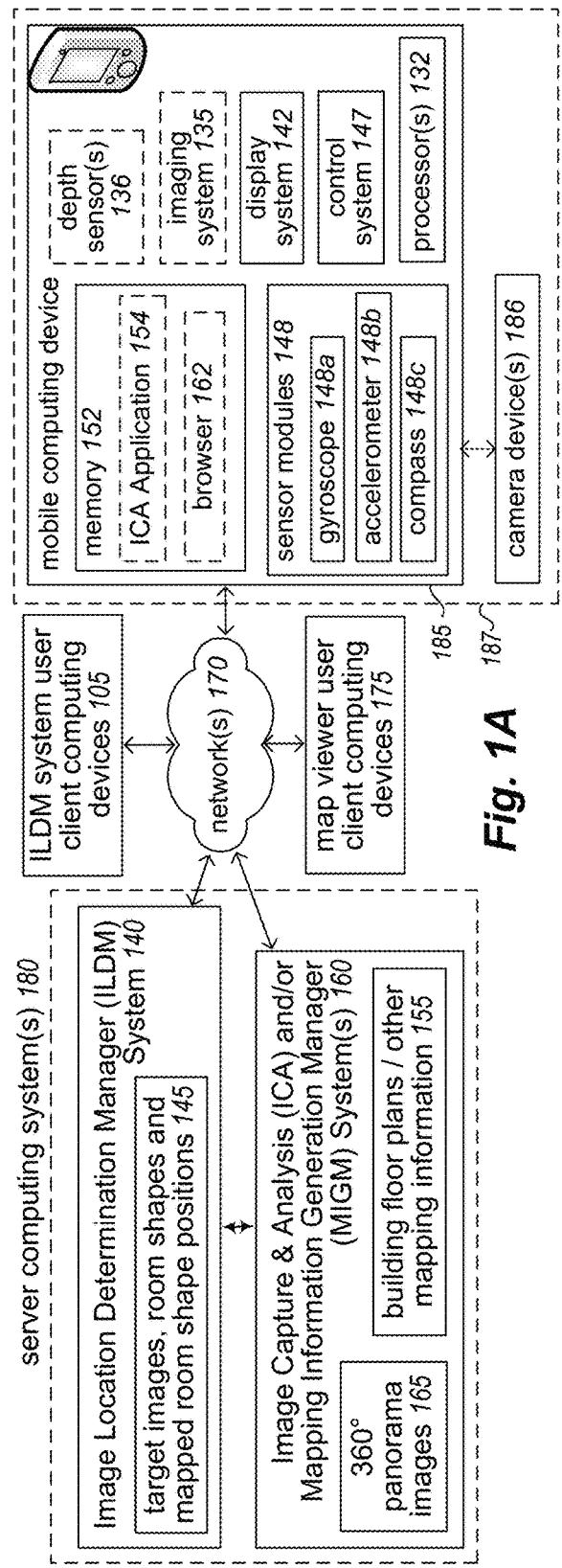
FIGS. 1A-1B are diagrams depicting an exemplary building interior environment and computing system(s) for use in embodiments of the present disclosure, such as for performing automated operations to determine the acquisition locations of images in building interiors by using data captured from multiple devices and to subsequently use the determined acquisition location information in one or more manners.

The present disclosure describes techniques for using computing devices to perform automated operations related to determining the acquisition locations of images, such as within a building interior by using data captured from multiple devices, and for subsequently using the determined image acquisition location information in one or more further automated manners. The images may, for example, include panorama images or other images (e.g., rectilinear perspective images) that are acquired at acquisition locations in or around a multi-room building (e.g., a house, office, etc.), referred to generally herein as 'target images', and the determined image acquisition location information for such a target image may include at least a location on a floor plan of the building and in some situations further includes an orientation or other direction information (e.g., a global compass direction) for at least a part of the target image—in addition, in at least some such embodiments, the automated image acquisition location determination is further performed without having or using information from any depth sensors or other distance-measuring devices about distances from a target image's acquisition location to walls or other objects in the surrounding building. The determined image acquisition location information for one or more target images acquired for a building may be further used in various manners in various embodiments, such as in conjunction with a corresponding building floor plan and/or other generated mapping-related information for the building, including for controlling navigation of mobile devices (e.g., autonomous vehicles), for display or other presentation over one or more computer networks on one or more client devices in corresponding GUIs (graphical user interfaces), etc. Additional details are included below regarding the automated determination and use of image acquisition location information, and some or all of the techniques described herein may be performed via automated operations of an Image Location Determination Manager ("ILDM") system in at least some embodiments, as discussed further below.

As noted above, automated operations of an ILDM system may include determining the acquisition location and optionally orientation of a target panorama image (or other target image) that is captured by a camera device in a room of a house or other building (or in another defined area), by automatically using visual data of the target image and additional data captured from one or more other nearby devices—a combination of acquisition location and orientation for a target image is referred to at times herein as a 'pose' or an 'acquisition position' or merely 'position' of the target image. Such data captured from multiple devices and used for the automated determination of the acquisition position of a target image may include visual data in the target image acquired by the camera device, and additional data acquired by a separate mobile computing device near the camera device (e.g., carried by the same user or mobile vehicle/device that is carrying the camera device), such as additional visual data in one or more further images acquired by the mobile computing device at one or more locations in the same room in which the target image is acquired and/or additional acquisition metadata acquired by the mobile computing device related to the acquisition of the further images (e.g., data from one or more IMU, or inertial measurement unit, sensors of the mobile computing device). In at least some embodiments, the additional data captured by the mobile computing device is used to determine a position (or pose) of the mobile computing device as it acquires the one or more further images, and the acquisition position of the camera device for the target image is determined at least in part in a manner relative to the determined position for the mobile computing device, as discussed in greater detail below.

In at least some embodiments, the determined position for the mobile computing device is based at least in part on performing a SLAM (Simultaneous Localization And Mapping) and/or SfM (Structure from Motion) and/or MVS (multiple-view stereovision) analysis, such as by using motion data from IMU sensors on the mobile computing device in combination with visual data from one or more image sensors on the mobile computing device, including in at least some such embodiments to use the additional data captured by the mobile computing device to generate an estimated three-dimensional ("3D") shape of the enclosing room (e.g., based on a 3D point cloud with a plurality of 3D data points and/or estimated planar surfaces of walls and optionally the floor and/or ceiling)—in some such embodiments, these automated operations are performed without using any depth sensors or other distance-measuring devices about distances from the mobile computing device to walls or other objects in the surrounding room, while in other embodiments the mobile computing device (or other additional associated mobile device) may capture depth data to walls of the surrounding room and use that captured depth data as part of determining the position of the mobile computing device. The automated determination of the position for the mobile computing device may further be performed in some embodiments as part of generating a travel path of the mobile computing device through the enclosing room (e.g., using one or more of a SLAM, SfM and/or MVS analysis), whether instead of or in addition to generating a 3D shape of the enclosing room—in other embodiments, the automated determination of the position for the mobile computing device may be based at least in part on other analyses, such as via Wi-Fi triangulation, Visual Inertial Odometry ("VIO"), etc. Additional details are included below regarding automated operations that may be performed by the ILDM system in at least some embodiments for determining the acquisition location and optionally orientation of a mobile computing device in a room using one or more types of captured data.

In addition to automated operations for analyzing additional data captured by a separate mobile computing device to determine a first estimated room shape (e.g., a 3D room shape) for the room enclosing the acquisition location of a target panorama image (or other target image) captured by a camera device, the automated operations by the ILDM system may further include determining an additional estimated room shape for the enclosing room (e.g., an additional 3D room shape) based at least in part on an analysis of the visual data in the target image, such as based at least in part on performing a MVS (multiple-view stereovision) and/or Visual Odometry ("VO") analysis, such as without using any depth sensors or other distance-measuring devices about distances from the camera device to walls or other objects in the surrounding room—in some embodiments, the determining of the additional estimated room shape for the enclosing room using the visual data of the target image may further include using data from one or more IMU sensors of the camera device (e.g., using SLAM and/or SfM techniques), although in other embodiments the determining of the additional estimated room shape for the enclosing room using the visual data of the target image may not include using any such other IMU data (e.g., may not use any data other than the visual data of the target image). For example, the described techniques may, in at least some embodiments, include using one or more trained neural networks or other techniques to estimate a 3D room shape shown in the target image—as non-exclusive examples, such 3D room shape estimation may include one or more of the following: using a trained convolutional neural network or other analysis technique to take the target image as input and to estimate a 3D point cloud of the walls and other surfaces of the enclosing room from the visual contents of the target image and/or to estimate a piecewise planar representation (e.g., 3D walls and other planar surfaces) of the enclosing room from the visual contents of the target image; using a trained neural network or other analysis technique to take the target image as input and to estimate wireframe structural lines of the enclosing room from the visual contents of the target image (e.g., structural lines to show one or more of borders between walls, borders between walls and ceiling, borders between walls and floor, outlines of doorways and/or other inter-room wall openings, outlines of windows, etc.); using a trained neural network or other analysis technique to detect wall structural elements (e.g., windows and/or sky-lights; passages into and/or out of the room, such as doorways and other openings in walls, stairs, hallways, etc.; borders between adjacent walls; borders between walls and a floor; borders between walls and a ceiling; corners (or solid geometry vertices) where at least three surfaces or planes meet; etc.) in the visual contents of the target image and to optionally detect other fixed structural elements (e.g., countertops, bath tubs, sinks, islands, fireplaces, etc.) and to optionally generate 3D bounding boxes for the detected elements; etc. Additional details are included below regarding automated operations that may be performed by the ILDM system in at least some embodiments for identifying an estimated room shape for a room enclosing a target image based at least in part on the visual data from the target image.

Given the target image acquired by the camera device in the enclosing room and the additional data captured by the mobile computing device in the enclosing room, the automated determination of the acquisition location and optionally acquisition orientation for the target image may include performing one or more automated operations, including using the automatically determined location and optionally orientation of the mobile computing device at one or more times in the enclosing room, and including optionally using the one or more determined estimated room shapes of the enclosing room from the target image's visual data and the additional data from the mobile computing device. Non-exclusive examples of such automated operations for determining the acquisition location and optionally acquisition orientation of the camera device for the target image in the enclosing room based at least in part on additional data captured by the mobile computing device in the enclosing room include the following:

(a) analyzing additional visual data of one or more further images captured by the mobile computing device to identify the camera device in that additional visual data, and using a position of the identified camera device in that additional visual data as part of the determining of the acquisition location and optionally acquisition orientation of the camera device in the enclosing room; and/or (b) analyzing additional visual data of one or more further images captured by the mobile computing device to identify one or more markers in that additional visual data that are located on the camera device, and using one or more positions of the identified one or more markers in that additional visual data as part of the determining of the acquisition location and optionally acquisition orientation of the camera device in the enclosing room; and/or (c) analyzing the visual data of the target panorama image (or other target image) to generate a first estimated shape of the enclosing room, analyzing the additional visual data of one or more further images captured by the mobile computing device to generate a second estimated shape of the enclosing room, and comparing the first and second estimated shapes to use offsets in corresponding portions of the shapes to identify a position within the second estimated shape at which the visual data of the target panorama image is captured; and/or (d) analyzing the visual data of the target panorama image (or other target image) to generate a first estimated shape of the enclosing room, analyzing depth data that is captured by the mobile computing device in the enclosing room to generate a second estimated shape of the enclosing room, and comparing the first and second estimated shapes to use offsets in corresponding portions of the shapes to identify a position within the second estimated shape at which the visual data of the target panorama image is captured; and/or (e) analyzing the visual data of the target panorama image (or other target image) and the additional visual data of one or more further images captured by the mobile computing device to identify features (e.g., 2D features) visible in both that visual data and that additional visual data, and using offsets of positions of the identified features as part of the determining of the acquisition location and optionally acquisition orientation of the camera device in the enclosing room; and/or (f) analyzing movement data by the mobile computing device in the enclosing room as the mobile computing device moves to and/or from a position at which the camera device captures the target panorama image to identify that position, and using that identified position as part of the determining of the acquisition location and optionally acquisition orientation of the camera device in the enclosing room. In addition, further non-exclusive examples of such automated operations for determining the acquisition location and optionally acquisition orientation of the camera device for the target image in the enclosing room using other types of information include the following:

(g) analyzing visual data of the target panorama image and further visual data of another panorama image captured in the enclosing room (e.g., another previously acquired target image) to identify features (e.g., 2D features) visible in both the target panorama image and the other panorama image, and using offsets of positions of the identified features to determine a common coordinate system for the target panorama image and the other panorama image to use in combining the visual data and the further visual data and the determining of the acquisition location and optionally acquisition orientation of the camera device for the target image in the enclosing room (e.g., in a manner relative to a previously determined acquisition location and optionally acquisition orientation of the other panorama image); and/or (h) analyzing the visual data of the target panorama image (or other target image) to generate a first estimated shape of the enclosing room, retrieving a second previously determined shape of the enclosing room (e.g., from a partially or fully defined floor plan of the building in which the enclosing room is located), and comparing the first and second room shapes to use offsets in corresponding portions of the shapes to identify a position within the second room shape at which the visual data of the target panorama image is captured.

Furthermore, the automatically determined acquisition location and optionally acquisition orientation of the camera device for a first target image in a first enclosing room may be combined with corresponding information determined for one or more second target images in one or more second enclosing rooms (whether the same or different rooms than the first enclosing room), such as by using automated operations of type (f) noted above, in order to create a single common coordinate system to connect some or all target images acquired by the camera device in a building, including to link acquisition locations of the target images, as discussed in greater detail elsewhere herein. In addition, in at least some embodiments, for some or all of the types of automated operations noted above for determining the acquisition location and optionally acquisition orientation of the camera device for the target image in the enclosing room, the results of that type of automated operation may further include information about an accuracy and/or likelihood and/or uncertainty of those results, such as by generating and providing one or more confidence levels for the results of each of those types of automated operations.

If only a single type of automated operation is performed in a given embodiment and situation for determining the acquisition location and optionally acquisition orientation of the camera device for the target image in the enclosing room, the results of that single automated operation may be selected and used to represent the target image's acquisition location and optionally acquisition orientation. Alternatively, if multiple types of automated operations are performed in a given embodiment and situation for determining the acquisition location and optionally acquisition orientation of the camera device for the target image in the enclosing room, the results of those multiple automated operations may be used in various manners to represent the target image's acquisition location and optionally acquisition orientation. For example, in some such embodiments and situations, the results of a single one of the multiple types of automated operations may be selected and used to represent the target image's acquisition location and optionally acquisition orientation, such as for a result having a highest confidence level, and/or based on a defined priority for some or all of the multiple types of automated operations (e.g., to use the results of a highest priority type of automated operation if it is performed and available, such as for operations (b) and/or (d), or if not, to use the results of the next highest priority type of automated operation that is performed and available). Alternatively, in some embodiments and situations, the results of multiple types of automated operations may be combined and used together to represent the target image's acquisition location and optionally acquisition orientation, such as by performing an average (e.g., a weighted average using confidence levels associated with particular results for the weighting), by performing a statistical analysis (e.g., including to discard outliers at the low and/or high ends of the confidence values), etc. In addition, in some embodiments and situations, the results of one or more types of automated operations (e.g., for operations (a) and/or (b) and/or (f)) may be used as initial values that are provided as input to one or more additional types of automated operations (e.g., for operations (c) and/or (d) and/or (e)) that update (e.g., refine) those initial values, with the updated results of one or more of the additional types of automated operations used to represent the target image's acquisition location and optionally acquisition orientation. Additional details are included below regarding automated operations that may be performed by the ILDM system in at least some embodiments for one or more types of automated operations for determining the acquisition location and optionally acquisition orientation of the camera device for the target image in the enclosing room.

The described techniques provide various benefits in various embodiments, including to allow partial or complete floor plans of multi-room buildings and other structures to be automatically generated concurrently with the acquisition of one or more target image(s) acquired for the building or other structure, and/or to allow such an existing partial or complete floor plan to be augmented with information about acquisition locations at which target images are acquired in the building or other structure, including in some embodiments without having or using information from depth sensors or other distance-measuring devices about distances from images' acquisition locations to walls or other objects in a surrounding building or other structure. Non-exclusive examples of such benefits include the following: the ability to provide feedback during capture of one or more target images acquired for a building or other structure (e.g., to display or other provide a user with a determined room shape for an enclosing room that indicates the acquisition location and optionally acquisition orientation of each of one or more target images, such as part of a partial or complete floor plan for the building or other structure), including to optionally allow the user to determine and indicate one or more other areas of the building at which to acquire one or more further target images (e.g., for a partial floor plan, to acquire additional target images in other areas of the building that are not yet represented in the partial floor plan); the ability to inter-connect multiple target images and display at least one of the target images with user-selectable visual indicators in the directions of other linked target images that when selected cause the display of a respective other one of the linked target images, such as by placing the various target images in a common coordinate system that shows their relative locations, or to otherwise determine at least directions between pairs of target images (e.g., based at least in part on an automated analysis of the visual contents of the target images in the pair, such as in a manner similar to operation (f) noted above, and optionally based on further movement data from the mobile computing device along a travel path between the target images), and to link the various target images using the determined inter-image directions; the ability to determine, on the mobile computing device, the acquisition location and optionally acquisition orientation of a target image and/or to determine a 3D room shape for an enclosing room for the target image, such as in a near-time or real-near-time manner relative to the acquisition of the target image, and optionally with initial information determined on the mobile computing device used immediately (e.g., displayed on the mobile computing device to a user) while also being further supplied to one or more other computing devices (e.g., remote server computing systems) for updating (e.g., refinement); the ability to analyze the visual data of a target image to detect objects of interest in the enclosing room (e.g., structural wall elements, such as windows, doorways and other wall openings, etc.) and to determine locations of those detected objects in a determined room shape for the enclosing room that is based in part or in whole on additional data captured by the mobile computing device; the ability to analyze additional data captured by the mobile computing device (e.g., movement data from one or more IMU sensors, visual data from one or more image sensors, etc.) to determine a travel path of the mobile computing device in multiple rooms, to identify wall openings (e.g., doorways, staircases, etc.) of the multiple rooms based at least in part on that additional data (and optionally on visual data of one or more target images acquired in the one or more rooms), and to optionally further use such information about identified wall openings to position together determined 3D room shapes of the multiple rooms; etc.

Furthermore, the described automated techniques allow such image acquisition location information to be determined more quickly than previously existing techniques, and in at least some embodiments with greater accuracy, including by using information acquired from the actual building environment (rather than from plans on how the building should theoretically be constructed), as well as enabling the capture of changes to structural elements that occur after a building is initially constructed. Such described techniques further provide benefits in allowing improved automated navigation of a building by mobile devices (e.g., semi-autonomous or fully-autonomous vehicles), based at least in part on the determined acquisition locations of images, including to significantly reduce computing power and time used to attempt to otherwise learn a building's layout. In addition, in some embodiments the described techniques may be used to provide an improved GUI in which a user may more accurately and quickly obtain information about a building's interior (e.g., for use in navigating that interior), including in response to search requests, as part of providing personalized information to the user, as part of providing value estimates and/or other information about a building to a user, etc. Various other benefits are also provided by the described techniques, some of which are further described elsewhere herein.

As noted above, in some embodiments, a building floor plan having associated room shape information for some or all rooms of the building may be used in at least some embodiments in the automated determination of a target image's acquisition location within the building—in at least some such situations, 2D and/or 3D room shapes for the rooms shown on the floor plan (or for the other defined areas) may have been previously automatically determined, while in other situations some or all of the room shapes of the rooms (or other shapes of defined areas) may be determined in other manners (e.g., automatically determined concurrently at a time of determining a target image's acquisition location, determined previously or concurrently based at least in part on manual input by one or more users, etc.). A building floor plan with associated room shape information may have various forms in various embodiments, such as a 2D (two-dimensional) floor map of the building (e.g., an orthographic top view or other overhead view of a schematic floor map that does not include or display height information) and/or a 3D (three-dimensional) or 2.5D (two and a half-dimensional) floor map model of the building that does display height information. In at least some embodiments, the automated determination of a target image's acquisition location within a multi-room building may generally include retrieving determined room shapes for one or some or all of the building's rooms, and optionally identifying one of those rooms whose determined room shape best matches a room shape for the target image that is estimated from the visual contents of the target image and is placed (e.g., sized and rotated) to match that identified room's determined room shape, including comparing aspects of the target image's visual contents to the determined room shape of that identified room to determine at least a location within that identified room at which the target image was acquired. Once a target image's estimated room shape for an enclosing room is automatically identified, it may be compared to a candidate room shape (e.g., the previously determined room shape(s) of one or some or all rooms for a building) in order to automatically determine the acquisition location and optionally acquisition orientation of a target image in the determined candidate room shape (e.g., the candidate that best matches the target image's estimated room shape), with the room having such a determined room shape referred to herein as a 'target' room within the building in which the target image's acquisition location occurs.

Furthermore, in some embodiments for an image captured in a defined area other than a room, the image's estimated shape of that defined area may be matched to other defined areas' shapes in various manners. For example, in at least some embodiments, a target image (and optionally additional images) may be acquired outside of one or more buildings, such as in one of multiple separate areas of one or more properties (e.g., for a house, a garden, patio, deck, back yard, side yard, front yard, pool, carport, dock, etc.) that each has a previously or concurrently determined area shape (e.g., a 3D shape, a 2D shape, etc.)—if so, the acquisition position of the target image (and optionally of the additional images) may similarly be automatically determined with that area's shape using such other defined areas' shapes and the techniques described herein.

The automated determination by the ILDM system of the acquisition location of a target image taken in a room may further include additional operations in some embodiments, and corresponding additional details are included below, including with respect to the examples of FIG. 2A-2U and their associated descriptions.

As noted above, in at least some embodiments and situations, some or all of the images acquired for a building may be panorama images that are each acquired at one of multiple acquisition locations in or around the building, such as to generate a panorama image at each such acquisition location from one or more of a video captured at that acquisition location (e.g., a 360° video taken from a smartphone or other mobile device held by a user turning at that acquisition location), or multiple images captured in multiple directions from the acquisition location (e.g., from a smartphone or other mobile device held by a user turning at that acquisition location; from automated rotation of a device at that acquisition location, such as on a tripod at that acquisition location; etc.), or a simultaneous capture of all the image information for a particular acquisition location (e.g., using one or more fisheye lenses), etc. It will be appreciated that such a panorama image may in some situations be represented in a spherical coordinate system and provide up to 360° coverage around horizontal and/or vertical axes (e.g., 360° of coverage along a horizontal plane and around a vertical axis), while in other embodiments the acquired panorama images or other images may include less than 360° of vertical coverage (e.g., for images with a width exceeding a height by more than a typical aspect ratio, such as at or exceeding 21:9 or 16:9 or 3:2 or 7:5 or 4:3 or 5:4 or 1:1, including for so-called 'ultrawide' lenses and resulting ultrawide images). In addition, it will be appreciated that a user viewing such a panorama image (or other image with sufficient horizontal and/or vertical coverage that only a portion of the image is displayed at any given time) may be permitted to move the viewing direction within the panorama image to different orientations to cause different subset images (or "views") to be rendered within the panorama image, and that such a panorama image may in some situations be represented in a spherical coordinate system (including, if the panorama image is represented in a spherical coordinate system and a particular view is being rendered, to convert the image being rendered into a planar coordinate system, such as for a perspective image view before it is displayed). Furthermore, acquisition metadata regarding the capture of such panorama images may be obtained and used in various manners, such as data acquired from IMU sensors or other sensors of a mobile device as it is carried by a user or otherwise moved between acquisition locations—non-exclusive examples of such acquisition metadata may include one or more of acquisition time; acquisition location, such as GPS coordinates or other indication of location; acquisition direction and/or orientation; relative or absolute order of acquisition for multiple images acquired for a building or that are otherwise associated; etc., and such acquisition metadata may further optionally be used as part of determining the images' acquisition locations in at least some embodiments and situations, as discussed further below. Additional details are included below regarding automated operations of device(s) implementing an Image Capture and Analysis (ICA) system involved in acquiring images and optionally acquisition metadata, including with respect to FIGS. 1A-1B and 2A-2D and elsewhere herein.

As is also noted above, shapes of rooms of a building may be automatically determined in various manners in various embodiments, including in some embodiments at a time before automated determination of a particular image's acquisition location within the building. For example, in at least some embodiments, a Mapping Information Generation Manager (MIGM) system may analyze various images acquired in and around a building in order to automatically determine room shapes of the building's rooms (e.g., 3D room shapes, 2D room shapes, etc.) and to automatically generate a floor plan for the building. As one example, if multiple images are acquired within a particular room, those images may be analyzed to determine a 3D shape of the room in the building (e.g., to reflect the geometry of the surrounding structural elements of the building)—the analysis may include, for example, automated operations to 'register' the camera positions for the images in a common frame of reference so as to 'align' the images and to estimate 3D locations and shapes of objects in the room, such as by determining features visible in the content of such images (e.g., to determine the direction and/or orientation of the acquisition device when it took particular images, a path through the room traveled by the acquisition device, etc., such as by using SLAM techniques for multiple video frame images and/or other SfM techniques for a 'dense' set of images that are separated by at most a defined distance (such as 6 feet) to generate a 3D point cloud for the room including 3D points along walls of the room and at least some of the ceiling and floor of the room and optionally with 3D points corresponding to other objects in the room, etc.) and/or by determining and aggregating information about planes for detected features and normal (orthogonal) directions to those planes to identify planar surfaces for likely locations of walls and other surfaces of the room and to connect the various likely wall locations (e.g., using one or more constraints, such as having 90° angles between walls and/or between walls and the floor, as part of the so-called 'Manhattan world assumption') and form an estimated room shape for the room. After determining the estimated room shapes of the rooms in the building, the automated operations may, in at least some embodiments, further include positioning the multiple room shapes together to form a floor plan and/or other related mapping information for the building, such as by connecting the various room shapes, optionally based at least in part on information about doorways and staircases and other inter-room wall openings identified in particular rooms, and optionally based at least in part on determined travel path information of a mobile computing device between rooms. Additional details are included below regarding automated operations of device(s) implementing an MIGM system involved in determining room shapes and combining room shapes to generate a floor plan, including with respect to FIGS. 1A-1B and 2E-2N and elsewhere herein.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while floor plans may be generated for houses that do not include detailed measurements for particular rooms or for the overall houses, it will be appreciated that other types of floor plans or other mapping information may be similarly generated in other embodiments, including for buildings (or other structures or layouts) separate from houses. As another non-exclusive example, while floor plans for houses or other buildings may be used for display to assist viewers in navigating the buildings, generated mapping information may be used in other manners in other embodiments. As yet another non-exclusive example, while some embodiments discuss obtaining and using additional data from a mobile computing device that is separate from a camera device that captures a target image, in other embodiments the one or more devices used in addition to the camera device may have other forms, such as to use a mobile device that acquires some or all of the additional data but does not provide its own computing capabilities (e.g., an additional 'non-computing' mobile device), multiple separate mobile devices that each acquire some of the additional data (whether mobile computing devices and/or non-computing mobile devices), etc. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), etc. The term "acquire" or "capture" as used herein with reference to a building interior, acquisition location, or other location (unless context clearly indicates otherwise) may refer to any recording, storage, or logging of media, sensor data, and/or other information related to spatial and/or visual characteristics and/or otherwise perceivable characteristics of the building interior or subsets thereof, such as by a recording device or by another device that receives information from the recording device. As used herein, the term "panorama image" may refer to a visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction (e.g., greater than 120° or 150° or 180°, etc.). The term "sequence" of acquisition locations, as used herein, refers generally to two or more acquisition locations that are each visited at least once in a corresponding order, whether or not other non-acquisition locations are visited between them, and whether or not the visits to the acquisition locations occur during a single continuous period of time or at multiple different times, or by a single user and/or device or by multiple different users and/or devices. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

Figure 1B:
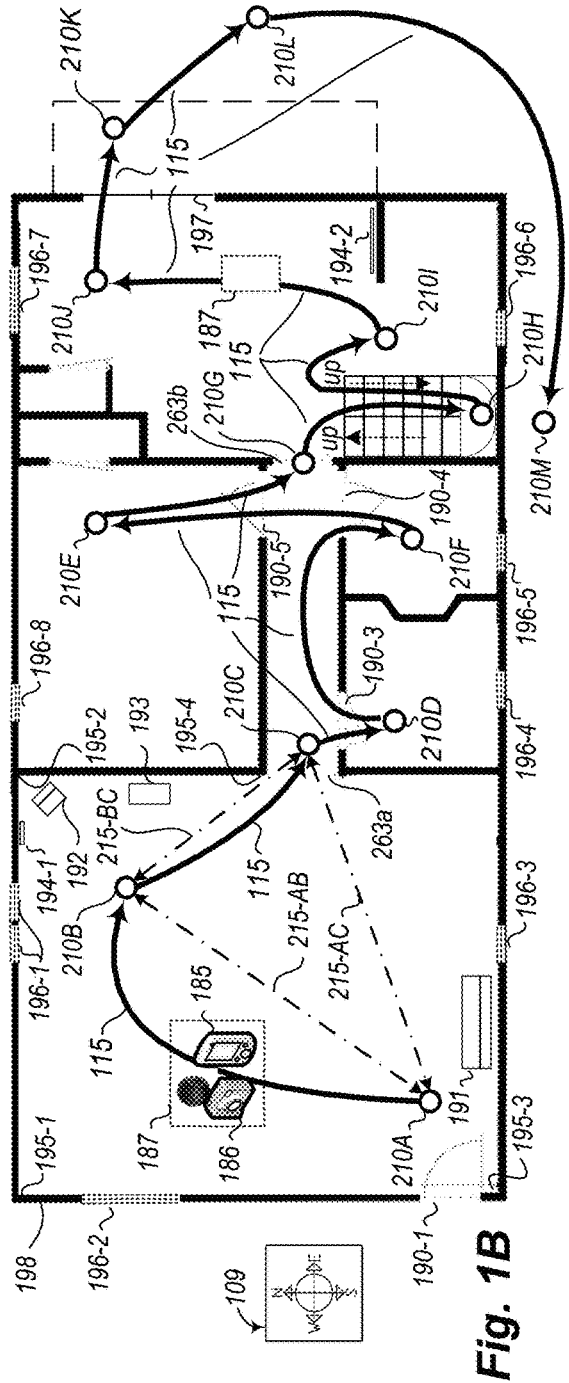

FIG. 1A is an example block diagram of various devices and systems that may participate in the described techniques in some embodiments. In particular, target panorama images 165 are illustrated in FIG. 1A that have been captured by one or more camera devices 186, such as with respect to one or more buildings or other structures and under control of by an Interior Capture and Analysis ("ICA") system 160 executing in this example on one or more server computing systems 180, with inter-image directional links optionally having been generated for at least some pairs of images (e.g., after using the ILDM system 140 to perform automated acquisition location and optionally acquisition orientation determination for the target panorama images)—FIG. 1B shows one example of such panorama image acquisition locations 210 for a particular house 198, as discussed further below, and additional details related to the automated operation of the ICA system are included elsewhere herein, including with respect to FIG. 4. In at least some embodiments, at least some of the ICA system may execute in part on a mobile computing device 185 that operates 187 in conjunction with one or more camera devices 186 (whether in addition to or instead of ICA system 160 on the one or more server computing systems 180), such as by acquiring additional data relative to the target images acquired by those camera device(s) and in a same room or other area as those camera device(s) during the capture of those target images, as discussed further with respect to FIG. 1B. An MIGM (Mapping Information Generation Manager) system 160 is further executing on one or more server computing systems 180 in FIG. 1A to generate and provide building floor plans 155 and/or other mapping-related information (e.g., room shape determinations, linked panorama images, etc.) based on use of the panorama images 165 and optionally associated metadata about their acquisition and linking—FIGS. 2M through 2O (referred to herein as '2-O' for clarity) show examples of such floor plans, as discussed further below, and additional details related to the automated operation of the MIGM system are included elsewhere herein, including with respect to FIGS. 5A-5B.

FIG. 1A further illustrates an ILDM (Image Location Determination Manager) system 140 that is executing on one or more server computing systems 180 to determine acquisition locations and optionally acquisition orientations of target images 145 (e.g., target panorama images 165 obtained from the ICA system 160) acquired in one or more building rooms, such as with respect to corresponding building floor plans 155 that are determined previously or concurrently with the automated acquisition location and optionally acquisition orientation determinations of the ILDM system. In at least some embodiments and situations, one or more users of ILDM client computing devices 105 may further interact over the network(s) 170 with the ILDM system 140, such as to assist with some of the automated operations of the ILDM system for determining the acquisition location of a target image based at least in part on an analysis of the image's contents, and/or for subsequently using the determined acquisition location and optionally acquisition orientation information in one or more further automated manners. Additional details related to the automated operation of the ILDM system are included elsewhere herein, including with respect to FIGS. 2P-2U and FIGS. 6A-6B. In some embodiments, the ICA system and/or MIGM system and/or ILDM system 140 may execute on the same server computing system(s), such as if multiple or all of those systems are operated by a single entity or are otherwise executed in coordination with each other (e.g., with some or all functionality of those systems integrated together into a larger system), while in other embodiments the ILDM system may instead obtain target images and/or optionally other information (e.g., floor plan information, other additional images, etc.) from one or more external sources and optionally store them locally (not shown) with the ILDM system for further analysis and use.

One or more users (not shown) of one or more client computing devices 175 may further interact over one or more computer networks 170 with the ILDM system 140 and optionally the ICA system and/or MIGM system, such as to obtain and use determined acquisition location and optionally acquisition orientation information, and/or to obtain and optionally interact with a generated floor plan on which one or more target images have been located, and/or to obtain and optionally interact with additional information such as one or more associated target images (e.g., to change between a floor plan view and a view of a particular target image at an acquisition location within or near the floor plan; to change the horizontal and/or vertical viewing direction from which a corresponding view of a panorama image is displayed, such as to determine a portion of a panorama image to which a current user viewing direction is directed, etc.). In addition, while not illustrated in FIG. 1A, a floor plan (or portion of it) may be linked to or otherwise associated with one or more other types of information, including for a floor plan of a multi-story or otherwise multi-level building to have multiple associated sub-floor plans for different stories or levels that are interlinked (e.g., via connecting stairway passages), for a two-dimensional ("2D") floor plan of a building to be linked to or otherwise associated with a three-dimensional ("3D") rendering floor plan of the building, etc. In addition, while not illustrated in FIG. 1A, in some embodiments the client computing devices 175 (or other devices, not shown), may receive and use determined image acquisition location and optionally acquisition orientation information in additional manners (optionally in combination with generated floor plans and/or other generated mapping-related information), such as to control or assist automated navigation activities by those devices (e.g., by autonomous vehicles or other devices), whether instead of or in addition to display of the generated information.

In the depicted computing environment of FIG. 1A, the network 170 may be one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, the client computing devices 175 and server computing systems 180 may include various hardware components and stored information, as discussed in greater detail below with respect to FIG. 3.

In the example of FIG. 1A, ICA system 160 may perform automated operations involved in generating multiple target panorama images (e.g., each a 360 degree panorama around a vertical axis) at multiple associated acquisition locations (e.g., in multiple rooms or other locations within a building or other structure and optionally around some or all of the exterior of the building or other structure), such as for use in generating and providing a representation of an interior of the building or other structure. The techniques may further include analyzing information to determine relative positions/directions between each of two or more acquisition locations, creating inter-panorama positional/directional links in the panoramas to each of one or more other panoramas based on such determined positions/directions, and then providing information to display or otherwise present multiple linked panorama images for the various acquisition locations within the building. Additional details related to embodiments of a system providing at least some such functionality of an ICA system are included in U.S. Non-Provisional patent application Ser. No. 17/064,601, filed Oct. 7, 2020 and entitled "Connecting And Using Building Data Acquired From Mobile Devices" (which includes disclosure of an example BICA system that is generally directed to obtaining and using panorama images from within one or more buildings or other structures); in U.S. Non-Provisional patent application Ser. No. 17/082, 044, filed Oct. 28, 2020 and entitled "Automated Control Of Image Acquisition Via Acquisition Location Determination" (which includes disclosure of an example ICA system that is generally directed to obtaining and using panorama images from within one or more buildings or other structures); in U.S. Non-Provisional patent application Ser. No. 17/019, 247, filed Sep. 12, 2020 and entitled "Automated Mapping Information Generation From Inter-Connected Images"; in U.S. Non-Provisional patent application Ser. No. 17/080,604, filed Oct. 26, 2020 and entitled "Generating Floor Maps For Buildings From Automated Analysis Of Visual Data Of The Buildings' Interiors"; and in U.S. Provisional Patent Application No. 63/035,619, filed Jun. 5, 2020 and entitled "Automated Generation On Mobile Devices Of Panorama Images For Buildings Locations And Subsequent Use"; each of which is incorporated herein by reference in its entirety.

FIG. 1B depicts a block diagram of an exemplary building interior environment in which target panorama images have been generated and analyzed by a copy of the ILDM system (not shown) to determine acquisition locations and optionally acquisition orientations of those target images within a building 198 (in this example, a house 198), and optionally further analyzed by a copy of the MIGM system (not shown( ) to generate and provide (e.g., present) a corresponding building floor plan and/or other mapping-related information (e.g., room shapes of the building's rooms, a linked group of target panorama images, etc.). In particular, FIG. 1B multiple panorama images are captured at a sequence of multiple acquisition locations 210 associated with the house 198 (e.g., the interior and exterior of the house), such as by a user (not shown) carrying one or more camera devices 186 to capture the target images and one or more separate mobile computing devices 185 to capture additional data for the multiple acquisition locations 210. An embodiment of the ICA system (e.g., ICA system 160 on server computing system(s) 180; a copy of some or all of the ICA system executing on a mobile computing device of the user, such as ICA application system 155 executing in memory 152 on device 185; etc.) may automatically perform or assist in the capturing of the data representing the building interior, as well as to in some embodiments further analyze the captured data to generate linked panorama images providing a visual representation of the building interior. While the mobile computing device of the user may include various hardware components, such as memory 152, a display 142, one or more hardware processors 132, optionally one or more image sensors or other imaging systems 135, optionally one or more depth sensors or other distance-measuring sensors 136, optionally one or more other sensors 148 (e.g., a gyroscope 148a, an accelerometer 148b, a compass 148c, etc., such as part of one or more IMUs, or inertial measurement units, of the mobile device; an altimeter; light detector; etc.), optionally a GPS receiver, and optionally other components that are not shown (e.g., additional non-volatile storage; transmission capabilities to interact with other devices over the network(s) 170 and/or via direct device-to-device communication, such as with an associated camera device 186, a remote server computing system 180, etc.; a microphone; one or more external lights; etc.), the mobile computing device in some embodiments does not include the distance-measuring sensors 136 or otherwise have access to or use other specialized equipment to measure the depth of objects in the building relative to a location of the mobile computing device, such that relationships between different target panorama images and their acquisition locations may be determined in part or in whole in such embodiments based on matching elements in different images and/or by using information from other of the listed hardware components, but without using any data from any such distance-measuring sensors 136. While not illustrated for the sake of brevity, the one or more camera devices 186 may similarly each include at least one or more image sensors and storage on which to store acquired target images and transmission capabilities to transmit the captured target images to other devices (e.g., an associated mobile computing device 185, a remote server computing system 180, etc.), optionally along with one or more lenses and lights, and optionally in some embodiments some or all of the other components shown for the mobile computing device. In addition, while directional indicator 109 is provided for reference of the viewer, the mobile computing device and/or ICA system may not use such absolute directional information in at least some embodiments, such as to instead determine relative directions and distances between panorama images 210 without regard to actual geographical positions or directions.

In operation, a user associated with the mobile computing device 185 and camera device 186 arrives at a first acquisition location 210A within a first room of the building interior (in this example, via an entryway from an external door 190-1 to the living room), and captures a view of a portion of the building interior that is visible from that acquisition location 210A using the camera device (e.g., some or all of the first room, and optionally small portions of one or more other adjacent or nearby rooms, such as through doorways, halls, stairways or other connecting passages from the first room) as the camera device 186 is rotated around a vertical axis at the first acquisition location (e.g., with the user turning his or her body in a circle while holding the camera device 186 stationary relative to the user's body). The mobile computing device 185 further captures additional data (e.g., additional visual data using imaging system 135, additional motion data using sensor modules 148, optionally additional depth data using distance-measuring sensors 136, etc.) at or near the acquisition location 210A, optionally while being rotated in the same manner as the camera device 186 although such rotation of the mobile computing device may not be performed in some embodiments, as well as to further optionally capture further such additional data while the devices 185 and 186 move to and/or from acquisition locations. The actions of the mobile computing device 185 and camera device 186 may be controlled or facilitated via use of one or more programs executing on the mobile computing device 185 (e.g., via automated instructions to those devices or to another mobile device, not shown, that is carrying those devices through the building under its own power; via instructions to the user; etc.), such as ICA application system 155 and/or optional browser 162, control system 147 to manage I/O (input/output) and/or communications and/or networking for the device 185 (e.g., to receive instructions from and present information to the user), etc., and the visual data capture by the camera device and optionally the mobile computing device may be performed by recording a video at location 210A and/or taking a succession of one or more images at location 210A, including to capture visual information depicting a number of objects or other elements (e.g., structural details) that may be visible in images (e.g., video frames) captured from or near the acquisition location. In the example of FIG. 1B, such objects or other elements include various elements that are structurally part of the walls (or structural "wall elements") of rooms of the house, such as the doorways 190 and 197 and their doors (e.g., with swinging and/or sliding doors), windows 196, inter-wall borders (e.g., corners or edges) 195 (including corner 195-1 in the northwest corner of the house 198, corner 195-2 in the northeast corner of the first room, and corner 195-3 in the southwest corner of the first room)—in addition, such objects or other elements in the example of FIG. 1B may further include other elements within the rooms, such as furniture 191-193 (e.g., a couch 191; chair 192; table 193;

etc.), pictures or paintings or televisions or other objects 194 (such as 194-1 and 194-2) hung on walls, light fixtures, etc. The user may also optionally provide a textual or auditory identifier to be associated with an acquisition location, such as "entry" for acquisition location 210A or "living room" for acquisition location 210B, while in other embodiments the ICA system may automatically generate such identifiers (e.g., by automatically analyzing video and/or other recorded information for a building to perform a corresponding automated determination, such as by using machine learning) or the identifiers may not be used.

After the first acquisition location 210A has been adequately captured (e.g., by a full rotation of the camera device 186 or use of one or more wide-angle lenses without such full rotation, and optionally by such rotation by the mobile computing device 185), the user and/or devices 185 and 186 may proceed to a next acquisition location (such as acquisition location 210B), optionally recording movement data by the mobile computing device during movement between the acquisition locations, such as video and/or other data from the hardware components (e.g., from one or more IMUs 148, from the imaging system 135, from the distance-measuring sensors 136, etc.). At the next acquisition location, the camera device 186 may similarly capture one or more target images from that acquisition location, and the mobile computing device 185 may similarly capture additional data at or near that acquisition location. This process may repeat from some or all rooms of the building and optionally external to the building, as illustrated for acquisition locations 210C-210M. The video and/or other images acquired for each acquisition location by the camera device 186 are further analyzed to generate a target panorama image for each of acquisition locations 210A-210M, including in some embodiments to stitch together multiple constituent images to create a panorama image and/or to match objects and other elements in different images. In addition to generating such panorama images, further analysis may be performed in at least some embodiments by a copy of the ILDM system to determine an acquisition location and optionally acquisition orientation of each target image, and by a copy of the MIGM system to determine a floor plan for the building and/or other related mapping information for the building (e.g., determined room shapes for rooms of the building, an interconnected group of linked panorama images, etc.)—for example, in order to 'link' at least some of the panoramas and their acquisition locations together (with some corresponding lines 215 between example acquisition locations 210A-210C being shown for the sake of illustration), a copy of the MIGM system may determine relative positional information between pairs of acquisition locations that are visible to each other, store corresponding inter-panorama links (e.g., links 215-AB, 215-BC and 215-AC between acquisition locations 210A and 210B, 210B and 210C, and 210A and 210C, respectively), and in some embodiments and situations further link at least some acquisition locations that are not visible to each other (e.g., a link 215-BE, not shown, between acquisition locations 210B and 210E; a link 215-CM, not shown, between acquisition locations 210C and 210M, etc.). Additional details related to embodiments of generating and using linking information between panorama images, including using travel path information and/or elements or other features visible in multiple images, are included in U.S. Non-Provisional patent application Ser. No. 17/064,601, filed Oct. 7, 2020 and entitled "Connecting And Using Building Data Acquired From Mobile Devices" (which includes disclosure of an example BICA system that is generally directed to obtaining and using linking information to inter-connect multiple panorama images captured within one or more buildings or other structures); in U.S. Non-Provisional patent application Ser. No. 17/080,604, filed Oct. 26, 2020 and entitled "Generating Floor Maps For Buildings From Automated Analysis Of Visual Data Of The Buildings' Interiors"; and in U.S. Provisional Patent Application No. 63/035,619, filed Jun. 5, 2020 and entitled "Automated Generation On Mobile Devices Of Panorama Images For Buildings Locations And Subsequent Use"; each of which is incorporated herein by reference in its entirety.

Various details are provided with respect to FIGS. 1A-1B, but it will be appreciated that the provided details are non-exclusive examples included for illustrative purposes, and other embodiments may be performed in other manners without some or all such details.

Figure 2A:
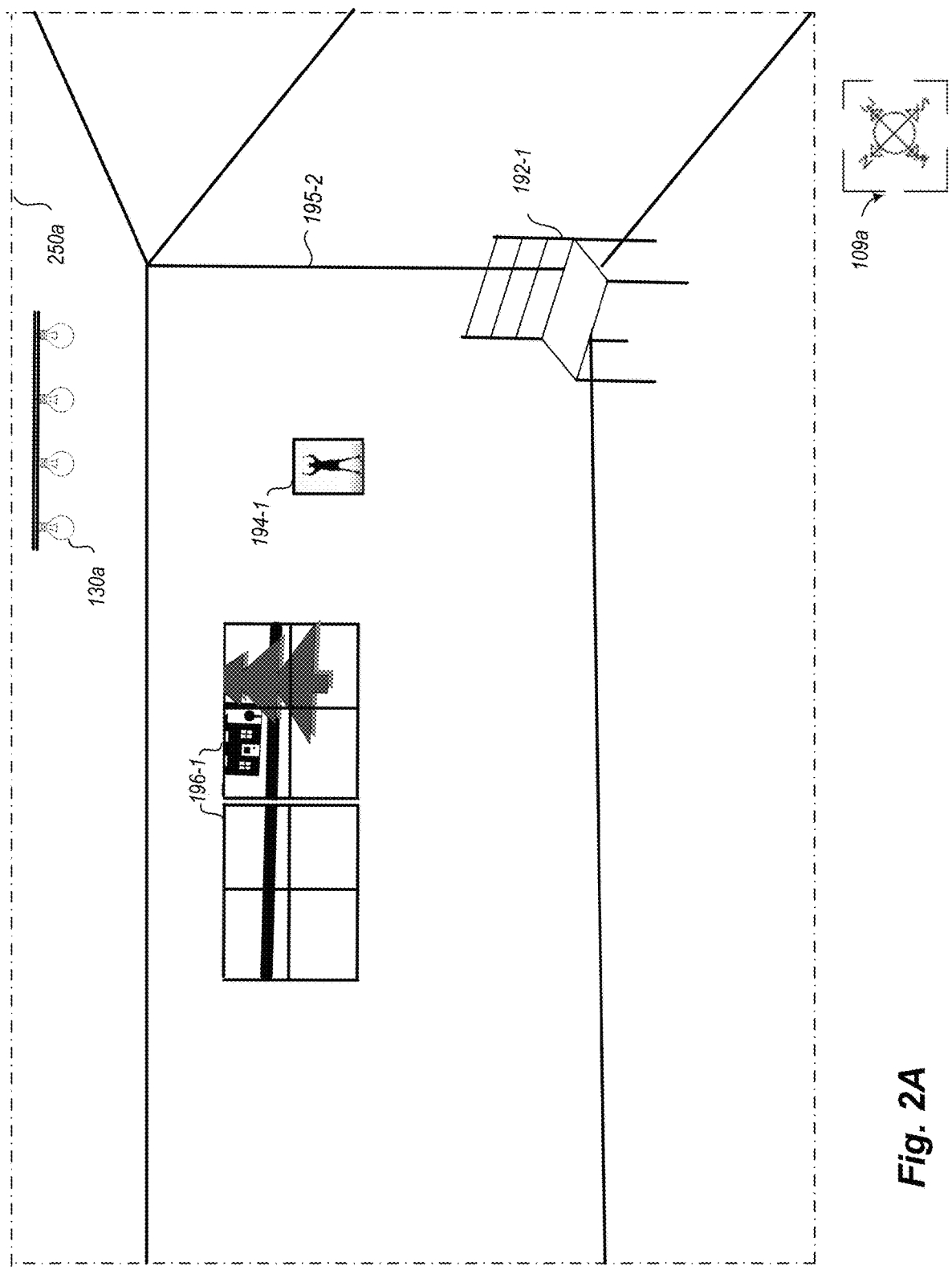
FIGS. 2A-2U illustrate examples of automated operations for generating and presenting information on a floor plan for a building based on images taken in the building interior, such as to automatically determine and present an acquisition location of such an image using data captured from multiple devices.
Figures 2B, 2C:
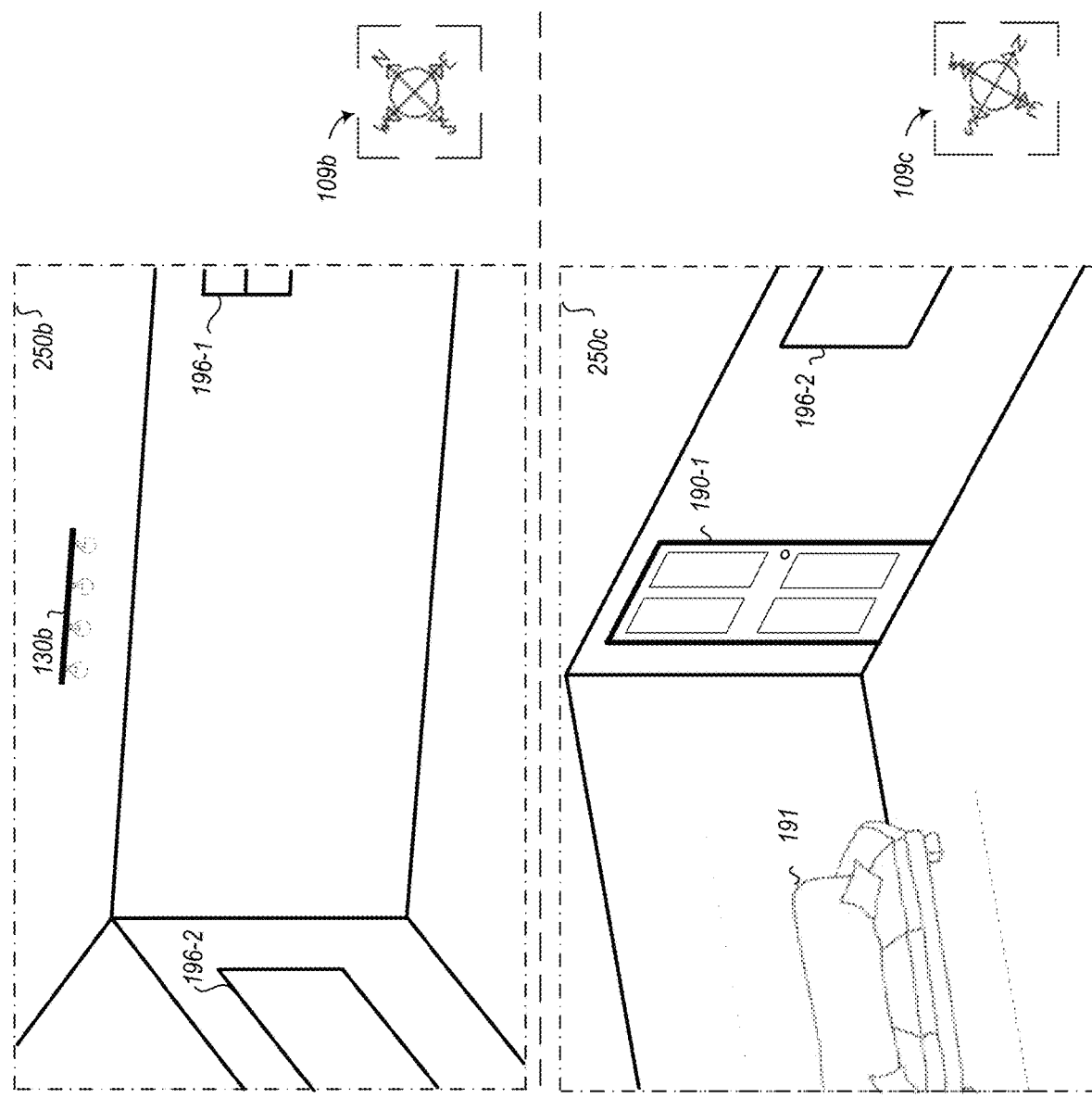
Figure 2D:
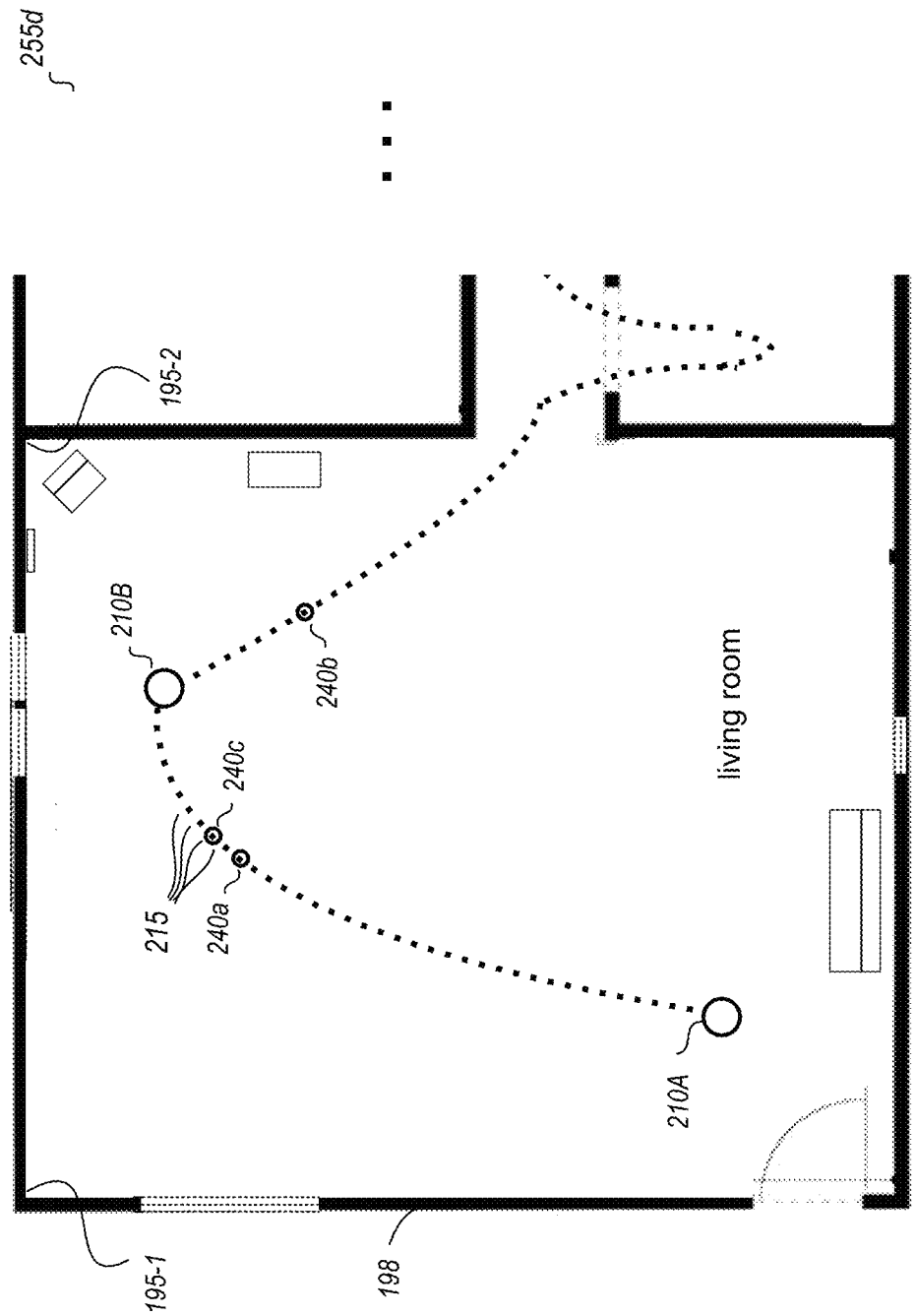
Figures 2E, 2F, 2G, 2H, 2I, 2J:
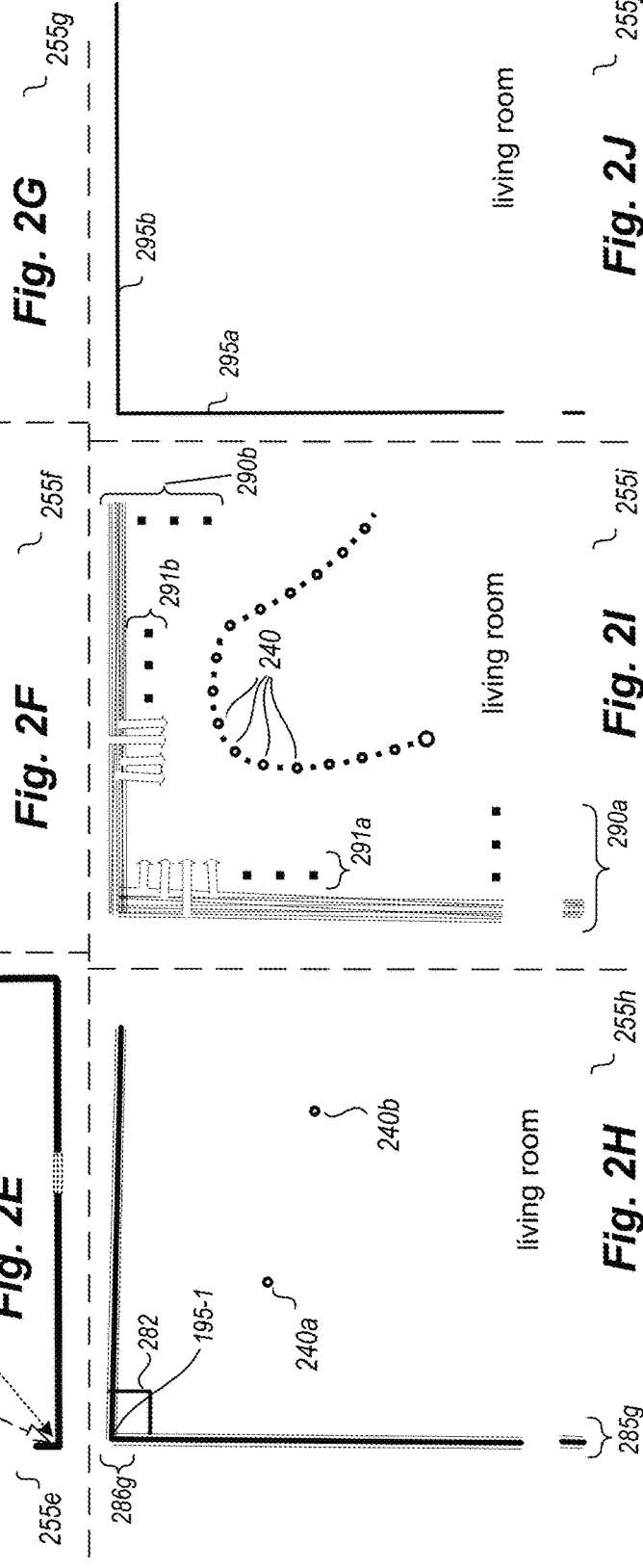
Figure 2K:
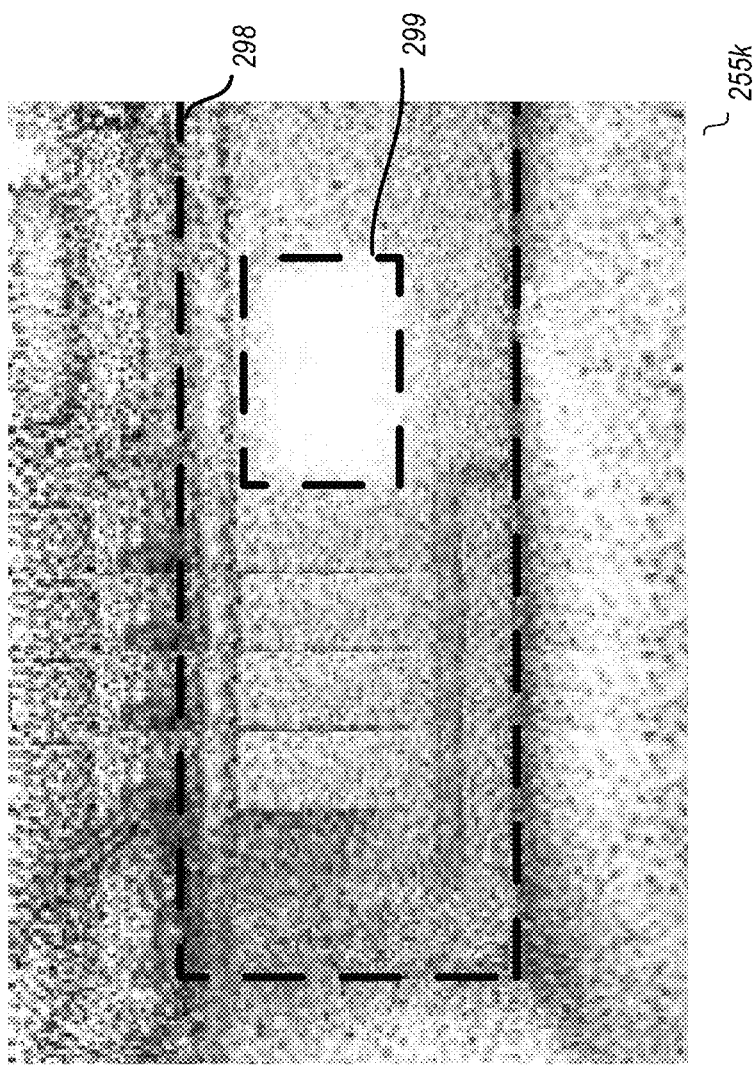
Figure 2L:
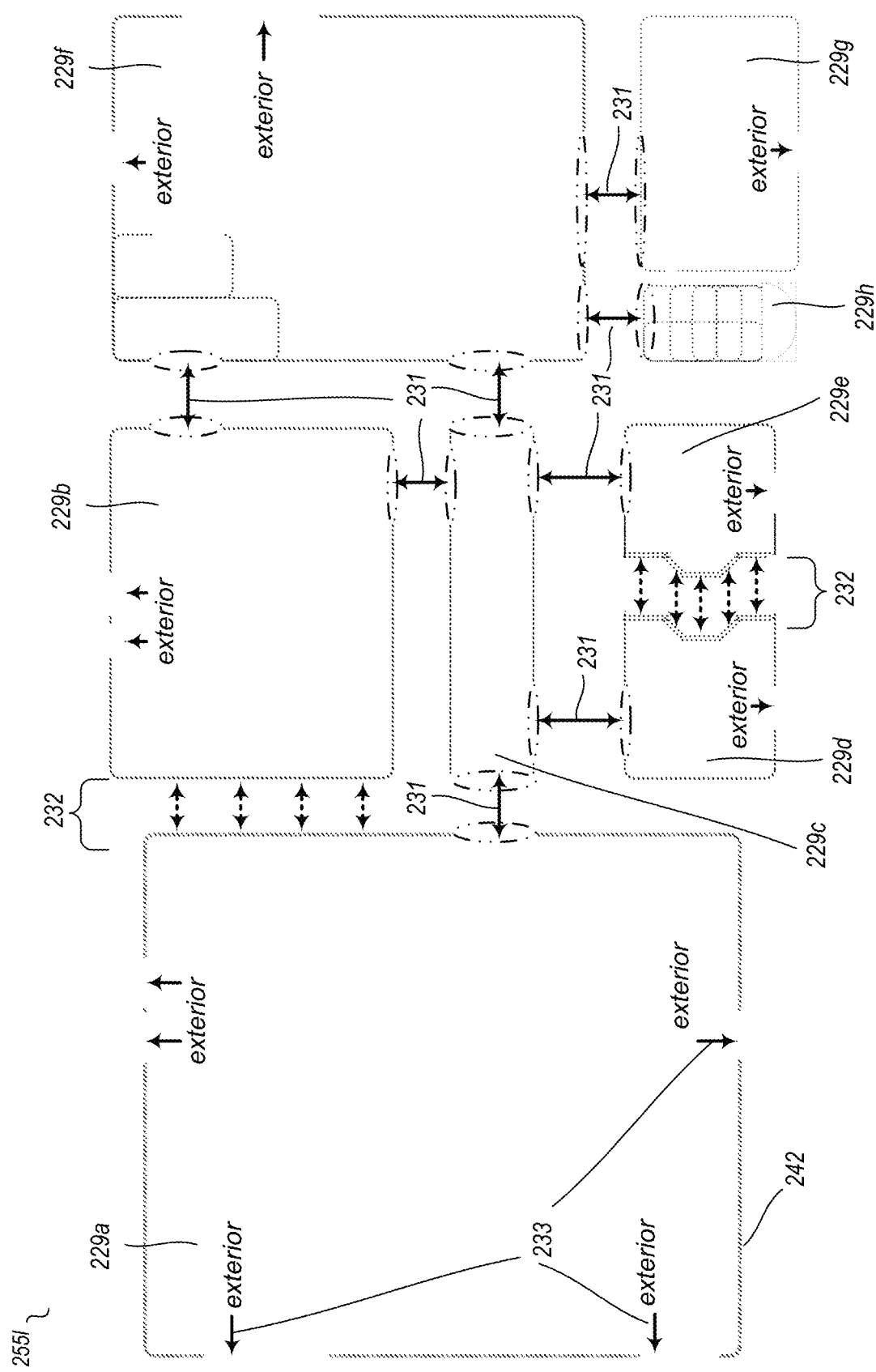
Figure 2M:
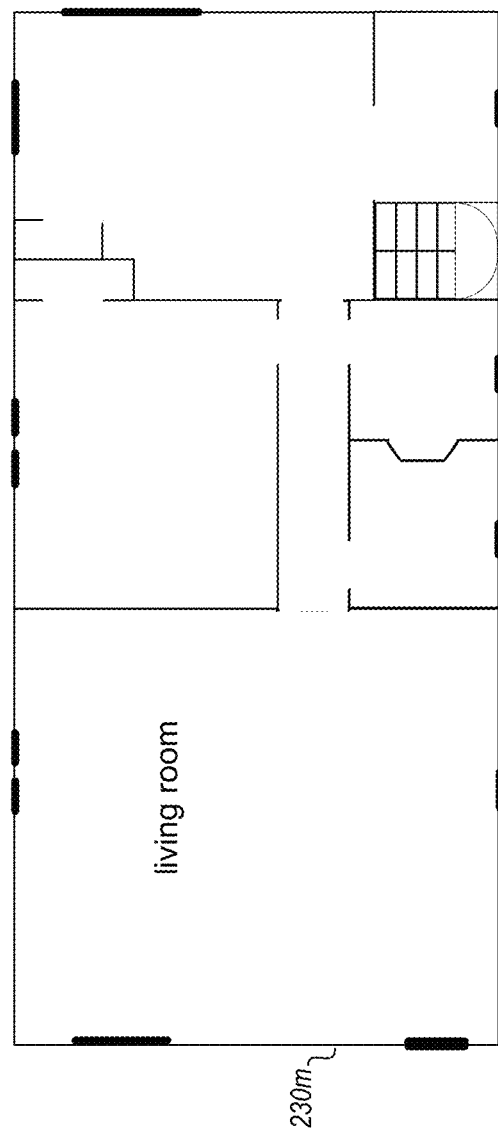
Figure 2N:
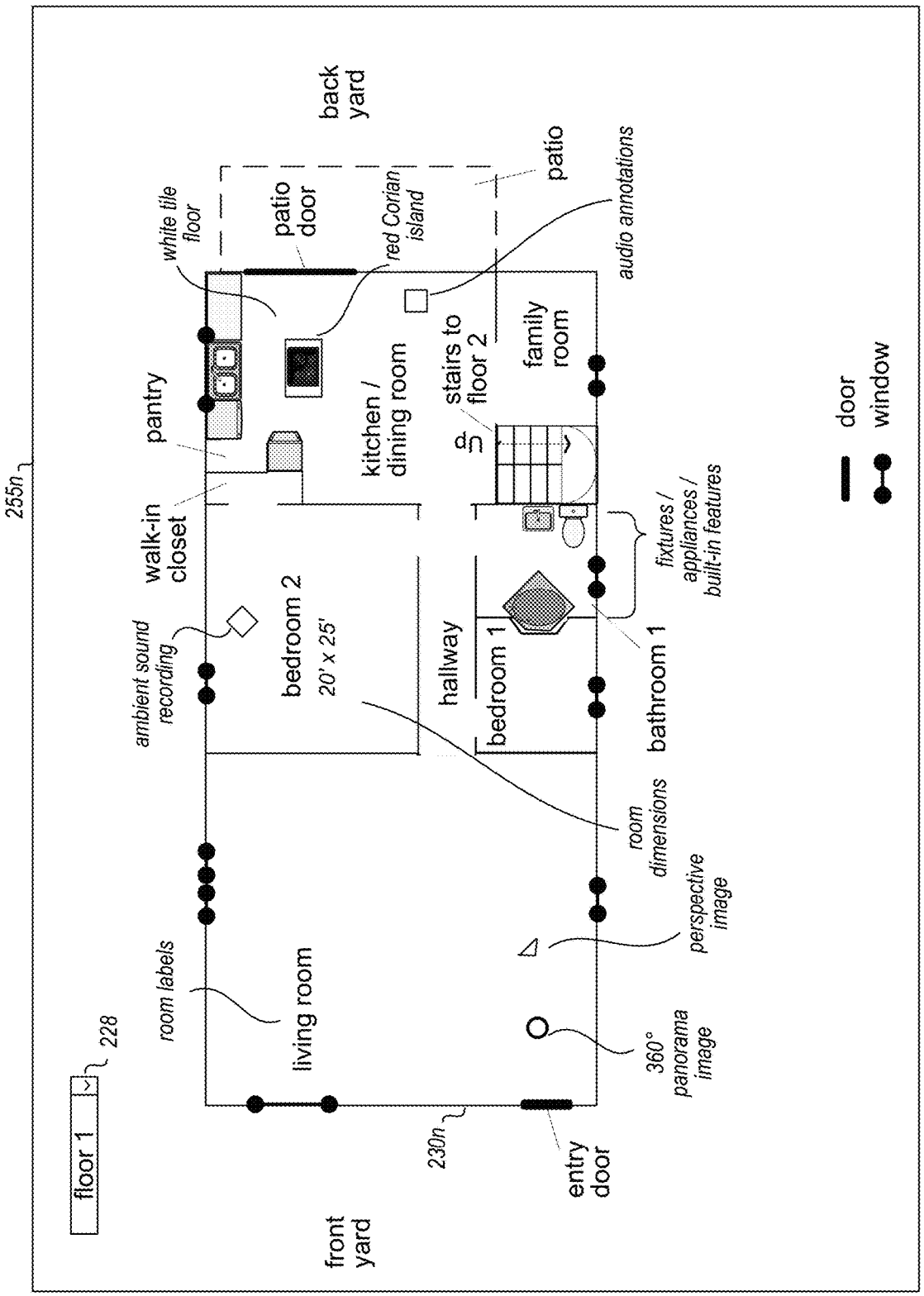
Figure 2S:
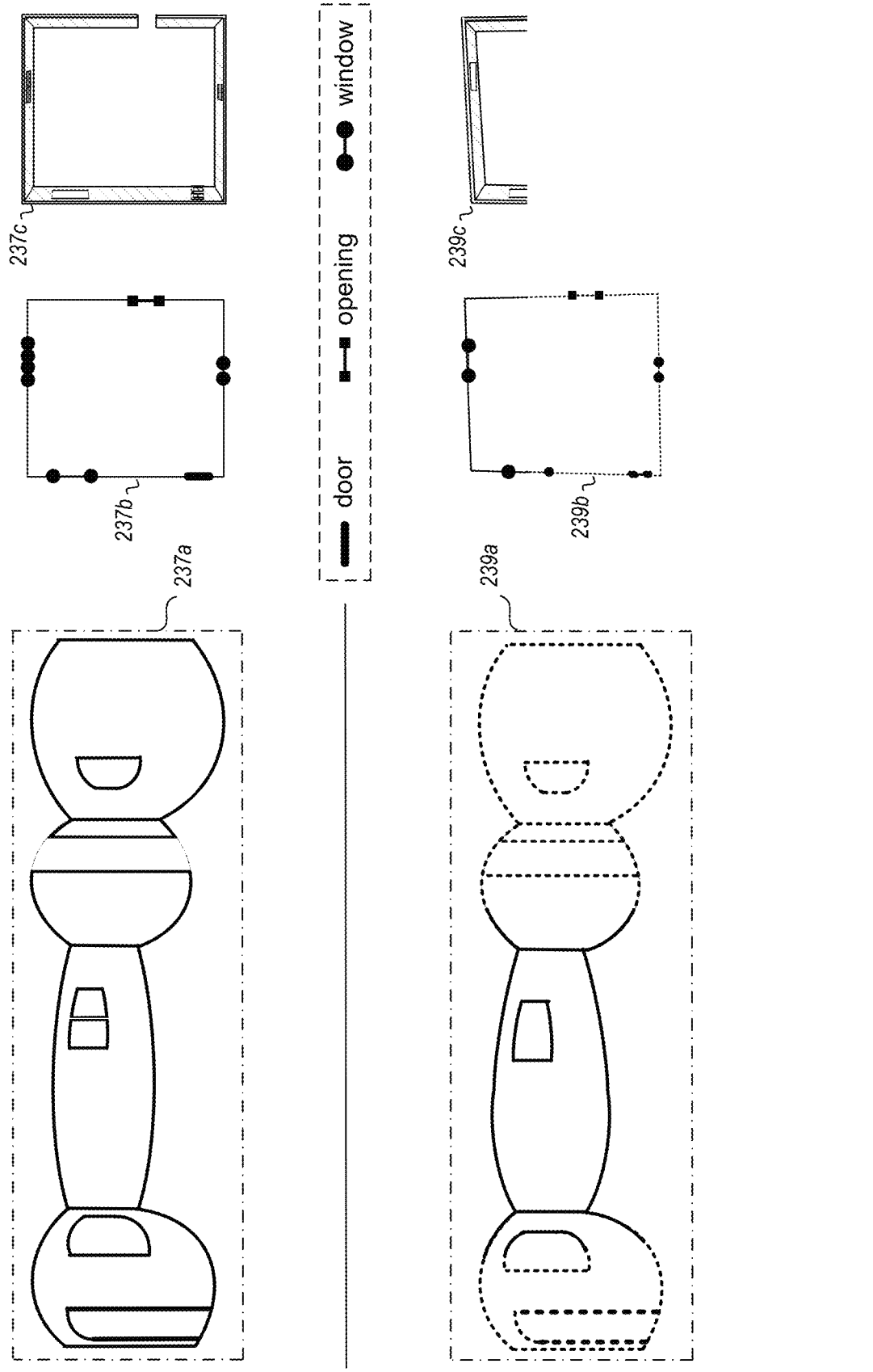
Figure 2T:
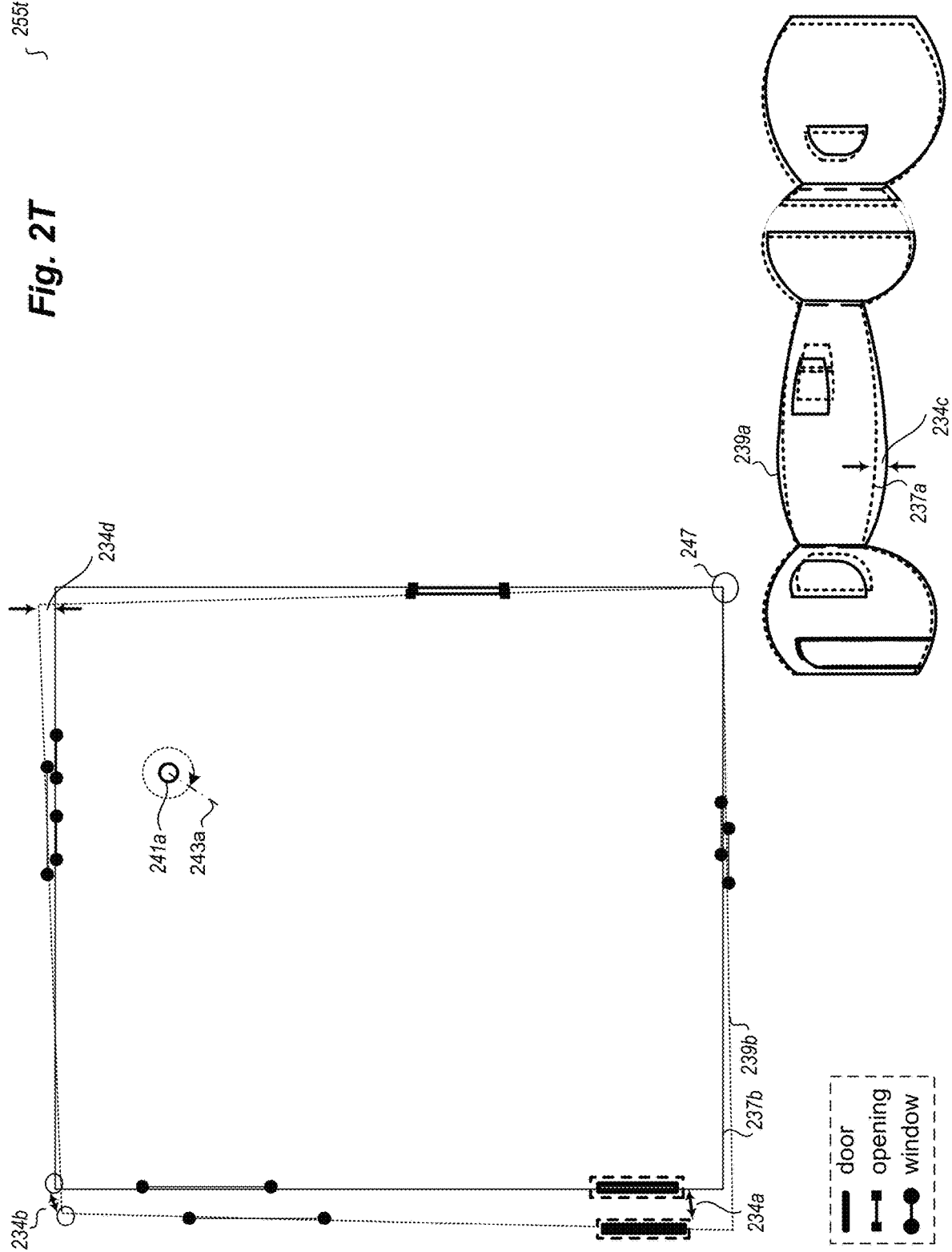
Figure 2U:
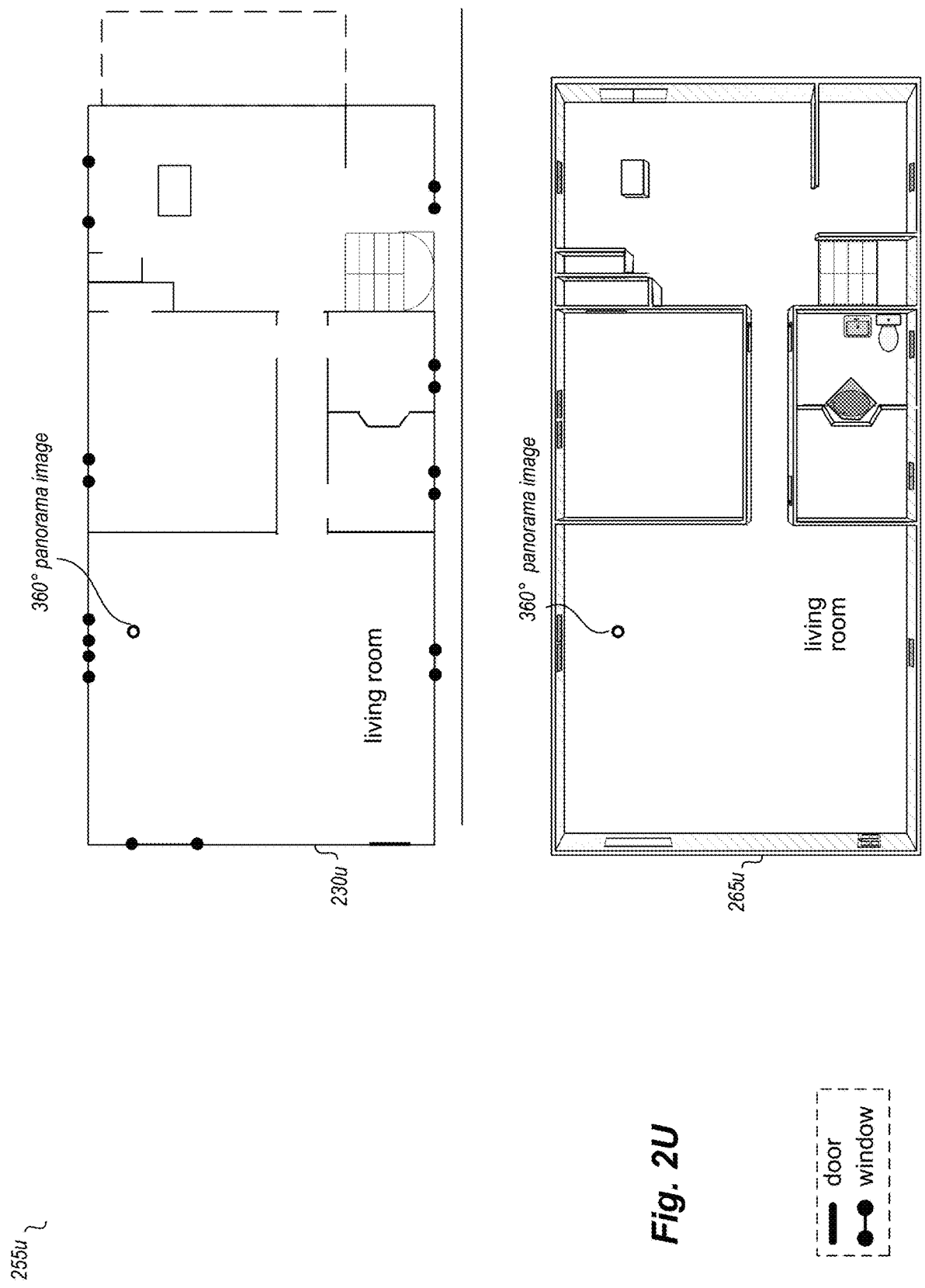

FIGS. 2A-2U illustrate examples of automatically determining acquisition locations and optionally acquisition orientations of target images captured in a building by a camera device, such as within a floor plan of the building that is based in part on determined room shapes of the building's rooms, and further examples of generating and presenting information on the floor plan for the building, such as based on target images captured within the building 198 discussed in FIG. 1B.

In particular, FIG. 2A illustrates an example image 250*a*, such as a non-panorama perspective image captured by the camera device 186 in a northeasterly direction from acquisition location 210B in the living room of house 198 of FIG. 1B (or a northeasterly facing subset view of a 360-degree panorama image taken from that acquisition location and formatted in a rectilinear manner)—the directional indicator 109*a* is further displayed in this example to illustrate the northeasterly direction in which the image is taken. In the illustrated example, the displayed image includes several visible elements (e.g., light fixture 130*a*), furniture (e.g., chair 192-1), two windows 196-1, and a picture 194-1 hanging on the north wall of the living room. No inter-room passages into or out of the living room (e.g., doorways or other wall openings) are visible in this image. However, multiple room borders are visible in the image 250*a*, including horizontal borders between a visible portion of the north wall of the living room and the living room's ceiling and floor, horizontal borders between a visible portion of the east wall of the living room and the living room's ceiling and floor, and the inter-wall vertical border 195-2 between the north and east walls.

FIG. 2B continues the example of FIG. 2A, and illustrates an additional perspective image 250*b* captured by the camera device 186 in a northwesterly direction from acquisition location 210B in the living room of house 198 of FIG. 1B—the directional indicator 109*b* is further displayed to illustrate the northwesterly direction in which the image is taken. In this example image, a small portion of one of the windows 196-1 continues to be visible, along with a portion of window 196-2 and a new lighting fixture 130*b*. In addition, horizontal and vertical room borders are visible in image 250*b* in a manner similar to that of FIG. 2A.

FIG. 2C continues the examples of FIGS. 2A-2B, and illustrates a third perspective image 250*c* captured by the camera device 186 in a southwesterly direction in the living room of house 198 of FIG. 1B, such as from acquisition location 210B—the directional indicator 109*c* is further displayed to illustrate the southwesterly direction in which the image is taken. In this example image, a portion of window 196-2 continues to be visible, as is a couch 191 and visual horizontal and vertical room borders in a manner similar to that of FIGS. 2A and 2B. This example image further illustrates a wall opening passage into/out of the living room, which in this example is a doorway 190-1 to enter and leave the living room (which FIG. 1B identifies as a door to the exterior of the house). It will be appreciated that a variety of other perspective images may be taken from acquisition location 210B and/or other acquisition locations and displayed in a similar manner.

FIG. 2D illustrates further information 255d for a portion of the house 198 of FIG. 1B, including the living room and limited portions of the further rooms to the east of the living room. As discussed with respect to FIGS. 1B and 2A-2C, in some embodiments, target panorama images may be captured at various locations in the house interior, such as at locations 210A and 210B in the living room, with corresponding visual contents of one or both such resulting target panorama images subsequently used to determine a room shape of the living room. In addition, in at least some embodiments, additional images may be captured, such as if mobile computing device 185 (not shown) is capturing video or one or more other sequences of continuous or near-continuous images as it moves through the interior of the house. In this example, information is illustrated for a portion of the path 115 illustrated in FIG. 1B, and in particular illustrates a sequence of locations 215 along the path at which one or more video frame images (or other sequence of continuous or near-continuous images) may be captured (e.g., if video data is being captured) of the surrounding interior of the house while the mobile computing device 185 is moved—examples of such locations include capture locations 240a-c, with further information related to video frame images captured from those locations shown in FIGS. 2E-2J. In this example, the locations 215 along the path are shown as being separated by short distances (e.g., a foot, an inch, a fraction of an inch, etc.), although it will be appreciated that video capture may be substantially continuous—thus, in at least some embodiments, only a subset of such captured video frame images (or other images from a sequence of continuous or near-continuous images) may be selected and used for further analysis, such as images that are separated by defined distances and/or that are separated by a defined amount of time between their capture (e.g., a second, a fraction of a second, multiple seconds, etc.) and/or based on other criteria.

FIGS. 2E-2J continue the examples of FIGS. 2A-2D, and illustrate additional information about the living room and about analyzing 360° image frames from the video captured along the path 155 by the mobile computing device as part of determining one type of estimate of the likely shape of the room. While not illustrated in these figures, similar techniques could be performed for target panorama images captured at two or more of acquisition locations 210A, 210B and 210C by the camera device, whether in addition to analysis of the additional image frames illustrated in FIG. 2D (e.g., to generate an additional estimate of the likely shape of the room using the visual data of the target images) or instead of the analysis of the additional image frames illustrated in FIG. 2D. In particular, FIG. 2E includes information 255e illustrating that a 360° image frame taken from location 240b will share information about a variety of visible 2D features with that of a 360° image frame taken from location 240a, although only a limited subset of such features are illustrated in FIG. 2E for a portion of the living room for the sake of simplicity. In FIG. 2E, example lines of sight 228 from location 240b to various example features in the room are shown, and similar example lines of sight 227 from location 240a to corresponding features are shown, which illustrate degrees of difference between the views at significantly spaced capture locations. Accordingly, analysis of the sequence of images corresponding to locations 215 of FIG. 2D using SLAM and/or MVS and/or SfM techniques may provide a variety of information about the features of the living room, including information about associated planes of the features and normal orthogonal directions from the planes, as illustrated further with respect to FIGS. 2F-2I.

In particular, FIG. 2F illustrates information 255f about the northeast portion of the living room that is visible in subsets of 360° image frames taken from locations 240a and 240b, and FIG. 2G illustrates information 255g about the northwest portion of the living room that is visible in other subsets of 360° image frames taken from locations 240a and 240b, with various example features in those portions of the living room being visible in both 360° image frames (e.g., corners 195-1 and 195-2, windows 196-1 and 196-2, etc.). As part of the automated analysis of the 360° image frames using the SLAM and/or MVS and/or SfM techniques, information about planes 286e and 286f corresponding to portions of the northern wall of the living room may be determined from the features that are detected, and information 287e and 285f about portions of the east and west walls of the living room may be similarly determined from corresponding features identified in the images. In addition to identifying such plane information for detected features (e.g., for each point in a determined sparse 3D point cloud from the image analysis), the SLAM and/or MVS and/or SfM techniques may further determine information about likely locations and orientations/directions 220 for the image subsets from capture location 240a, and likely locations and orientations/directions 222 for the image subsets from capture location 240b (e.g., locations 220g and 222g in FIG. 2F of the capture locations 240a and 240b, respectively, and optionally directions 220e and 222e for the image subsets shown in FIG. 2F; and corresponding locations 220g and 222g in FIG. 2G of the capture locations 240a and 240b, respectively, and optionally directions 220f and 222f for the image subsets shown in FIG. 2G). While only features for part of the living room are illustrated in FIGS. 2F and 2G, it will be appreciated that the other portions of the 360° image frames corresponding to other portions of the living room may be analyzed in a similar manner, in order to determine possible information about possible planes for the various walls of the room, as well as for other features (not shown) in the living room. In addition, similar analyses may be performed between some or all other images at locations 215 in the living room that are selected for use, resulting in a variety of determined feature planes from the various image analyses that may correspond to walls of the room.

FIG. 2H continues the examples of FIGS. 2A-2G, and illustrates information 255h about a variety of determined feature planes that may correspond to the west and north walls of the living room, from analyses of the 360° image frames captured at locations 240a and 240b. The illustrated plane information includes determined planes 286g near or at the northern wall (and thus corresponding possible locations of the northern wall), and determined planes 285g near or at the western wall (and thus corresponding possible locations of the western wall). As would be expected, there are a number of variations in different determined planes for the northern and western walls from different features detected in the analysis of the two 360° image frames, such as differences in position, angle and/or length, causing uncertainty as to the actual exact position and angle of each of the walls. While not illustrated in FIG. 2H, it will be appreciated that similar determined feature planes for the other walls of the living room would similarly be detected, along with determined feature planes corresponding to features that are not along the walls (e.g., furniture).

FIG. 2I continues the examples of FIGS. 2A-2H, and illustrates information 255i about additional determined feature planes that may correspond to the west and north walls of the living room, from analyses of various additional 360° image frames selected from additional locations 215 along the path 115 in the living room—as would be expected, the analyses of the further images provides even greater variations in different determined planes for the northern and western walls in this example. FIG. 2I further illustrates additional determined information that is used to aggregate information about the various determined feature planes in order to identify likely locations 295a and 295b of the west and north walls, as illustrated in information 255j of FIG. 2J. In particular, FIG. 2I illustrates information 291a about normal orthogonal directions for some of the determined feature planes corresponding to the west wall, along with additional information 290a about those determined feature planes. In the example embodiment, the determined feature planes are clustered to represent hypothesized wall locations of the west wall, and the information about the hypothesized wall locations is combined to determine the likely wall location 295a, such as by weighting information from the various clusters and/or the underlying determined feature planes. In at least some embodiments, the hypothesized wall locations and/or normal information is analyzed via use of machine learning techniques to determine the resulting likely wall location, optionally by further applying assumptions or other constraints (such as a 90° corner, as illustrated in information 282 of FIG. 2H, and/or having flat walls) as part of the machine learning analysis or to results of the analysis. Similar analysis may be performed for the north wall using information 290b about corresponding determined feature planes and additional information 291b about resulting normal orthogonal directions for at least some of those determined feature planes. FIG. 2J illustrates the resulting likely wall locations 295a and 295b for the west and north walls of the living room, respectively.

While not illustrated in FIG. 2I, it will be appreciated that similar determined feature planes and corresponding normal directions for the other walls of the living room will similarly be detected and analyzed to determine their likely locations, resulting in an estimated overall room shape for the living room that is based on visual data acquired by the mobile computing device 185 in the living room. In addition, similar analyses are performed for each of the rooms of the building, providing estimated room shapes of each of the rooms. Furthermore, while not illustrated in FIG. 2D-2J, the analysis of the visual data captured by the mobile computing device may be supplemented and/or replaced in some embodiments by analysis of depth data (not shown) captured by the mobile computing device in the living room, such as to directly generate an estimated 3D point cloud from the depth data that represents the walls and optionally ceiling and/or floor of the living room and/or to directly generate estimated planar surfaces from the depth data that represent the walls and optionally ceiling and/or floor of the living room. While also not illustrated in FIGS. 2D-2J, other room shape estimation operations may be performed in at least some embodiments using only a single target panorama image, such as via an analysis of the visual data of that target panorama image by one or more trained neural networks, as discussed in greater detail elsewhere herein.

FIG. 2K continues the examples of FIGS. 2A-2J, and illustrates information 255k about additional information that may be generated from one or more images in a room and used in one or more manners in at least some embodiments. In particular, images (e.g., video frames) captured in the living room of the house 198 may be analyzed in order to determine an estimated 3D shape of the living room, such as from a 3D point cloud of features detected in the video frames (e.g., using SLAM and/or SfM and/or MVS techniques, and optionally further based on IMU data captured by the mobile computing device 185). In this example, information 255k reflects an example portion of such a point cloud for the living room, such as in this example to correspond to a northwesterly portion of the living room (e.g., to include northwest corner 195-1 of the living room, as well as windows 196-1) in a manner similar to image 250c of FIG. 2C. Such a point cloud may be further analyzed to determine planar areas, such as to correspond to walls, the ceiling, floor, etc., as well as in some cases to detect features such as windows, doorways and other inter-room openings, etc.—in this example, a first planar area 298 corresponding to the north wall of the living room is identified, with a second planar area 299 corresponding to windows 196-1 being further identified. It will be appreciated that in other embodiments such an estimated 3D shape of the living room may be determined by using depth data captured by the mobile computing device 185 in the living room, whether in addition to or instead of using visual data of one or more images captured by the camera device 186 and/or mobile computing device 185 in the living room. In addition, it will be appreciated that various other walls and other features may be similarity identified in the living room and in the other rooms of the house 198.

FIG. 2L illustrates additional information 255l corresponding to, after estimated room shapes are determined for the rooms of the illustrated floor of the house 198, positioning the rooms' estimated room shapes relative to each other, based at least in part in this example on connecting inter-room passages between rooms and matching room shape information between adjoining rooms—in at least some embodiments, such information may be treated as constraints on the positioning of the rooms, and an optimal or otherwise preferred solution is determined for those constraints. Examples of such constraints in FIG. 2L include matching 231 connecting passage information (e.g., passages detected in the automated image analyses discussed with respect to FIGS. 2E-2J and/or FIGS. 2P-2U) for adjacent rooms so that the locations of those passages are co-located, and matching 232 shapes of adjacent rooms in order to connect those shapes (e.g., as shown for rooms 229d and 229e, and for rooms 229a and 229b). Various other types of information may be used in other embodiments for room shape positions, whether in addition to or instead of passage-based constraints and/or room shape-based constraints, such as exact or approximate dimensions for an overall size of the house (e.g., based on additional metadata available regarding the building, analysis of images from one or more image acquisition locations external to the building, etc.). House exterior information 233 may further be identified and used as constraints (e.g., based at least in part of automated identification of passages and other features corresponding to the building exterior, such as windows), such as to prevent another room from being placed at a location that has been identified as the building's exterior.

FIGS. 2M through 2-O continue the examples of FIG. 2A-2L, and illustrate mapping information that may be generated from the types of analyses discussed in FIGS.

2A-2L and FIGS. 2P-2U. In particular, FIG. 2M illustrates an example floor plan 230*m* that may be constructed based on the positioning of determined estimated room shapes, which in this example includes walls and indications of doorways and windows. In some embodiments, such a floor plan may have further information shown, such as about other features that are automatically detected by the analysis operations and/or that are subsequently added by one or more users. For example, FIG. 2N illustrates a modified floor plan 230*n* that includes additional information of various types, such as may be automatically identified from analysis operations of visual data from images and/or from depth data, and added to the floor plan 230*m*, including one or more of the following types of information: room labels (e.g., "living room" for the living room), room dimensions, visual indications of fixtures or appliances or other built-in features, visual indications of positions of additional types of associated and linked information (e.g., of panorama images and/or perspective images acquired at specified acquisition positions, which an end user may select for further display; of audio annotations and/or sound recordings that an end user may select for further presentation; etc.), visual indications of doorways and windows, etc.—in other embodiments and situations, some or all such types of information may instead be provided by one or more MIGM system operator users and/or ICA system operator users and/or ILDM system operator users. In addition, when the floor plans 230*m* and/or 230*n* are displayed to an end user, one or more user-selectable controls may be added to provide interactive functionality as part of a GUI (graphical user interface) screen 255*n*, such as to indicate a current floor that is displayed, to allow the end user to select a different floor to be displayed, etc., with a corresponding example user-selectable control 228 added to the GUI in this example—in addition, in some embodiments, a change in floors or other levels may also be made directly from the displayed floor plan, such as via selection of a corresponding connecting passage (e.g., a stairway to a different floor), and other visual changes may be made directly from the displayed floor plan by selecting corresponding displayed user-selectable controls (e.g., to select a control corresponding to a particular image at a particular location, and to receive a display of that image, whether instead of or in addition to the previous display of the floor plan from which the image is selected). In other embodiments, information for some or all different floors may be displayed simultaneously, such as by displaying separate sub-floor plans for separate floors, or instead by integrating the room connection information for all rooms and floors into a single floor plan that is shown together at once. It will be appreciated that a variety of other types of information may be added in some embodiments, that some of the illustrated types of information may not be provided in some embodiments, and that visual indications of and user selections of linked and associated information may be displayed and selected in other manners in other embodiments.

FIG. 2-O continues the examples of FIGS. 2A-2N, and Illustrates additional information 265*o* that may be generated from the automated analysis techniques disclosed herein and displayed (e.g., in a GUI similar to that of FIG. 2N), which in this example is a 2.5D or 3D model floor plan of the house. Such a model 265*o* may be additional mapping-related information that is generated based on the floor plan 230*m* and/or 230*n*, with additional information about height shown in order to illustrate visual locations in walls of features such as windows and doors. While not illustrated in FIG. 2-O, additional information may be added to the displayed walls in some embodiments, such as from images taken during the video capture (e.g., to render and illustrate actual paint, wallpaper or other surfaces from the house on the rendered model 265), and/or may otherwise be used to add specified colors, textures or other visual information to walls and/or other surfaces.

Additional details related to embodiments of a system providing at least some such functionality of an MIGM system or related system for generating floor plans and associated information and/or presenting floor plans and associated information, and/or of a system providing at least some such functionality of an ILDM system or related system for determining acquisition positions of images, are included in U.S. Non-Provisional patent application Ser. No. 16/190,162, filed Nov. 14, 2018 and entitled "Automated Mapping Information Generation From Inter-Connected Images" (which includes disclosure of an example Floor Map Generation Manager, or FMGM, system that is generally directed to automated operations for generating and displaying a floor map or other floor plan of a building using images acquired in and around the building); in U.S. Non-Provisional patent application Ser. No. 16/681,787, filed Nov. 12, 2019 and entitled "Presenting Integrated Building Information Using Three-Dimensional Building Models" (which includes disclosure of an example FMGM system that is generally directed to automated operations for displaying a floor map or other floor plan of a building and associated information); in U.S. Non-Provisional patent application Ser. No. 16/841,581, filed Apr. 6, 2020 and entitled "Providing Simulated Lighting Information For Three-Dimensional Building Models" (which includes disclosure of an example FMGM system that is generally directed to automated operations for displaying a floor map or other floor plan of a building and associated information); in U.S. Non-Provisional patent application Ser. No. 17/080, 604, filed Oct. 26, 2020 and entitled "Generating Floor Maps For Buildings From Automated Analysis Of Visual Data Of The Buildings' Interiors" (which includes disclosure of an example Video-To-Floor Map, or VTFM, system that is generally directed to automated operations for generating a floor map or other floor plan of a building using video data acquired in and around the building); in U.S. Provisional Patent Application No. 63/035,619, filed Jun. 5, 2020 and entitled "Automated Generation On Mobile Devices Of Panorama Images For Buildings Locations And Subsequent Use"; in U.S. Non-Provisional patent application Ser. No. 17/069,800, filed Oct. 13, 2020 and entitled "Automated Tools For Generating Building Mapping Information"; in U.S. Non-Provisional patent application Ser. No. 16/807, 135, filed Mar. 2, 2020 and entitled "Automated Tools For Generating Mapping Information For Buildings" (which includes disclosure of an example MIGM system that is generally directed to automated operations for generating a floor map or other floor plan of a building using images acquired in and around the building); in U.S. Non-Provisional patent application Ser. No. 17/013,323, filed Sep. 4, 2020 and entitled "Automated Analysis Of Image Contents To Determine The Acquisition Location Of The Image" (which includes disclosure of an example Image Location Mapping Manager, or ILMM, system that is generally directed to automated operations for determining acquisition positions of images); and in U.S. Provisional Patent Application No. 63/117,372, filed Nov. 23, 2020 and entitled "Automated Determination Of Image Acquisition Locations In Building Interiors Using Determined Room Shapes" (which includes disclosure of an example Image Location Determination Manager, or ILDM, system that is generally directed to automated operations for determining acquisition positions of images); each of which is incorporated herein by reference in its entirety.

FIGS. 2P-2U continue the examples of FIGS. 2A through 2-O, with FIG. 2P illustrating further information 230p that shows the living room of the house 198 of FIG. 1B, along with information about a target image acquired by the camera device, whose acquisition position information will be determined by the automated operations of the ILDM system. In this example, the target image acquisition corresponds to acquisition location 210B illustrated in FIG. 1B, and in particular occurs at acquisition location 241a shown in FIG. 2P by camera device 186 with a starting orientation direction 243a (e.g., if the camera device is initially pointed in that orientation direction and is then rotated 360° at acquisition location 241a). FIG. 2P further illustrates a nearby location 241b at which the associated mobile computing device 185 acquires a further image with orientation direction 243b, such as at a time similar to that of the acquisition time for the target image. A previous target image may have also been acquired at acquisition location 210A of the living room at a previous time, with its acquisition position information (not shown) being previously determined. In addition, FIG. 2P illustrates additional movement information 244 of the mobile computing device, which in this example corresponds to a user (not shown) placing the camera device 186 at acquisition location 241a (e.g., on a tripod or other mount on which the camera device will perform a 360° rotation, on a fixed tripod or other mount if the camera device 186 includes one or more wide-angle lens that allow 360° of horizontal visual coverage to be simultaneously captured, etc.), and then moving to a location where the user is not visible to the camera device 186 at acquisition location 241a (e.g., down the hallway) before returning to the acquisition location 241a to recover the camera device 186—in other embodiments, such movement data 244 may not be collected for that purpose (e.g., if the target images acquired by the user holding the camera device and rotating the user's body in a 360° circle, and thus not leaving the acquisition location area during the acquisition of the target image), but as discussed in greater detail elsewhere herein, if such movement of the mobile computing device occurs, the movement information 244 may be tracked by the mobile computing device (e.g., by one or more IMU sensors, by visual data from one or more image sensors, etc.) and used as part of determining at least the acquisition location 241a of the target image.

FIGS. 2Q and 2R continue the example of FIG. 2P, with FIG. 2Q illustrating the target image 250q that is acquired at the acquisition location 241a by the camera device 186, which in this example is a 360° panorama image (shown in FIG. 2Q using a spherical format to simultaneously show all 360° horizontally of visual content of the target image). In addition, FIG. 2R illustrates visual data of the further image captured by the associated mobile computing device 185 in the living room of the house 198, which in this example is a 180° panorama image 255r (shown in a rectilinear format in the example of FIG. 2R), although in other situations may be a non-panoramic perspective image (e.g., example image 250d of FIG. 2R, which is shown as a subset of the image 255r in this example). As illustrated in example further image 255r, the visual data of the further image may include some or all of the camera device 186, and may be further used as part of the determining of the acquisition position information for the target image, such as by identifying one or more optional markers 257 on the camera device 186 in the visual data of the further image and/or by identifying the camera device itself (e.g., identifying its shape) in the visual data of the further image—for example, the automated determination of the acquisition position information for the target image may include identifying an offset distance 238a between the location at which the image 255r is acquired and/or identifying an offset orientation 238b between the orientation 243a at which the target image is acquired and the additional orientation 243b at which the further image is acquired, with the offset information used to determine relative acquisition position information for the camera device 186 for the target image relative to that of the mobile computing device for the further image. Alternatively, if the further image was instead the example image 250d, such visual information about the camera device 186 may not be available in this example.

After being supplied the target image and further captured data, the ILDM system may perform various automated operations to use the visual contents of the target image from the camera device and the additional data from the mobile computing device to determine the acquisition position of the target image, including in some cases to determine that the target image is captured in the living room (rather than in another room of the building 198, or in some cases, in other rooms of other buildings) and to determine the specific acquisition location and orientation of the target image within the living room, with such a determined acquisition position of the target image subsequently overlaid on a displayed partial or full floor plan of the building that includes at least a determined room shape of the living room.

In particular, FIG. 2S continues the examples of FIGS. 2P-2R, and includes information 255s that illustrates one or more types of estimated room shape information 237 for the living room based on an analysis by the ILDM system of the visual data of the target image captured by the camera device—in particular, in this example, the estimated room shape information 237 includes information 237a about structural wall elements identified in the visual data (e.g., wireframe lines of the room outline), and/or information 237b to show a 2D estimated room shape for the living room, and/or information 237c to show a 3D estimated room shape for the living room. In this example, the locations of structural wall elements such as windows and doorways and other wall openings may be automatically identified and shown on the room shape information 237b and/or 237c. As discussed in greater detail elsewhere herein, the estimation of the room shape for the living room from the visual data of the target image may be performed in various manners. FIG. 2S further illustrates one or more additional types of estimated room shape information 239 for the living room based on an analysis by the ILDM system of the additional data captured by the mobile computing device—in particular, in this example, the estimated room shape information 239 includes information 239a about structural wall elements identified in the visual data, and/or information 239b to show a 2D estimated room shape for the living room, and/or information 239c to show a 3D estimated room shape for the living room. In this example, the estimated room shape information 239a and 239b includes solid lines to correspond to the portion of the living room visible in the further image 255r of FIG. 2R, while estimated room shape information 239c only includes information to correspond to that portion of the living room—however, if other further images (not shown) have visual data for other parts of the living room, then a combination of the visual data from the multiple further images may further include information shown in dotted lines in the estimated room shape information 239a and 239b, and may be used to add additional information to the estimated room shape information 239c. It will be appreciated that the automated determination of the estimated room shape information 237 and 239 may not produce perfect room shapes, such that differences may exist between the estimated room shape information 237 and 239.

FIG. 2T continues the examples of FIGS. 2P-2S, and includes information 255t that illustrates some of the further automated operations of the ILDM system when comparing the multiple estimated room shapes 237 and 239 of FIG. 2S. As discussed in greater detail elsewhere herein, a variety of matching criteria may be used in determining a fit between two room shapes. As one example, distances between one or more (e.g., all) matching corners of the estimated room shape and determined room shape may be measured, such as shown 234b for the two corners in the upper left (northwest) corners, with the smaller the distance reflecting the better the match (and in some embodiments, the higher the matching score)—while not shown for the other corners in this example, their distances for matching corners may be similarly measured and assessed. As another example, distances between one or more (e.g., all) corresponding wireframe structural lines of the estimated room shape and determine room shape may be measured, such as shown 234c for the two wireframes corresponding to the border of the northern wall to the floor, with the smaller the distance reflecting the better the match (and in some embodiments, the higher the matching score)—while not shown for the other structural lines in this example, their distances between corresponding lines may be similarly measured and assessed. As yet another example, distances between one or more (e.g., all) structural wall elements identified in the estimated room shape may be measured (e.g., using corresponding 3D bounding boxes for those structural wall element objects), such as shown 234a for the two doorways at the lower left side of the rooms, and with the smaller the distance reflecting the better the match (and in some embodiments, the higher the matching score), although the entire bounding box areas may be compared in other embodiments (e.g., using an intersection-over-union distance measurement)—while not shown for other structural element objects in this example, their distances between corresponding bounding box portions may be similarly measured and assessed. As another example, distances between one or more (e.g., all) corresponding walls of the multiple room shapes may be measured, such as shown 234d for the two walls on the top side of the room shapes, with the smaller the distance reflecting the better the match (and in some embodiments, the higher the matching score)—while not shown for other walls in this example, their distances between corresponding walls may be similarly measured and assessed. Various other criteria may be accessed and used, whether in addition to or instead of some or all of the illustrated criteria, as discussed in greater detail elsewhere herein. The various distance offsets between the multiple room shapes may be combined and used to determine where the target image's acquisition location 241a and optionally acquisition orientation 243a within the room shape information occurs—it will be appreciated that while only two degrees of freedom are shown in FIG. 2T for each of the acquisition location and orientation, that the actual determined acquisition location and orientation information may be determined with three degrees of freedom for each of the acquisition location and orientation (e.g., a height of the acquisition location above the floor, and an upward or downward angle from that acquisition location height for the acquisition position). In addition, once the acquisition position information is determined for such a target image, it may be shown on updated versions of the floor plan for the building, such as illustrated for updated floor plans 230u and 265u in information 255u of FIG. 2U.

Various details have been provided with respect to FIGS. 2A-2U, but it will be appreciated that the provided details are non-exclusive examples included for illustrative purposes, and other embodiments may be performed in other manners without some or all such details.

As a non-exclusive example embodiment, the automated operations of the ILDM system may include the following operations to determine acquisition positions (e.g., acquisition locations and optionally acquisition orientations) of target panorama images acquired by a camera device, by using visual data of the target panorama images and additional data acquired by an accompanying mobile computing device (a mobile smart phone computing device, or 'phone', in this example). The various operations may, for example, include one or more of the following:

Visual image recognition and marker tracking. One or more markers—for instance, a pair of QR-style codes printed in color with sizes such as 4 cm×4 cm—are attached to the external camera (for example, one on each of the two sides of the camera); or if the camera itself has unique visual textured of the right size, contrast, and uniqueness, such as brand logos, these may be used instead or in addition. After placing the camera, the phone recognizes and tracks these images through the use of its own camera and IMU data, determining the pose of the camera relative to the phone by use of SLAM techniques. This image recognition can involve the user manually "scanning" the markers by waving the phone towards them from a set range of distances, with the user then triggering a panorama capture within a set time before again moving the panoramic camera, and because the pose of the phone continued to be tracked in a consistent coordinate system, the pose of the markers and hence the camera can be determined with respect to the phone at the time of capture.

Object recognition. Similar to two-dimensional marker recognition and tracking, this approach instead uses three-dimensional shape recognition to recognize and track the shape of the camera itself (or the camera plus tripod or other mount).

Room shape matching. An approximate model of the local geometry of a house in the immediate vicinity of a panorama is reconstructed, effectively for the room in which the panorama was captured. In some cases, such room shape estimation automated operations may further involve obtaining and using human annotation information, while other cases a room shape estimate is automatically extracted without any such human annotation information. At the same time, the phone's additional data (e.g., visual data and/or IMU data) can be used to reconstruct three-dimensional geometry, and can be particularly effective at recognizing vertical and horizontal planes. Both of these two processes can be enhanced by recognizing well-known objects, such as windows and doors, and may optionally be enhanced by recognizing additional object types within a room (e.g., furniture). In such a shape reconstruction, the position of the phone or camera can be determined by nature of the reconstruction process. By taking these two estimates of room shapes (and possibly other objects) and finding a correspondence between them, the relative pose of the two origins—the camera and the phone—can be determined. Even if the initial estimated room shapes have some uncertainties, the unknown quantities (the relative poses) consist of only six degrees of freedom, resulting in an over-specified problem in which a large number of correspondences can help reduce the uncertainty of the overall solution through a least-squares fit or similar technique.

Pose estimation from local visual feature matching. Unique visual features can be recognized from an image and located in another image, even when they are rotated, scaled, projected differently, or have a different exposure level or color balance in the second image. Such feature matching techniques can be applied to a panoramic image taken from a 360 camera and one or more frames captured from a phone's camera. Given that the system is solving for only six unknowns for relative pose, techniques can be used to maximize the number of inlier matching for optimal pose estimation (e.g., RANSAC, or Random Sample Consensus). As the pose of the phone at the time each frame is captured from its built-in camera can be determined from its visual data and/or IMU data, this allows the pose of the external camera to be determined similarly to the room shape matching method above.

Depth/point cloud matching. The phone may be able to directly measure or deduce depth information, through techniques such as stereo, structured light, time-of-flight sensors (e.g., a Lidar sensor). In addition, for external cameras, depth information can be inferred directly from still RGB images obtained from the camera. Both of these depth maps can be used to generate a point cloud, and an optimal correspondence between these two point clouds can then be found, providing a relative pose. This technique could also be combined with RGB information from each, improving the information available to perform the matching.

Motion analysis. In order to capture a panorama from an external camera, a user may perform activities that include placing the 360 camera in the acquisition location; walking to an area not visible to the 360 camera (e.g., to another room); pressing a button on the phone or waiting for a timer to elapse to trigger the capture; and returning to pick up the 360 camera. During this movement, the user's path may be captured by the additional data that it acquires, and the point in this path at which the camera was placed can be approximated (e.g., by using pattern recognition techniques). Even if there is some uncertainty in the location and/or orientation of the camera from this analysis, some of the other techniques benefit if an initial estimate is used as a seed to find an updated (e.g., higher-precision) solution.

Inter-panorama visual matching for coordinate system fusion. Pose data determined for a phone from its additional data may be discontinuous, such as due to gaps in acquisition of the additional data—if so, an attempt to interpolate a pose path through these gaps may be used by "re-localizing" (finding a correspondence between an old stream of camera and depth data available before the gap and a new stream of camera and depth data available after the gap). If such re-localization fails, subsequent pose and geometry data will be specified in a new, independent coordinate system separate from a coordinate system used before the gap. These independent coordinate systems, each corresponding to a partial world map, will prevent a single global localization for all panoramas. If these coordinate systems are fused/combined (aligning them like pieces of a puzzle), multiple independent coordinate systems can be removed or reduced. One way to do this is to determine a set of relative localizations of pairs of panoramas, where each panorama in the pair is in a different coordinate system. This, in turn can be done using related techniques to those described above, such as finding feature correspondences between two panoramas, rather than between a panorama and phone camera frame. If the number of panoramas is significantly higher than the number of independent coordinate systems, then only a few cross-coordinate-system pairs may be used to fuse the coordinate systems.

Rigid mount. In limited embodiments in which the phone and the external camera are both attached to the same tripod or other mount in such a way that the position and orientation of the external camera is always the same relative to the phone, such information may be used, but such arrangements typically provide significantly reduced usability, including that the phone tends to be visible in the final panorama.

The various operations have various strengths and weaknesses—for example, room shape matching might not work completely in crowded or unusually-shaped rooms; and motion analysis can introduce location uncertainties and fail to provide camera orientation. By using multiple localization techniques together, benefits can be achieved, including to use different techniques in different situations, and to use results of some techniques as initial estimates that are updated by other techniques (e.g., using motion pattern matching and/or camera marker recognition as initial estimates used by optimization-based techniques such as depth/point cloud matching and RGB feature matching). In addition, multiple candidate results and/or confidence information from each of multiple techniques can be used to combine results from the multiple techniques (e.g., to discard results with lowest confidence from one or more techniques; to use statistical analysis combine results, such as discarding outliers or choosing a median; etc.).

After the automated acquisition position determination operations are performed for each of multiple target panorama images acquired for a building, and if applicable coordinate system mappings have been identified to allow multiple coordinate systems to be combined into a single coordinate system, then the entire set of panorama localization (6 degrees of freedom each) and coordinate system mappings (up to 5 or 6 degrees of freedom for each pair) can be combined into a small set of global systems (one per disconnected set of coordinate systems). Additional constraints or objective functions can also be applied based on knowledge or assumptions about the overall floor plan geometry, such as room non-intersection or door matching, and optimization-based techniques can optionally be employed again to optimize each of these near-global systems simultaneously, providing an improved set of global results. Such global optimization activities and resulting information can be updated each time a new target panorama image is added.

Once automated acquisition position information is determined for such target panorama images, the information may be used in a variety of manners, such as one or more of the following:

Displaying an approximate floorplan, and determining which areas of the house have been well-covered by panoramas and what other areas should be captured next. This allows users to capture higher-quality data, and avoid costly mistakes which currently require returning to the site to capture additional images or even a new tour.

Determine a group of panoramas with inter-panorama directional links in order to use them for a virtual tour. Such a virtual tour provides various benefits, including allowing the user to preview the tour during capture of the target panorama images.

Perform further analysis on the user's path and fuse with collected images to improve detection of stairs and doorways, augmenting both floorplan generation and tour generation.

Combine geometry information obtained via SLAM on the phone with objects detected in the panoramic imagery to form a rich understanding of fixtures, furniture, and other items of interest within the house. This information can be used during visualization of the space for an end user and for additional automated analyses that are performed.

Generate (and optionally use) on the phone an initial estimate of acquisition position for a target panorama image, and also use the initial estimate as input for other techniques that update the initial estimate (e.g., after capture of a building is completed, and on a server computing system during later construction of a 3D model of the building).

As another non-exclusive example embodiment, the automated operations of the ILDM system may include the following actions. Begin with one or more target images with RGB visual data (but no separate depth data), optionally with further acquisition metadata for one or more of the target images that may include image capture time stamps, camera IMU signals, camera SLAM-based tracking data, and/or image room tags (e.g., supplied by a user who captured a target image for its enclosing room). In addition, begin with a floor plan in 2D or 3D using a vector format and optionally having existing images at specified positions and in different image projections from those of any of the target images, and/or with additional images in different image projections from those of any of the target images with optional further acquisition metadata of the same types.

The automated operations may include doing pre-processing on the target image(s) and optionally the additional image(s) and optionally the existing images to solve camera intrinsic and extrinsic if needed, such as to detect image vanishing lines and vanishing point, extract (if perspective image) camera focal length and field of view angle, solve camera roll pitch yaw angles relative to vanishing lines presented in the images, and re-project image into spherical space (with new camera pose leveled relative to the floor plane).

The automated operations may further include generating geometry predictions for each target image and optionally each additional image and optionally each existing image, including the following: estimating room shape geometry of the indoor structure in which the camera is located (e.g., using a convolutional-neural-network-based room shape estimator, such as HorizonNet and DuLaNet, to approximate room shape geometry to 3D shapes with uniform room height, with the camera can be found in the origin of this shape); optionally using an image structural wireframe estimator (e.g., LCNN) to predict image structural lines and projecting these lines in image 3D space as room corner candidates; using an object detection algorithm on the image to generate 2D object bounding boxes with labels and object image descriptor and then ray casting 2D image bounding boxes onto previously estimated 3D room shapes and generating footprints of 3D objects to represent their spatial information of objects, as well as using 3D bounding box generation algorithms; optionally generating image embedding vectors (e.g., using deep neural networks models) for later use in comparing image content similarities and image overlaps; and optionally tagging the image with one or more room types (e.g., bedroom, kitchen, etc.).

The automated operations may further include generating image-to-image relations between each target image to one or more additional images and/or existing image, including the following: optionally using a feature-based image matching algorithm between the pair of images, such as SfM to solve image angular connections or pairwise image location information (e.g., which direction in image A is connecting to which direction in image B); and optionally using a deep learning-based image co-visibility algorithm between the pair of images to determine image content similarity (e.g., for later use with an assumption that images sharing high co-visibility scores have a high chance to be close to each other spatially).

The automated operations may further include retrieving a set of room shapes candidates on which to attempt to localize each target image in order to determine a precise acquisition location of the target image—the room shape candidates may be obtained from existing room shapes associated with a floor plan and/or room shapes estimated for a set of spatially-related additional images. Various heuristics may be used to generate binary relations between a pair of a target image and an additional image or between a target image and an area in existing floor plan, including the following: use similarity/overlaps between room type tags for the target image and paired image/area (if available, such as by created by automated image classification algorithm and/or photographer and/or subsequent annotator) to aggregate a list of preferred candidate room shapes; use the temporal relation between images (if image capture time stamp metadata is available) to retrieve a set of temporally-related additional images; use a feature-matching-based image alignment algorithm to generate pairwise or group-wise image co-relations (e.g., image relative angle or binary image co-relation); use a neural-network-based image comparison algorithm to generate pairwise image to image co-relation; to use IMU metadata collected during the image capture process (if available) to give image angular connections; and use SLAM-based camera tracking algorithm (if SLAM data available) to produce image spatial relation.

The automated operations may further include performing geometry matching for each target image to one or more candidate room shapes, to match the target image's estimated room shape to a corresponding determined room shape for a room on a floor plan or to a corresponding estimated room shape for an additional image, and localize a target image to a single room shape (e.g., to produce one or more camera pose acquisition positions for the target image, optionally along with a confidence score for each camera pose). The automated operations generally include the following: proposing a number of shape matching options (which is based on target image camera pose in the candidate room shape space); compute a score for each of the proposed camera poses (proposed shape matching position); select the camera pose with the highest score or use threshold to pick multiple camera poses; and refine the one or more selected camera poses.

The proposing of the various shape matching options may include assuming that 2 room shapes have the same scale if they are captured by the same camera at the same height (such as for one or more target images and one or more additional images that are concurrently captured during the same period of time). Corners of the room shapes are used to generate a collection of corner snapping options (alternative shape matches) between the target image's existing room shape and candidate room shape, with different shape orientations. The shape orientations are generated by snapping the horizontal vanishing angle of target image to the vanishing angle of paired additional or existing image or candidate room shape. So, if there are M predicted room corners in target image, N room corners in candidate room shape, and 4 vanishing directions from the target image and the paired additional or existing image, M*N*4 camera poses are proposed for the target image. When 2 images are captured with inconsistent camera height, a camera pose can be proposed by selecting 2 control corners from each shape, and using that to generate proposed scale and xyz, with the vanishing angle alignment used to correct the proposed camera angle.

The computing of a score for each of the proposed camera poses (proposed shape matching position) may include combining multiple individual scores given the proposed camera pose (e.g., taking the weighted sum of each individual score, extracting a descriptor from each of these terms and use machine learning model to generate the final score, etc.). Individual scores may include one or more of the following: a corner re-projection score, in which the candidate room shape is re-projected into the target image space, the projected room corners from candidate room shape are compared with room corners from original target image existing room shape, and each target room corner is matched with its nearest candidate room shape corner, using the distance of each matching corner pair and the number of matches to generate the corner re-projection score (e.g., with the closer the match, the higher the score); a wireframe structural line re-projection score, in which the candidate room shape's structural lines are re-projected into the target image space, the projected structural lines from the candidate room shape are compared with the structural lines from the target image estimated room shape, and each target image structural line is matched with its nearest candidate room shape structural line, using the distance of each matching structural line pair and the number of matches to generate the wireframe structural line re-projection score (e.g., with the closer the match, the higher the score); a structural wall element object re-projection score, in which the candidate room shape's 3D object bounding boxes from the candidate room shape are re-projected into the target image estimated room space, the projected object bounding boxes from the candidate room shape are compared with the object bounding boxes from the target image estimated room shape, and each target image object bounding box is matched with its nearest candidate room shape object bounding box, using the distance of each matching object bounding box pair based on an intersection-over-union and the consistency of object type tags; an image angular score, in which the departure/landing angle starting from target image to additional/existing image is generated, in which a separate departure/landing angle is also generated for each pair of images using a different technique (e.g., SfM, convolutional neural network, etc.), and in which the score is computed by comparing these 2 sets of angles (e.g., with the bigger the discrepancy, the more penalty in this score); an image content matching score, in which the image content similarity for a given image pair is generated (e.g., using a convolutional neural network); and a shape-based boundary intersection score, in which structural walls of the candidate room shape are re-projected in the 3D space of target image, and the mismatch between the structural walls of the projected room shape and of the target image estimated room shape are used to evaluate the proposed camera pose.

The refining of the one or more selected camera poses may include using an initial camera pose for the target image from the previous operations (e.g., using corner point matching), and refining the camera pose using one or a combination of multiple steps. The steps may include one or more of the following: performing an alignment using corner inliers, in which a distance threshold is used to filter all the matching pairs from the previous corner matching operations within a certain re-projection image distance (with the resulting corner pairs called corner inliers), and weighted least squares is used to find the best camera position xyz, with confidence scores from the predicted corners of the target image's estimated room shape (e.g., as generated by a neural network model) used as weights in the weighted least square regression to generate a more accurate camera position than the previous camera pose; performing an alignment using line matching of wireframe structural line predictions for the target image and for the candidate room shape (e.g., between horizontal lines on the floor), such as with a distance threshold used to filter all the matching lines from the previous line matching operations within a certain re-projection image distance (with the resulting line pairs called line inliers), and weighted least squares used to find the best camera position xyz, with confidence scores from the predicted structural lines of the target image's estimated room shape (e.g., as generated by a neural network model) used as weights in the weighted least square regression to generate a more accurate camera position than the previous camera pose; and performing a differentiable rendering optimization method using image normal predictions, where camera pose is optimized for a lower cost function value, by rendering the pixel-level surface normal information for the candidate room shape in the target image space starting from an initial camera pose guess, comparing the rendered surface normal with surface normal estimated from the target image in its image space (e.g., using a neural-network-based method like Taskonomy), and computing a cost value, to optimize camera pose by iteration until the cost value reaches a local minimum.

Various details have been provided above with respect to these example non-exclusive embodiments, but it will be appreciated that the provided details are included for illustrative purposes, and other embodiments may be performed in other manners without some or all such details.

Figure 3:
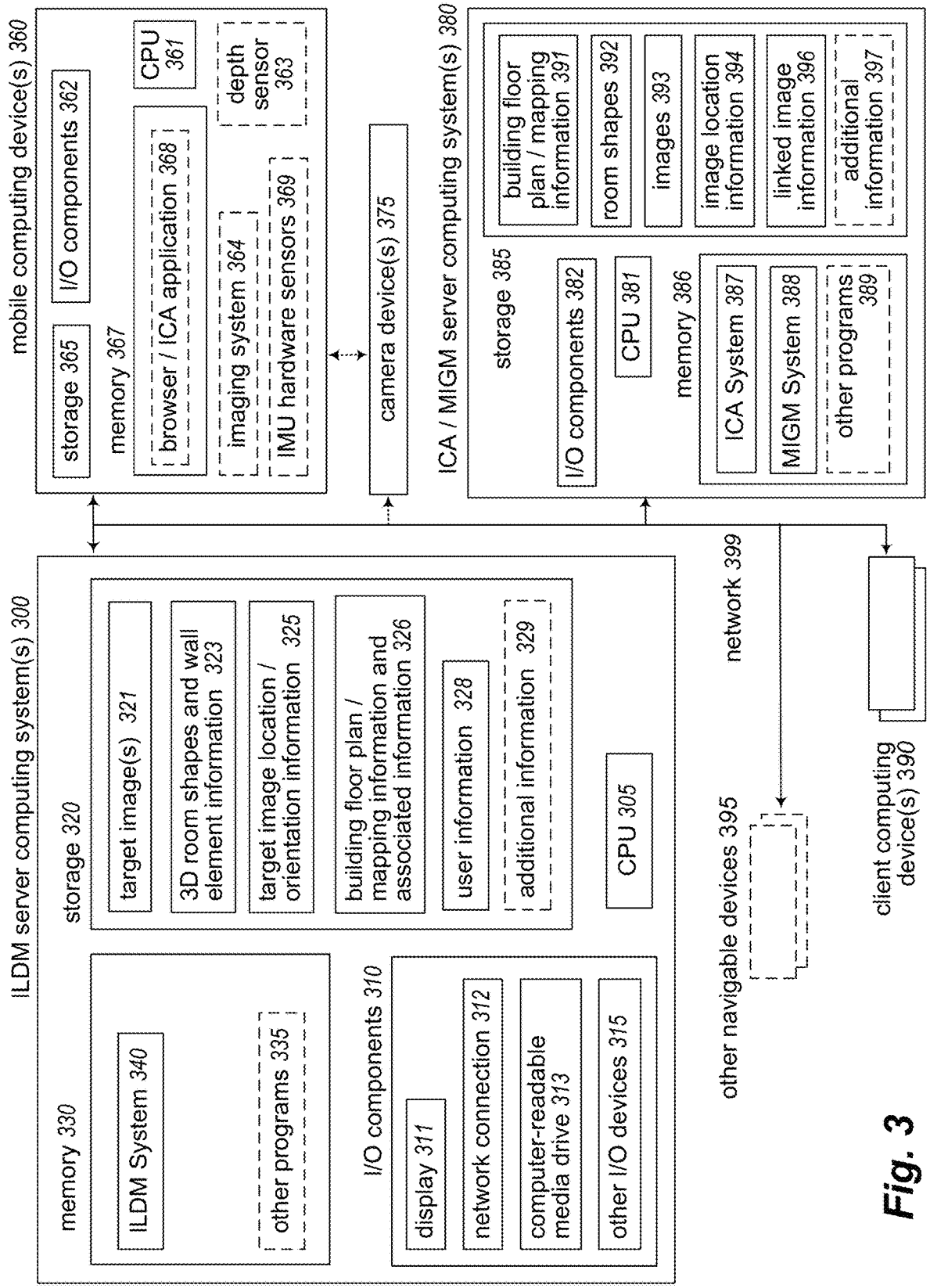
FIG. 3 is a block diagram illustrating computing systems suitable for executing embodiments of one or more systems that perform at least some of the techniques described in the present disclosure.

FIG. 3 is a block diagram illustrating an embodiment of one or more server computing systems 300 executing an implementation of an ILDM system 340, and one or more server computing systems 380 executing an implementation of an ICA system 387 and an MIGM system 388—the server computing system(s) and ILDM system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 may include hardware components similar to those of a server computing system 300, including one or more hardware CPU processors 381, various I/O components 382, storage 385 and memory 386, but with some of the details of server 300 being omitted in server 380 for the sake of brevity.

The server computing system(s) 300 and executing ILDM system 340 may communicate with other computing systems and devices via one or more networks 399 (e.g., the Internet, one or more cellular telephone networks, etc.), such as user client computing devices 390 (e.g., used to view floor plans, associated images and/or other related information), ICA and MIGM server computing system(s) 380, one or more mobile computing devices 360, optionally one or more camera devices 375, optionally other navigable devices 395 that receive and use floor plans and determined image acquisition locations and optionally other generated information for navigation purposes (e.g., for use by semi-autonomous or fully autonomous vehicles or other devices), and optionally other computing systems that are not shown (e.g., used to store and provide additional information related to buildings; used to capture building interior data; used to store and provide information to client computing devices, such as additional supplemental information associated with images and their encompassing buildings or other surrounding environment; etc.). In some embodiments, some or all of the one or more camera devices 375 may directly communicate (e.g., wirelessly and/or via a cable or other physical connection, and optionally in a peer-to-peer manner) with one or more associated mobile computing devices 360 in their vicinity (e.g., to transmit captured target images, to receive instructions to initiate a target image acquisition, etc.), whether in addition to or instead of performing communications via network 399.

In the illustrated embodiment, an embodiment of the ILDM system 340 executes in memory 330 in order to perform at least some of the described techniques, such as by using the processor(s) 305 to execute software instructions of the system 340 in a manner that configures the processor(s) 305 and computing system(s) 300 to perform automated operations that implement those described techniques. The illustrated embodiment of the ILDM system may include one or more components, not shown, to each perform portions of the functionality of the ILDM system, and the memory may further optionally execute one or more other programs 335—as one specific example, copies of the ICA and/or MIGM systems may execute as one of the other programs 335 in at least some embodiments, such as instead of or in addition to the ICA system 387 and MIGM system 388 on the server computing system(s) 380. The ILDM system 340 may further, during its operation, store and/or retrieve various types of data on storage 320 (e.g., in one or more databases or other data structures), such as information 321 about target images (e.g., acquired by one or more camera devices 375) whose acquisition locations are to be determined and associated information 325 about such determined acquisition locations and optionally acquisition orientations, information 323 about estimated 3D room shapes and wall element information for target images (e.g., as generated by the ILDM system during its automated operations), various types of floor plan information and other building mapping information 326 (e.g., generated and saved 3D room shapes for rooms enclosing target images; generated and saved 2D floor plans with 2D room shapes and positions of wall elements and other elements on those floor plans and optionally additional information such as building and room dimensions for use with associated floor plans, existing images with specified positions, annotation information, etc.; generated and saved 2.5D and/or 3D model floor plans that are similar to the 2D floor plans but further include height information and 3D room shapes; etc.), user information 328 about users of client computing devices 390 and/or operator users of mobile devices 360 who interact with the ILDM system, and optionally various other types of additional information 329. The ICA system 387 and/or MIGM system 388 may similarly store and/or retrieve various types of data on storage 385 (e.g., in one or more databases or other data structures) during their operation and provide some or all such information to the ILDM system 340 for its use (whether in a push and/or pull manner), such as images 393 (e.g., 360° target panorama images acquired by one or more camera devices 375 and transferred to the server computing systems 380 by those camera devices and/or by one or more intermediate associated mobile computing devices 360), inter-target image directional link information 396 that is generated by the ICA system and/or the MIGM system as used to represent a corresponding building, resulting floor plan information and optionally other building mapping information 391 for such a building (e.g., similar to or the same as information 326) that is generated by the MIGM system, additional information that is generated by the MIGM system as part of generating the floor plans such as determined room shapes 392 and image location information 394, and optionally various types of additional information 397 (e.g., various analytical information related to presentation or other use of one or more building interiors or other environments captured by an ICA system).

Some or all of the user client computing devices 390 (e.g., mobile devices), mobile computing devices 360, camera devices 375, other navigable devices 395 and other computing systems may similarly include some or all of the same types of components illustrated for server computing systems 300 and 380. As one non-limiting example, the mobile computing devices 360 are each shown to include one or more hardware CPU(s) 361, I/O components 362, storage 365, optionally imaging system 364, optionally IMU hardware sensors 369, optionally depth sensors 363, and memory 367, with one or both of a browser and one or more client applications 368 (e.g., an application specific to the ILDM system and/or ICA system) optionally executing within memory 367, such as to participate in communication with the ILDM system 340, ICA system 387, associated camera devices 375 and/or other computing systems. While particular components are not illustrated for the other navigable devices 395 or client computing systems 390, it will be appreciated that they may include similar and/or additional components.

It will also be appreciated that computing systems 300 and 380 and camera devices 375 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, camera devices and accessories, and various other consumer products that include appropriate communication capabilities. In addition, the functionality provided by the illustrated ILDM system 340 may in some embodiments be distributed in various components, some of the described functionality of the ILDM system 340 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the ILDM system 340 executing on server computing systems 300) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
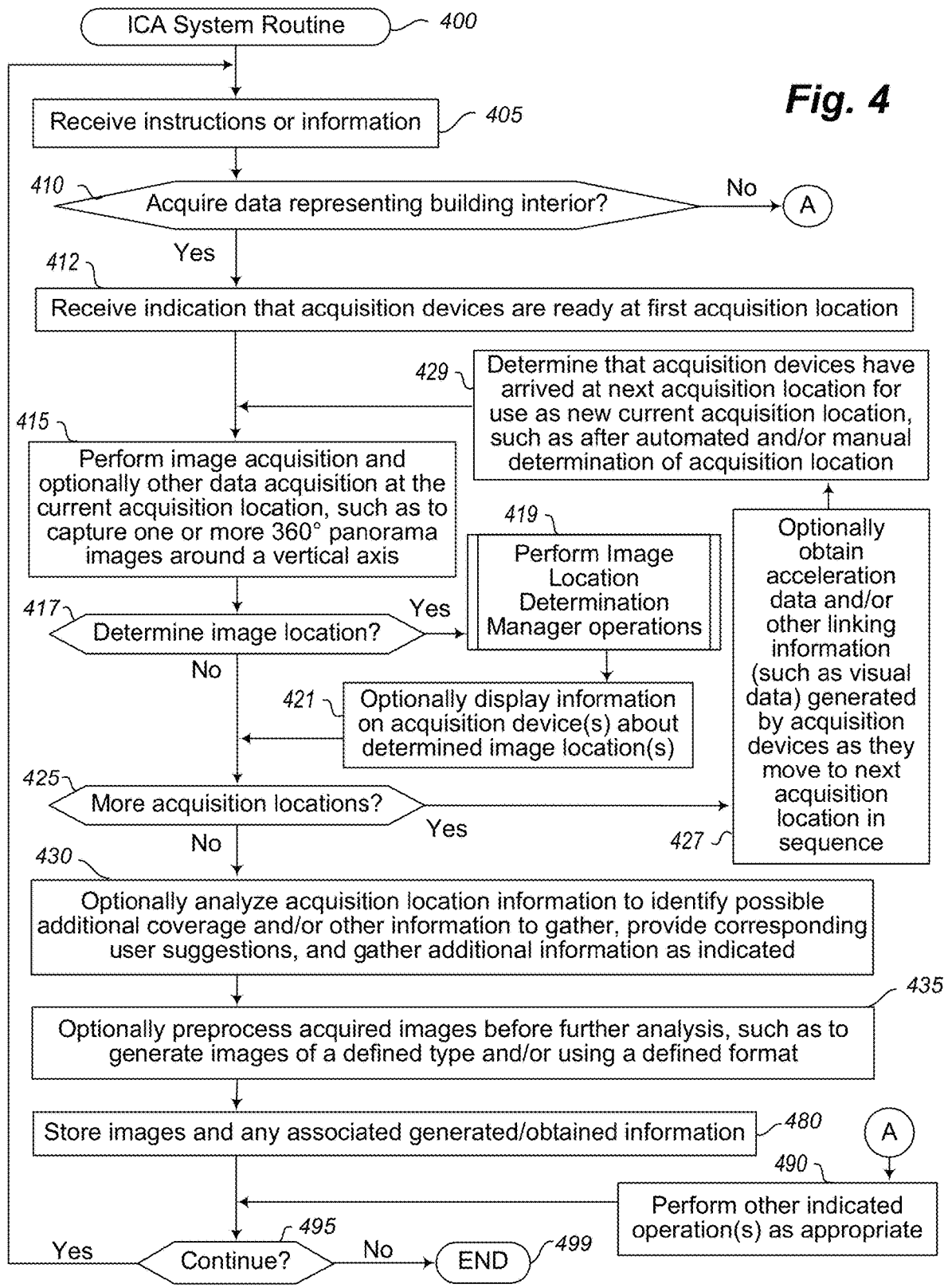
FIG. 4 illustrates an example flow diagram for an Image Capture and Analysis (ICA) system routine in accordance with an embodiment of the present disclosure.

FIG. 4 illustrates an example flow diagram of an embodiment of an ICA System routine 400. The routine may be performed by, for example, the ICA System 160 of FIG. 1A, the ICA System 387 of FIG. 3, and/or an ICA system as otherwise described herein, such as to acquire 360° target panorama images and/or other images within buildings or other structures (e.g., for use in subsequent generation of related floor plans and/or other mapping information, such as by an embodiment of an MIGM system routine, with one example of such a routine illustrated with respect to FIGS. 5A-5B; for use in subsequent determination of acquisition locations and optionally acquisition orientations of the target images, such as by an embodiment of an ILDM system routine, with one example of such a routine illustrated with respect to FIGS. 6A-6B; etc.). While portions of the example routine 400 are discussed with respect to acquiring particular types of images at particular locations, it will be appreciated that this or a similar routine may be used to acquire video or other data (e.g., audio) and/or other types of images that are not panoramic, whether instead of or in addition to such panorama images. In addition, while the illustrated embodiment acquires and uses information from the interior of a target building, it will be appreciated that other embodiments may perform similar techniques for other types of data, including for non-building structures and/or for information external to one or more target buildings of interest. Furthermore, some or all of the routine may be executed on a mobile device used by a user to participate in acquiring image information and/or related additional data, and/or by a system remote from such a mobile device.

The illustrated embodiment of the routine begins at block 405, where instructions or information are received. At block 410, the routine determines whether the received instructions or information indicate to acquire data representing a building interior, and if not continues to block 490. Otherwise, the routine proceeds to block 412 to receive an indication (e.g., from a user of a mobile computing device associated with one or more camera devices) to begin the image acquisition process at a first acquisition location. After block 412, the routine proceeds to block 415 in order to perform acquisition location image acquisition activities in order to acquire at least one 360° panorama image by at least one camera device (and optionally one or more additional images and/or other additional data by the mobile computing device, such as from IMU sensors and/or depth sensors) for the acquisition location in the interior of the target building of interest, such as to provide horizontal coverage of at least 360° around a vertical axis. The routine may also optionally obtain annotation and/or other information from a user regarding the acquisition location and/or the surrounding environment, such as for later use in presentation of information regarding that acquisition location and/or surrounding environment.

Figure 6A:
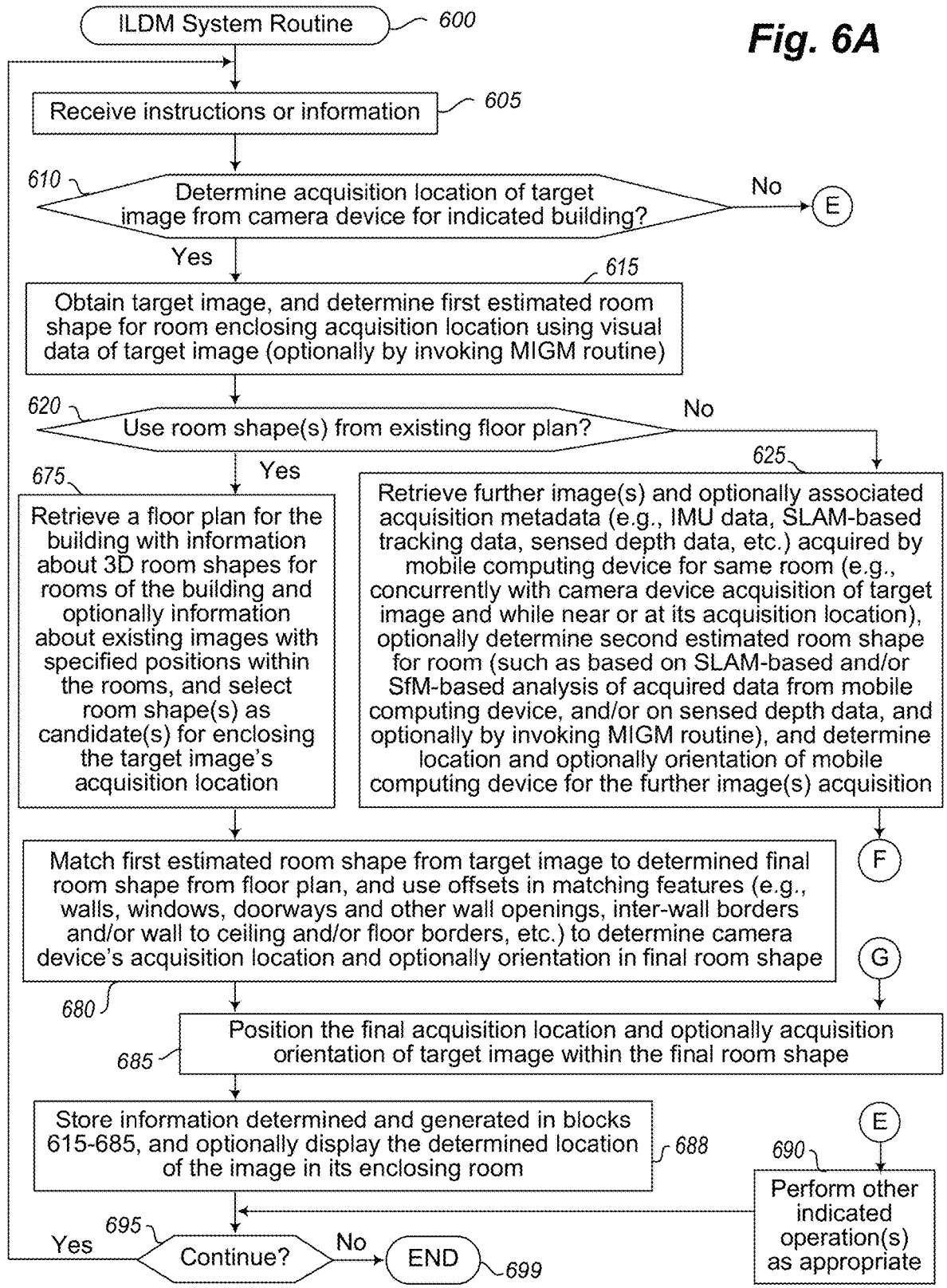
FIGS. 6A-6B illustrate an example flow diagram for an Image Location Determination Manager (ILDM) system routine in accordance with an embodiment of the present disclosure.
Figure 6B:
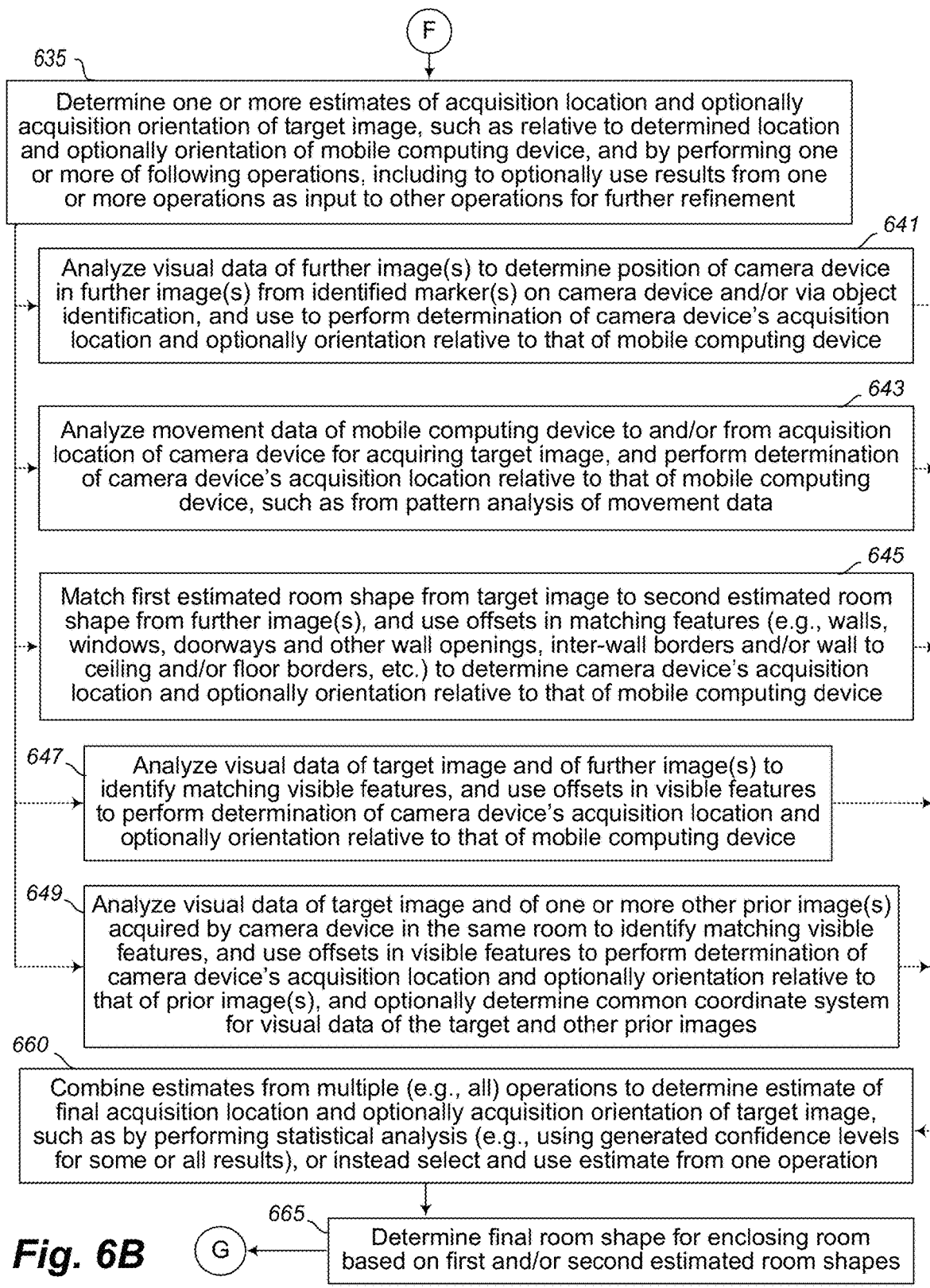

After block 415 is completed, the routine continues to block 417 to determine whether to perform a determination at the current time of acquisition position information (e.g., one or more acquisition locations and optionally acquisition orientations) of the one or more target images acquired in block 415, and if so the routine continues to block 419 to perform automated operations of an Image Location Determination Manager routine to determine the acquisition position information for the target image(s)—FIGS. 6A-6B illustrate one example of such an Image Location Determination Manager routine. After block 419, the routine continues to block 421 to optionally display information on one or more of the acquisition devices (e.g., on the mobile computing device) about determined acquisition position information for one or more target images, such as in some embodiments and situations to display a partial floor map of the building on the mobile computing device for room(s) in which images have been acquired (e.g., based at least in part on displaying determined 2D or 3D room shape information for those rooms)d along with information about the determined target image acquisition position information.

After block 421, or if it is instead determined in block 417 not to determine the acquisition position information at the current time for the one or more target images acquired in block 415, the routine continues to block 425 to determine if there are more acquisition locations at which to acquire images, such as based on corresponding information provided by the user of the mobile computing device. If so, the routine continues to block 427 to optionally initiate the capture of linking information (such as visual data, acceleration data from one or more IMU sensors, etc.) during movement of the mobile device along a travel path away from the current acquisition location and towards a next acquisition location within the building interior. As described elsewhere herein, the captured linking information may include additional sensor data (e.g., from one or more IMU, or inertial measurement units, on the mobile computing device or otherwise carried by the user) and/or additional visual information (e.g., panorama images, other types of images, panoramic or non-panoramic video, etc.) recorded during such movement, and in some embodiments may be analyzed to determine a changing pose (location and orientation) of the mobile computing device during the movement, as well as information about a room shape of the enclosing room and the path of the mobile computing device during the movement. Initiating the capture of such linking information may be performed in response to an explicit indication from a user of the mobile computing device or based on one or more automated analyses of information recorded from the mobile computing device. In addition, the routine in some embodiments may further optionally determine and provide one or more guidance cues to the user regarding the motion of the mobile device, quality of the sensor data and/or visual information being captured during movement to the next acquisition location (e.g., by monitoring the movement of the mobile device), including information about associated lighting/environmental conditions, advisability of capturing a next acquisition location, and any other suitable aspects of capturing the linking information. Similarly, the routine may optionally obtain annotation and/or other information from the user regarding the travel path, such as for later use in presentation of information regarding that travel path or a resulting inter-panorama image connection link. In block 429, the routine then determines that the mobile computing device (and one or more associated camera devices) arrived at the next acquisition location (e.g., based on an indication from the user, based on the forward movement of the user stopping for at least a predefined amount of time, etc.), for use as the new current acquisition location, and returns to block 415 in order to perform the image acquisition activities for the new current acquisition location.

If it is instead determined in block 425 that there are not any more acquisition locations at which to acquire image information for the current building or other structure, the routine proceeds to block 430 to optionally analyze the acquisition position information for the building or other structure, such as to identify possible additional coverage (and/or other information) to acquire within the building interior. For example, the ICA system may provide one or more notifications to the user regarding the information acquired during capture of the multiple acquisition locations and optionally corresponding linking information, such as if it determines that one or more segments of the recorded information are of insufficient or undesirable quality, or do not appear to provide complete coverage of the building.

After block 430, the routine continues to block 435 to optionally preprocess the acquired 360° target panorama images before their subsequent use for generating related mapping information (e.g., to place them in a spherical format, to determine vanishing lines and vanishing points for the images, etc.). In block 480, the images and any associated generated or obtained information is stored for later use.

If it is instead determined in block 410 that the instructions or other information recited in block 405 are not to acquire images and other data representing a building interior, the routine continues instead to block 490 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the ICA system, etc.), to obtain and store other information about users of the system, to respond to requests for generated and stored information, etc.

Following blocks 480 or 490, the routine proceeds to block 495 to determine whether to continue, such as until an explicit indication to terminate is received, or instead only if an explicit indication to continue is received. If it is determined to continue, the routine returns to block 405 to await additional instructions or information, and if not proceeds to step 499 and ends.

Figure 5A:
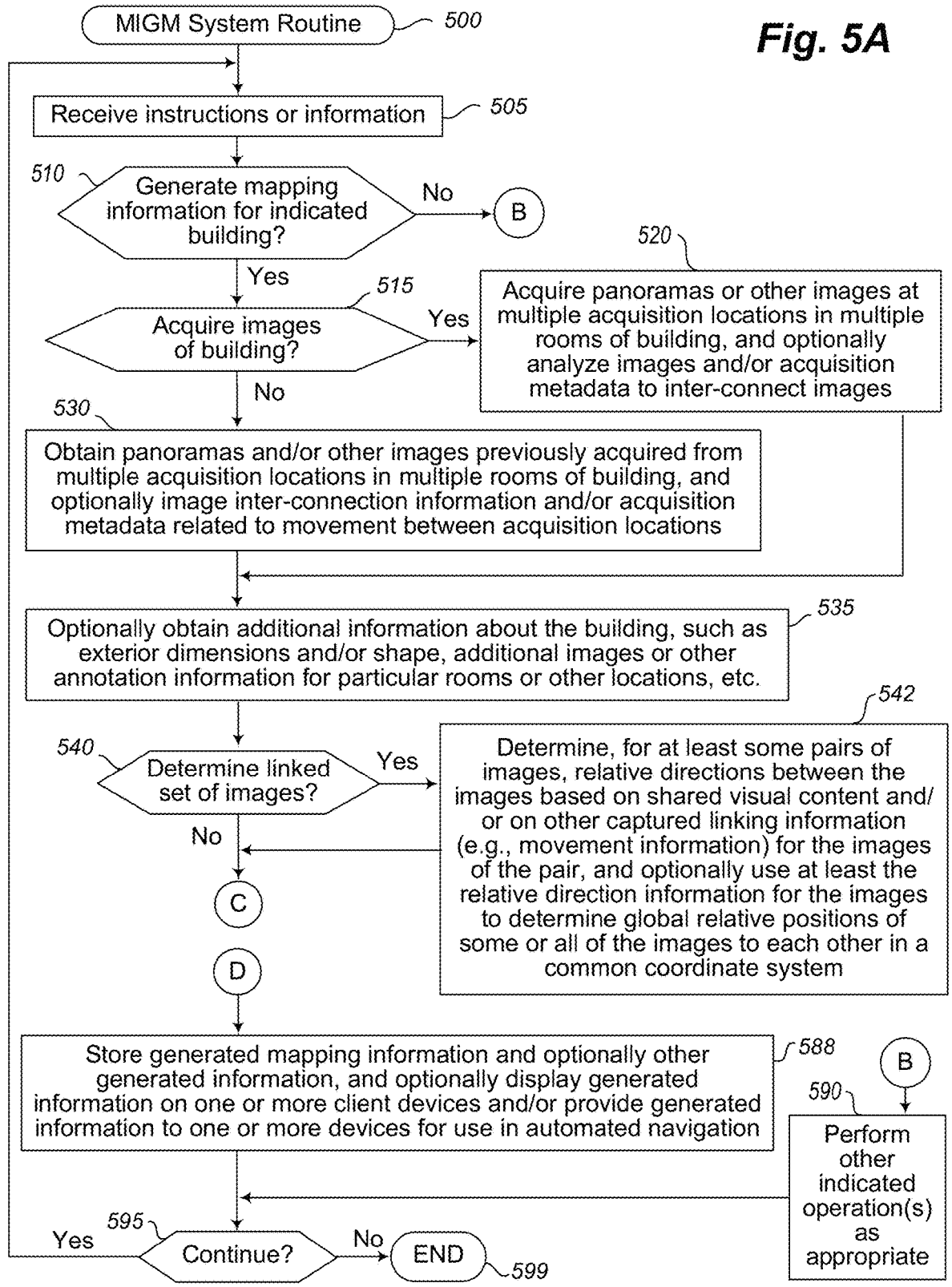
FIGS. 5A-5B illustrate an example flow diagram for a Mapping Information Generation Manager (MIGM) system routine in accordance with an embodiment of the present disclosure.
Figure 5B:
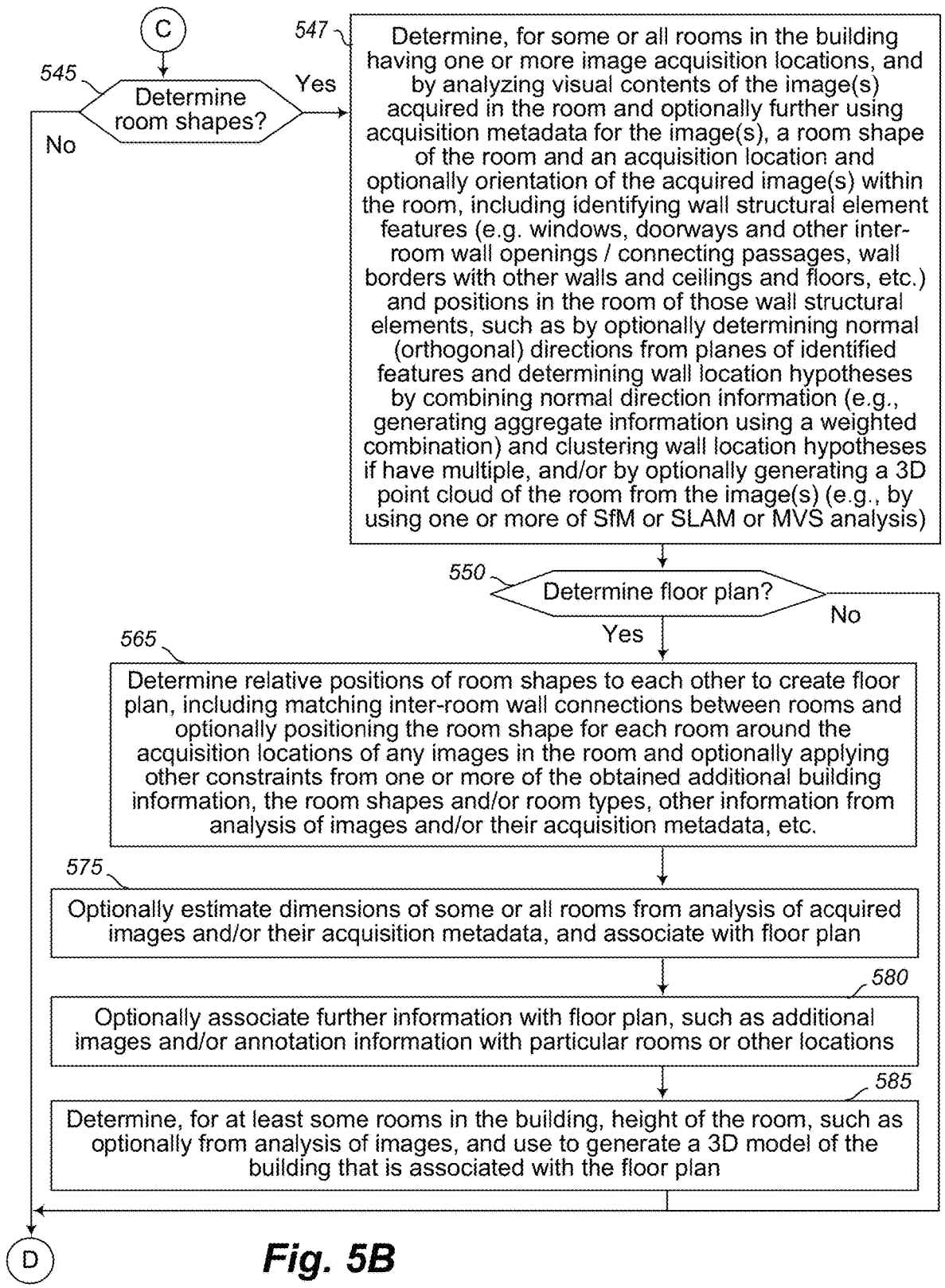

FIGS. 5A-5B illustrate an example embodiment of a flow diagram for a Mapping Information Generation Manager (MIGM) System routine 500. The routine may be performed by, for example, execution of the MIGM system 160 of FIG. 1A, the MIGM system 388 of FIG. 3, and/or an MIGM system as described elsewhere herein, such as to generate a floor plan and optionally other mapping information for a defined area based at least in part on one or more images of the area and optionally additional data captured by a mobile computing device. In the example of FIGS. 5A-5B, the generated mapping information includes a 2D floor plan and/or 3D computer model floor plan of a building, such as a house, but in other embodiments, other types of mapping information may be determined and generated for other types of buildings and used in other manners, as discussed elsewhere herein.

The illustrated embodiment of the routine begins at block 505, where information or instructions are received. The routine continues to block 510 to determine whether the instructions received in block 505 indicate to generate mapping information for an indicated building, and if so the routine continues to perform blocks 515-588 to do so, and otherwise continues to block 590.

In block 515, the routine determines whether image information is already available for the building, or if such information instead needs to be acquired. If it is determined in block 515 that the information needs to be acquired, the routine continues to block 520 to acquire such information, optionally waiting for one or more users or devices to move throughout the building and acquire panoramas or other images at multiple acquisition locations in multiple rooms of the building, and to optionally further analyze the images and/or metadata information about their acquisition to interconnect the images, as discussed in greater detail elsewhere herein—FIG. 4 provides one example embodiment of an ICA system routine for performing such image acquisition. If it is instead determined in block 515 that it is not necessary to acquire the images, the routine continues instead to block 530 to obtain existing panoramas or other images from multiple acquisition locations in multiple rooms of the building, optionally along with interconnection information for the images and acquisition of metadata information related to movement between the acquisition locations, such as may in some situations have been supplied in block 505 along with the corresponding instructions.

After blocks 520 or 530, the routine continues to block 535 to optionally obtain additional information about the building, such as from activities performed during acquisition and optionally analysis of the images, and/or from one or more external sources (e.g., online databases, information provided by one or more end users, etc.)—such additional information may include, for example, exterior dimensions and/or shape of the building, additional images and/or annotation information acquired corresponding to particular locations within the building (optionally for locations different from acquisition locations of the acquired panorama or other images), additional images and/or annotation information acquired corresponding to particular locations external to the building (e.g., surrounding the building and/or for other structures on the same property), etc.

After block 535, the routine continues to block 540, where it determines whether to generate a linked set of target panorama images (or other images) for the building, and if so continues to block 542. The routine in block 542 selects pairs of at least some of the images (e.g., based on the images of a pair having overlapping visual content), and determines, for each pair, relative directions between the images of the pair based on shared visual content and/or on other captured linking information (e.g., movement information) related to the images of the pair (whether directly from the acquisition location for one image to the acquisition location of another image, or via one or more other intermediary acquisition locations of other images). The routine in block 542 further uses at least the relative direction information for the pairs of images to determine global relative positions of some or all of the images to each other in a common coordinate system, such as to create a virtual tour from which an end user may move from any one of the images to one or more other images to which that starting image is linked, and similarly move from that next image to one or more additional images to which that next image is linked, etc. Additional details are included elsewhere herein regarding creating such a linked set of images.

After block 542, or if it is instead determined in block 540 that the instructions or other information received in block 505 are not to determine a linked set of images, the routine continues to block 545, where it determines whether to generate room shapes corresponding to one or more target images for the building and their enclosing rooms. If so, the routine continues to block 547, where it determines, for one or some or all rooms in the building that each has one or more target images with acquisition locations within that room, a 2D and/or 3D shape of that room based at least in part on the visual data of the one or more target images acquired in that room by one or more camera devices and/or on additional data acquired by a mobile computing device in that room that is associated with the one or more camera devices. The determination of a room shape for a room may include analyzing visual contents of one or more target images acquired in that room by one or more camera devices, analyzing visual contents of one or more additional images acquired in that room by an associated mobile computing device, and/or analyzing additional non-visual data acquired in that room by an associated mobile computing device, including to determine initial estimated acquisition position information (e.g., acquisition location and optionally acquisition orientation) of each of the target images acquired in that room (e.g., for further analysis and refinement by the ILDM system). The analysis of the various data acquired in that room may further include identifying wall structural elements features of that room (e.g., windows, doorways and stairways and other inter-room wall openings and connecting passages, wall borders between a wall and another wall and/or receiving and/or a floor, etc.) and determining positions of those identified features within the determined room shape of the room, optionally by generating a 3D point cloud of some or all of the room walls and optionally the ceiling and/or floor (e.g., by analyzing at least visual data of images acquired in the room and optionally additional data captured by the mobile computing device, such as using one or more of SfM or SLAM or MVS analysis), and/or by determining planar surface corresponding to some or all walls and optionally the floor and/or ceiling (e.g., by determining normal/orthogonal directions from planes of identified features and combining such information to determine wall location hypotheses and optionally clustering multiple wall location hypotheses for a given wall to reach a final determination of a location of that wall). Additional details are included elsewhere herein regarding determining room shapes and identifying additional information for the rooms, including initial estimated acquisition position information for target images acquired in the rooms.

After block 547, the routine continues to block 550, where it determines whether to further generate a floor plan for the building based at least in part on the determined room shapes from block 547 and optionally further information regarding how to position the determined room shapes relative to each other. If so, the routine continues to block 565, where it uses the determined room shapes to create an initial 2D floor plan, such as by connecting inter-room passages in their respective rooms, by optionally positioning room shapes around determined acquisition locations of the target images (e.g., if the acquisition location positions are inter-connected), and by optionally applying one or more constraints or optimizations. Such a floor plan may include, for example, relative position and shape information for the various rooms without providing any actual dimension information for the individual rooms or building as a whole, and may further include multiple linked or associated sub-maps (e.g., to reflect different stories, levels, sections, etc.) of the building. The routine further associates positions of the doors, wall openings and other identified wall elements on the floor plan.

After block 565, the routine optionally performs one or more steps 575-580 to determine and associate additional information with the floor plan. In block 575, the routine optionally estimates the dimensions of some or all of the rooms, such as from analysis of images and/or their acquisition metadata or from overall dimension information obtained for the exterior of the building, and associates the estimated dimensions with the floor plan—it will be appreciated that if sufficiently detailed dimension information were available, architectural drawings, blue prints, etc. may be generated from the floor plan. After block 575, the routine continues to block 580 to optionally associate further information with the floor plan (e.g., with particular rooms or other locations within the building), such as additional existing images with specified positions and/or annotation information. In block 585, the routine further estimates heights of walls in some or all rooms, such as from analysis of images and optionally sizes of known objects in the images, as well as height information about a camera when the images were acquired, and further uses such information to generate a 3D computer model floor plan of the building, with the 2D and 3D floor plans being associated with each other.

After block 585, or if it is instead determined in block 550 not to determine a floor plan, or in block 545 not to determine room shapes, the routine continues to block 588 to store the generated mapping information and optionally other generated information, and to optionally further use the generated mapping information, such as to provide the generated 2D floor plan and/or 3D computer model floor plan for display on one or more client devices and/or to one or more other devices for use in automating navigation of those devices and/or associated vehicles or other entities, to similarly provide and use information about determined room shapes and/or a linked set of panorama images and/or about additional information determined about contents of rooms and/or passages between rooms, etc.

If it is instead determined in block 510 that the information or instructions received in block 505 are not to generate mapping information for an indicated building, the routine continues instead to block 590 to perform one or more other indicated operations as appropriate. Such other operations may include, for example, receiving and responding to requests for previously generated floor plans and/or other generated information (e.g., requests for such information for use by an ILDM system, requests for such information for display on one or more client devices, requests for such information to provide it to one or more other devices for use in automated navigation, etc.), obtaining and storing information about buildings for use in later operations (e.g., information about dimensions, numbers or types of rooms, total square footage, adjacent or nearby other buildings, adjacent or nearby vegetation, exterior images, etc.), etc.

After blocks 588 or 590, the routine continues to block 595 to determine whether to continue, such as until an explicit indication to terminate is received, or instead only if an explicit indication to continue is received. If it is determined to continue, the routine returns to block 505 to wait for and receive additional instructions or information, and otherwise continues to block 599 and ends.

FIGS. 6A-6B illustrate an example embodiment of a flow diagram for an Image Location Determination Manager (ILDM) System routine 600. The routine may be performed by, for example, execution of the ILDM system 140 of FIG. 1A, the ILDM system 340 of FIG. 3, and/or an ILDM system as described with respect to FIGS. 2A-2U and elsewhere herein, such as to perform automated operations related to determining acquisition position information (e.g., an acquisition location and optionally acquisition orientation) of a target image captured by a camera device based at least in part on an analysis of the target image's visual data and by using additional data captured by an associated mobile computing device, and to subsequently use the determined acquisition position information in one or more automated manners. In the example of FIGS. 6A-6B, the acquisition position information is determined with respect to a floor plan of a building, such as a house, but in other embodiments, other types of mapping information may be used for other types of structures or for non-structure locations, and the determined acquisition position information may be used in other manners than those discussed with respect to routine 600, as discussed elsewhere herein.

The illustrated embodiment of the routine begins at block 605, where information or instructions are received. The routine continues to block 610 to determine whether the instructions received in block 605 indicate to determine acquisition position information for a target image captured for an indicated building, and if so the routine continues to perform blocks 615-688 to do so, and otherwise continues to block 690.

In block 615, the routine obtains the target image to be analyzed (e.g., a 360° target panorama image provided with the information of block 605), and determines a first estimated room shape for the room enclosing the acquisition location of the target image based on visual data of the target image—in at least some embodiments, the determination of the estimated room shape information from the target image may include invoking the MIGM routine and providing the target image as input along with instructions to determine a room shape for it and receiving the first estimated room shape as output of that routine (with FIGS. 5A-5B providing one example of such a routine), and in some embodiments may include using one or more trained neural networks to generate the first estimated room shape from the visual data of the target image.

After block 615, the routine continues to block 620, where it determines whether to obtain a second estimated room shape for the enclosing room from an existing partial or full floor plan for the building, or instead by analyzing additional data captured by the associated mobile computing device in the enclosing room. If it is determined in block 620 to use an existing floor plan, the routine continues to block 675, where it retrieves a partial or full floor plan for the building that includes information about 2D and/or 3D room shapes for some or all rooms of the building (and optionally includes additional information for particular rooms such as acquisition position information for other existing images acquired in that room, positions of structural wall elements in that room and optionally other information acquired in that room, etc.), and selects one or more of those room shapes as one or more candidates to use for the enclosing room (e.g., selecting the room shape for a particular room that is identified by the user operating the mobile computing device and/or camera device, selecting the room shape for a particular room that is identified by other data obtained from the mobile computing device and/or camera device, selecting one or more rooms as possible candidates based on other information obtained during the acquisition of the target image and/or additional data, etc.). After block 675, the routine continues to block 680, where it uses the first estimated room shape information from block 615 and additional information from block 675 for one or more candidate room shapes to determine offsets in matching features (e.g., structural wall elements) identified in both the first estimated room shape and one of the candidate room shapes and to use the determined offset information to determine where the camera device's acquisition location and optionally acquisition orientation is located within the candidate room shape—if multiple candidate room shapes are available, the analysis may be performed for each of those multiple candidate room shapes, with a best match identified between the first estimated room shape and one of the candidate room shapes (e.g., having the smallest aggregate offsets), and the determined acquisition location and optionally acquisition orientation for that identified candidate room shape being selected for further use. The candidate room shape from the floor plan that is used for determining the acquisition position of the target image is further selected for further use as a final room shape for the enclosing room.

Alternatively, if it is determined in block 620 to not use an existing floor plan (e.g., if such a floor plan has not yet been generated), the routine continues instead to block 625, where it retrieves additional data captured by the mobile computing device in the enclosing room (e.g., one or more further images and optionally associated acquisition metadata, such as IMU data, SLAM-based tracking data, sensed depth data, etc.), such as additional data captured concurrently with the acquisition by the camera device of the target image and while the mobile computing device is near or at the acquisition location for the target image, or instead at one or more other times and/or at one or more other locations within the enclosing room. The routine further in block 625 optionally determines a second estimated room shape for the enclosing room using the additional data from the mobile computing device—in at least some embodiments, the determination of the room shape information from the additional data captured by the mobile computing device may include invoking the MIGM routine and providing the additional data as input along with instructions to determine a room shape for it and receiving the second estimated room shape as output of that routine (with FIGS. 5A-5B providing one example of such a routine), and further determining one or more locations and optionally orientations of the mobile computing device for the one or more further images that are acquired in the enclosing room.

After block 625, the routine continues to block 635, where it determines one or more estimates of the acquisition location and optionally acquisition orientation of the target image by performing one or more of the operations 641-649, such as relative to the determined location and optionally orientation of the mobile computing device for the one or more further images, and including in some embodiments and situations to use the input of one or more of the operations 641-649 as initial estimates that are provided as input to one or more other operations 641-649 that provide further updating of those initial estimates, as discussed in greater detail elsewhere herein. In addition, some or all the operations 641-649 may further include generating confidence level information in the estimated acquisition position information generated by that operation, such as for later use in block 660. In particular, in some embodiments and situations, the routine may perform the operations of block 641 (whether in addition to or instead of other operations 643-649) to analyze the visual data of the one or more further images to determine a position of the camera device in the visual data of those further images, such as by identifying one or more markers located on the camera device in that visual data and/or by performing object detection and identification of the camera device shape in that visual data, and uses the determined position information in the visual data to determine the acquisition position information for the camera device relative to that of the mobile computing device from the one or more further images. In addition, in some embodiments and situations, the routine may perform the operations of block 643 (whether in addition to or instead of other operations 641-649) to analyze movement data of the mobile computing device to and/or from the location at which the camera device acquires the target image, and to perform a determination of the camera device acquisition location relative to that of the mobile computing device from that movement data, such as using a pattern analysis of the movement data (e.g., by one or more trained neural networks). In addition, in some embodiments and situations, the routine may perform the operations of block 645 (whether in addition to or instead of other operations 641-649) to use first and second estimated room shape information from blocks 615 and 625 to determine offsets in matching features (e.g., structural wall elements) identified in those room shapes, and to use the offset information to determine the camera device's acquisition location and optionally acquisition orientation relative to that of the mobile computing device, such as by determining where acquisition position information associated with the first estimated room shape is located within the second estimated room shape. In addition, in some embodiments and situations, the routine may perform the operations of block 647 (whether in addition to or instead of other operations 641-649) to analyze the visual data of the target image and of one or more further images to identify matching features visible in the visual data of the target image and the further image(s), to determine offsets of those identified features in the visual data of the different images, and to use that determined offset information to determine the camera device's acquisition location and optionally acquisition orientation relative to that of the mobile computing device. In addition, in some embodiments and situations, the routine may perform the operations of block 649 (whether in addition to or instead of other operations 641-647) to analyze the visual data of the target image and of one or more other prior images acquired by the camera device in the same room (e.g. one or more other previously acquired target images for which acquisition position information has been previously determined) to identify matching features visible in the data of the target image and the other prior image(s), to determine offsets of those identified features in the visual data of the different images, and to use that determined offset information to determine the camera device's acquisition location and optionally acquisition orientation relative to that for the other prior image(s)—in addition, the routine may further optionally determine a common coordinate system for the visual data of the target image and of the one or more other prior images, such as to enable use of the combined visual data to generate or improve the estimated room shape for the enclosing room.

After performing one or more of the operations 641-649 (e.g., a single one of the operations in some embodiments and situations, and some or all of the operations in other embodiments and situations), the routine continues to block 660, where it either selects and uses the estimated acquisition position information for the target image from a single one of the operations 641-649 (e.g., if only one operation is performed, or if multiple operations are performed and a single one is selected for use, such as based on having the highest associated confidence level information or otherwise satisfying one or more defined criteria), or instead combines estimated acquisition position information for the target image from multiple of the operations 641-649 that are performed (e.g., for the operations 641-649 that are performed, some or all of those performed operations). The combining of estimated information from multiple operations may include, for example, using associated confidence level information for the multiple operations as part of the combining, such as to perform a weighted average, as part of a statistical analysis (e.g., to identify and exclude one or more outliers), etc. After block 660, the routine continues to block 665, where it further determines a final room shape to use for the enclosing room based on the first and/or second estimated room shapes from block 615 and 625.

After block 665 or 680, the routine continues to block 685, where the final determined acquisition position information (acquisition location and optionally acquisition orientation) of the target image from either block 680 or block 660 is added to the final room shape (e.g., added to the existing floor plan if one exists, associated with the final room shape for inclusion in a partial or full floor plan for the building if one is generated based at least in part on the target image, etc.). After block 685, the routine continues to block 688, where it stores the information determined and generated in blocks 615-685, and optionally displays some or all of the determined acquisition position information (e.g., the acquisition location) for the target image in its enclosing room (e.g., in the final room shape for the enclosing room, such as on the mobile computing device.

If it is instead determined in block 610 that the information or instructions received in block 605 are not to determine acquisition position information for a target image, the routine continues instead to block 690 to perform one or more other indicated operations as appropriate. Such other operations may include, for example, receiving and responding to requests for previously determined image acquisition position information and/or for associated target images (e.g., requests for such information for display on one or more client devices, requests for such information to provide it to one or more other devices for use in automated navigation, etc.), obtaining and storing information about buildings for use in later operations (e.g., information about floor plans and associated wall element positions for rooms in the floor plan, etc.), etc.

After blocks 688 or 690, the routine continues to block 695 to determine whether to continue, such as until an explicit indication to terminate is received, or instead only if an explicit indication to continue is received. If it is determined to continue, the routine returns to block 605 to wait for and receive additional instructions or information, and otherwise continues to block 699 and ends.

Figure 7:
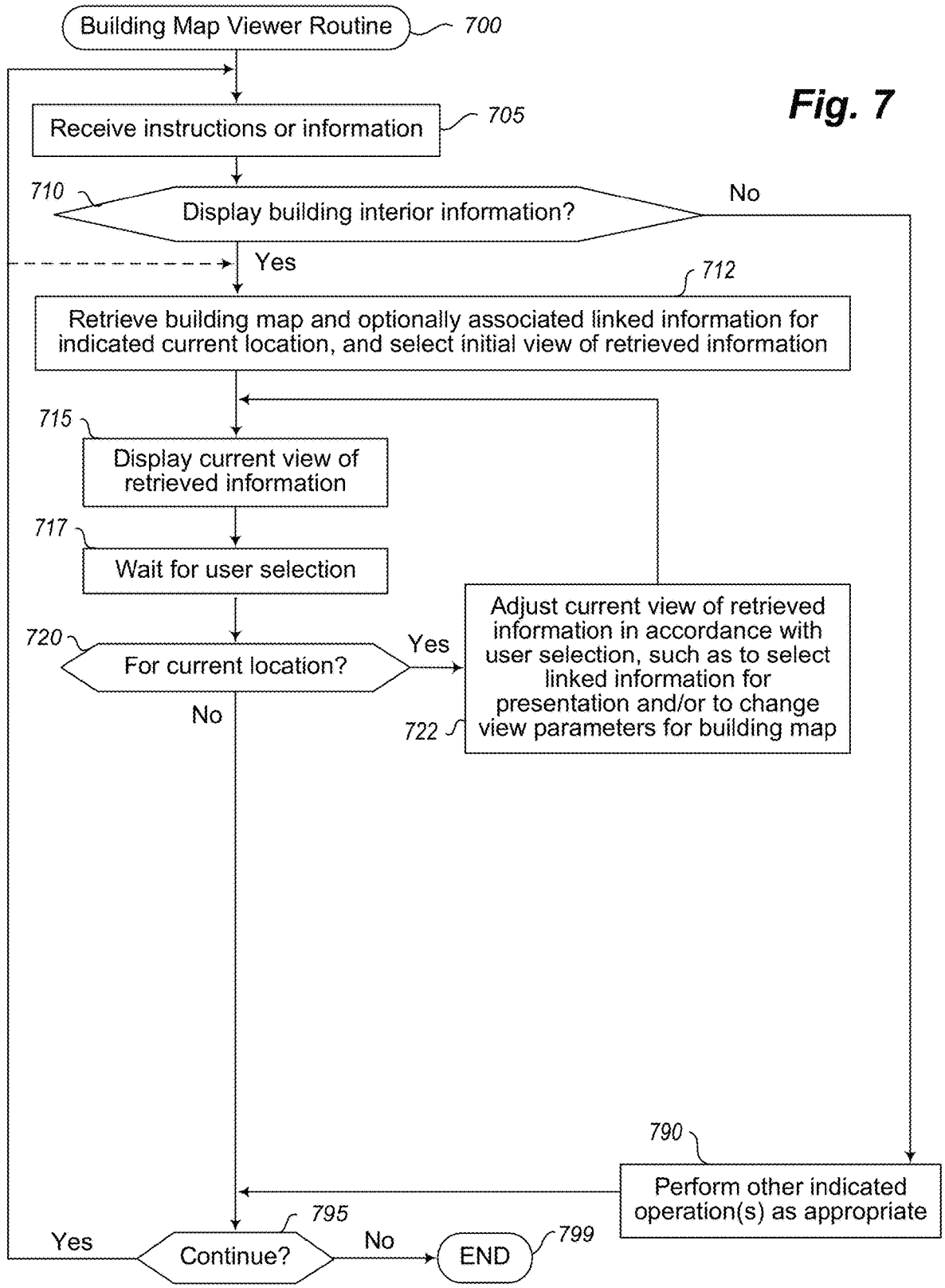
FIG. 7 illustrates an example flow diagram for a Building Map Viewer system routine in accordance with an embodiment of the present disclosure.

FIG. 7 illustrates an example embodiment of a flow diagram for a Building Map Viewer system routine 700. The routine may be performed by, for example, execution of a map viewer client computing device 175 and its software system(s) (not shown) of FIG. 1A, a client computing device 390 and/or mobile computing device 360 of FIG. 3, and/or a mapping information viewer or presentation system as described elsewhere herein, such as to receive and display mapping information (e.g., a 2D or 3D floor plan) for a defined area that includes visual indications of one or more determined image acquisition locations, as well as to optionally display additional information (e.g., images) associated with particular locations in the mapping information. In the example of FIG. 7, the presented mapping information is for the interior of a building (such as a house), but in other embodiments, other types of mapping information may be presented for other types of buildings or environments and used in other manners, as discussed elsewhere herein.

The illustrated embodiment of the routine begins at block 705, where instructions or information are received. At block 710, the routine determines whether the received instructions or information indicate to display or otherwise present information representing a building interior, and if not continues to block 790. Otherwise, the routine proceeds to block 712 to retrieve a floor plan and/or other generated mapping information for the building and optionally indications of associated linked information for the building interior and/or a surrounding location external to the building, and selects an initial view of the retrieved information (e.g., a view of the floor plan). In block 715, the routine then displays or otherwise presents the current view of the retrieved information, and waits in block 717 for a user selection. After a user selection in block 717, if it is determined in block 720 that the user selection corresponds to the current building area (e.g., to change the current view), the routine continues to block 722 to update the current view in accordance with the user selection, and then returns to block 715 to update the displayed or otherwise presented information accordingly. The user selection and corresponding updating of the current view may include, for example, displaying or otherwise presenting a piece of associated linked information that the user selects (e.g., a particular image associated with a displayed visual indication of a determined acquisition location), changing how the current view is displayed (e.g., zooming in or out; rotating information if appropriate; selecting a new portion of the floor plan to be displayed or otherwise presented, such as with some or all of the new portion not being previously visible, or instead with the new portion being a subset of the previously visible information; etc.).

If it is instead determined in block 710 that the instructions or other information received in block 705 are not to present information representing a building interior, the routine continues instead to block 790 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the ILDM system, etc.), to obtain and store other information about users of the system, to respond to requests for generated and stored information, etc.

Following block 790, or if it is determined in block 720 that the user selection does not correspond to the current building area, the routine proceeds to block 795 to determine whether to continue, such as until an explicit indication to terminate is received, or instead only if an explicit indication to continue is received. If it is determined to continue (including if the user made a selection in block 717 related to a new location to present), the routine returns to block 705 to await additional instructions or information (or to continue directly on to block 712 if the user made a selection in block 717 related to a new location to present), and if not proceeds to step 799 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
obtaining, by one or more computing devices, one or more panorama images having visual data captured by a camera device in one or more rooms of a building, and one or more additional images having additional visual data captured in the one or more rooms by a mobile computing device separate from the camera device;
determining, by the one or more computing devices and for each of the one or more rooms, a shape of that room by using a combination of the visual data of the one or more panorama images captured by the camera device and the additional visual data of the one or more additional images captured by the mobile computing device;
determining, by the one or more computing devices and for each of the one or more rooms,
a first location of the mobile computing device in that room at which at least one of the additional images was captured based at least in part on additional visual data of the at least one additional image, and
a second location of the camera device in that room at which at least one of the panorama images was captured, wherein the second location in that room of the camera device is determined relative to the first location in that room of the mobile computing device and based at least in part on some or all of the camera device being visible in the additional visual data of the at least one additional image captured in that room by the mobile computing device;
generating, by the one or more computing devices, mapping information for the one or more rooms that includes, for each of the one or more rooms, a position within the determined shape of that room of the at least one panorama image captured in that room, including using the second location of the camera device in that room as part of determining the position of the at least one panorama image captured in that room; and
displaying, by the one or more computing devices, the generated mapping information for the one or more rooms, including the determined shape of each of the one or more rooms with one or more overlaid visual indications to show the position of the at least one panorama image in each of the one or more rooms.

2. A non-transitory computer-readable medium having stored contents that cause one or more computing devices to perform automated operations including at least:
obtaining, by the one or more computing devices, one or more panorama images having visual data captured by a camera device in one or more rooms of a building, and one or more additional images having additional visual data captured in the one or more rooms by a mobile computing device separate from the camera device, wherein movements of the camera device and the mobile computing device are independent of each other;
determining, by the one or more computing devices and for each of the one or more rooms, a shape of that room by using at least one of the visual data of the one or more panorama images captured by the camera device or the additional visual data of the one or more additional images captured by the mobile computing device;
determining, by the one or more computing devices and for each of the one or more rooms,
a first location of the mobile computing device in that room at which at least one of the additional images was captured based at least in part on additional visual data of the at least one additional image, and
a second location of the camera device in that room at which at least one of the panorama images was captured, wherein the second location in that room of the camera device is determined relative to the first location in that room of the mobile computing device;
generating, by the one or more computing devices, mapping information for the one or more rooms that includes, for each of the one or more rooms, a position within the determined shape of that room of the at least one panorama image captured in that room, including using the second location of the camera device in that room as part of determining the position of the at least one panorama image captured in that room; and
providing, by the one or more computing devices, the generated mapping information for the one or more rooms, to enable display of the determined shape of each of the one or more rooms with one or more overlaid visual indications to show the position of the at least one panorama image in each of the one or more rooms.

3. The non-transitory computer-readable medium of claim 2 wherein the obtaining of the one or more panorama images involves obtaining multiple panorama images by the camera device that include at least one panorama image in each of two or more rooms of the building, wherein the obtaining of the one or more additional images involves obtaining multiple additional images by the mobile computing device that include at least one additional image in each of the two or more rooms, and wherein the generating of the mapping information includes generating, by the one or more computing devices, at least a partial floor plan for the building that includes determined shapes of the two or more rooms positioned relative to each other.

4. The non-transitory computer-readable medium of claim 3 wherein the mobile computing device is the one or more computing devices performing the automated operations, and wherein the stored contents include software instructions that, when executed by the mobile computing device, cause the mobile computing device to perform further automated operations including at least:
capturing, by the mobile computing device, movement data during travel between the two or more rooms; and
performing, by the mobile computing device, positioning of the determined shapes of the two or more rooms relative to each other based at least in part on the captured movement data,
and wherein the providing of the generated mapping information includes displaying, by the mobile computing device, the generated at least partial floor plan for the building to a user, to enable identification of additional areas of the building at which to acquire additional panorama images.

5. The non-transitory computer-readable medium of claim 2 wherein the generating of the mapping information includes generating at least a partial floor plan for the building having representations of at least two rooms of the building, wherein the providing of the generated mapping information includes displaying, by the one or more computing devices, the generated at least partial floor plan to a user, and wherein the automated operations further include, after the displaying of the generated at least partial floor plan:
   receiving, by the one or more computing devices, an indication from the user of an additional room of the building separate from the at least two rooms;
   obtaining, by the one or more computing devices, a further panorama image that is captured in the additional room by the camera device, and a further additional image that is captured in the additional room by the mobile computing device, and further motion data that is captured in the additional room from one or more inertial measurement unit (IMU) sensors of the mobile computing device;
   determining, by the one or more computing devices, a position of the further panorama image within a shape of the additional room that is determined based on a combination of visual data of the further panorama image and of additional visual data of the further additional image and of the further motion data that is captured in the additional room;
   updating, by the one or more computing devices, the at least partial floor plan to position the shape of the additional room relative to at least one of the positioned determined shapes of the at least two rooms; and
   displaying, by the one or more computing devices, the updated at least partial floor plan for the building.

6. The non-transitory computer-readable medium of claim 2 wherein the mobile computing device is the one or more computing devices, and wherein the determining of the shape of each of the one or more rooms further includes determining, by the mobile computing device, a three-dimensional (3D) shape of that room based on a combination of the visual data of the at least one panorama image captured in that room by the camera device and the additional visual data of the at least one additional image captured in that room by the mobile computing device.

7. The non-transitory computer-readable medium of claim 6 wherein the automated operations further include obtaining, by the mobile computing device, additional motion data captured in the one or more rooms by one or more inertial measurement units (IMUs) of the mobile computing device, and wherein the determining of the shape of each of the one or more rooms is further based in part on the additional motion data.

8. The non-transitory computer-readable medium of claim 2 wherein the stored contents include software instructions that, when executed by the one or more computing devices, cause the one or more computing devices to perform further automated operations including using at least one of operations (a)-(g) as follows:
   (a) determining, by the one or more computing devices, the second location in each of the one or more rooms of the camera device relative to the first location in that room of the mobile computing device, including analyzing the additional visual data of the at least one additional image that is captured by the mobile computing device in that room to identify the camera device in that additional visual data, and using a position of the identified camera device in that additional visual data as part of the determining of the second location in that room of the camera device; or
   (b) determining, by the one or more computing devices, the second location in each of the one or more rooms of the camera device relative to the first location in that room of the mobile computing device, including analyzing the additional visual data of the at least one additional image that is captured by the mobile computing device in that room to identify one or more markers located on the camera device in that additional visual data, and using one or more positions of the identified one or more markers in that additional visual data as part of the determining of the second location in that room of the camera device; or
   (c) determining, by the one or more computing devices, the second location in each of the one or more rooms of the camera device relative to the first location in that room of the mobile computing device, including analyzing the visual data of the at least one panorama image captured in that room by the camera device to generate a first estimated shape of that room, analyzing the additional visual data of the at least one additional image that is captured by the mobile computing device in that room to generate a second estimated shape of that room, and comparing the first and second estimated shapes to identify a position within the second estimated shape at which the visual data of the at least one panorama image in that room is captured; or
   (d) determining, by the one or more computing devices, the second location in each of the one or more rooms of the camera device relative to the first location in that room of the mobile computing device, including analyzing the visual data of the at least one panorama image captured in that room by the camera device to generate a first estimated shape of that room, analyzing further depth data that is captured by the mobile computing device in that room to generate a second estimated shape of that room, and comparing the first and second estimated shapes to identify a position within the second estimated shape at which the visual data of the at least one panorama image in that room is captured; or
   (e) determining, by the one or more computing devices, the second location in each of the one or more rooms of the camera device relative to the first location in that room of the mobile computing device, including analyzing the visual data of the at least one panorama image captured in that room by the camera device and the additional visual data of the at least one additional image that is captured by the mobile computing device in that room to identify features visible in both that visual data and that additional visual data, and using positions of the identified features as part of the determining of the second location in that room of the camera device; or
   (f) determining, by the one or more computing devices, the second location in each of the one or more rooms of the camera device relative to the first location in that room of the mobile computing device, including analyzing movement data by the mobile computing device in that room as the mobile computing device moves to and/or from a position at which the camera device captured the at least one panorama image in that room to identify that position, and using that identified position as part of the determining of the second location in that room of the camera device; or (g) determining, by the one or more computing devices, the second location in each of the one or more rooms of the camera device relative to the first location in that room of the mobile computing device, including analyzing visual data of two or more panorama images captured in that room to identify features visible in both the two or more panorama images, and using positions of the identified features to determine a common coordinate system for the two or more panorama images and as part of the determining of the second location in that room of the camera device.

9. The non-transitory computer-readable medium of claim 8 wherein the mobile computing device is the one or more computing devices, and wherein the using of the at least one operations (a)-(g) for each of the one or more rooms includes combining, by the one or more computing devices, information from multiple of the operations (a)-(g) for that room by using at least one of confidence information generated for the multiple analysis operations or a statistical analysis performed for the multiple analysis operations.

10. The non-transitory computer-readable medium of claim 8 wherein the determining, for each of the one or more rooms, of the second location in that room of the camera device relative to the first location in that room of the mobile computing device further includes determining an orientation in each of the one or more rooms of the camera device during capturing of each of the at least one panorama images in that room, wherein the generating of the mapping information is further based in part on the determined orientation for each of the one or more rooms and each of the at least one panorama images captured in that room, and wherein the using of the at least one operations (a)-(g) for each of the one or more rooms includes combining, by the one or more computing devices, information from all of the operations (a)-(g) for that room.

11. A non-transitory computer-readable medium having stored contents that cause one or more computing devices to perform automated operations including at least:

obtaining, by the one or more computing devices, one or more panorama images having visual data captured by a camera device in one or more rooms of a building, and one or more additional images having additional visual data captured in the one or more rooms by a mobile computing device separate from the camera device;

determining, by the one or more computing devices and for each of the one or more rooms, a shape of that room by using at least one of the visual data of the one or more panorama images captured by the camera device or the additional visual data of the one or more additional images captured by the mobile computing device;

determining, by the one or more computing devices and for each of the one or more rooms,
a first location of the mobile computing device in that room at which at least one of the additional images was captured based at least in part on additional visual data of the at least one additional image, and
a second location of the camera device in that room at which at least one of the panorama images was captured, wherein the second location in that room of the camera device is determined relative to the first location in that room of the mobile computing device;

generating, by the one or more computing devices, mapping information for the one or more rooms that includes, for each of the one or more rooms, a position within the determined shape of that room of the at least one panorama image captured in that room, including using the second location of the camera device in that room as part of determining the position of the at least one panorama image captured in that room; and providing, by the one or more computing devices, the generated mapping information for the one or more rooms, to enable display of the determined shape of each of the one or more rooms with one or more overlaid visual indications to show the position of the at least one panorama image in each of the one or more rooms, and wherein the automated operations further include at least one of:

performing, by the one or more computing devices and for each of the one or more rooms, the determining of the shape of that room based at least in part on motion data obtained in that room using one or more inertial measurement unit (IMU) sensors of the mobile computing device, including analyzing the motion data and the additional visual data of the at least one additional image captured in that room to estimate a three-dimensional (3D) shape of that room, analyzing the visual data of the at least one panorama image captured in that room to identify one or more structural wall elements of walls of that room, and generating one or more locations of the identified one or more structural wall elements of the walls of that room within the estimated 3D shape of that room, and using the generated one or more locations for that room as part of the generating of the mapping information; or performing, by the one or more computing devices, the generating of the mapping information based at least in part on multiple panorama images captured by the camera device at multiple acquisition locations in multiple rooms of the building, including generating positions of the multiple panorama images relative to each other by determining directions between pairs of the multiple panorama images based on at least one of analyzing visual data of the multiple panorama images or analyzing movement data from the one or more IMU sensors as the mobile computing device moves between acquisition locations of the multiple panorama images; or performing, for each of the one or more rooms, the determining of the shape of that room based at least in part on a combination of operations by the mobile computing device and by at least one additional computing device separate from the mobile computing device, including generating an initial estimated shape of that room by the mobile computing device based on at least one of the visual data of the one or more panorama images captured by the camera device or the additional visual data of the one or more additional images captured by the mobile computing device, and including using, by the at least one additional computing device, the initial estimated shape of that room based at least in part on performing further analysis of additional data to improve the initial estimated shape of that room.

12. A system comprising:
one or more hardware processors of one or more computing devices; and
one or more memories with stored instructions that, when executed by at least one of the one or more hardware processors, cause the one or more computing devices to perform automated operations including at least:
obtaining multiple images having visual data captured by a camera device in two or more rooms of a building, and multiple additional images having additional visual data that is captured in the two or more rooms by a mobile computing device separate from the camera device;
determining, based at least in part on analyzing the visual data of the multiple images and the additional visual data of the multiple additional images,
a shape of each of the two or more rooms using at least one of the visual data of the multiple images captured by the camera device or the additional visual data of the multiple additional images captured by the mobile computing device; and
for each of the two or more rooms,
a first location of the mobile computing device in that room during capturing of one or more of the additional images in that room based at least in part on the additional visual data of the one or more additional images, and
a second location of the camera device in that room during capturing of at least one of the multiple images in that room, wherein the second location in that room is determined relative to the first location in that room;
generating mapping information that includes the determined shape of each of the two or more rooms positioned relative to each other and that further includes, for each of the two or more rooms, a position within the determined shape of that room of the at least one image captured in that room, including using the second location of the camera device in that room as part of determining the position of the at least one image for that room; and
providing the generated mapping information for the one or more rooms, to enable display of the generated mapping information.

13. The system of claim 12 wherein the obtaining of the multiple images involves obtaining multiple panorama images by the camera device that include at least one panorama image in each of the two or more rooms of the building, wherein the obtaining of the multiple additional images by the mobile computing device involves obtaining at least one additional image in each of the two or more rooms, and wherein the generating of the mapping information includes generating at least a partial floor plan for the building that includes the determined shapes of the two or more rooms positioned relative to each other.

14. The system of claim 13 wherein the mobile computing device is the one or more computing devices performing the automated operations, and wherein the stored instructions include software instructions that, when executed by the mobile computing device, cause the mobile computing device to perform further automated operations including at least:
capturing movement data during travel between the two or more rooms; and
performing positioning of the determined shapes of the two or more rooms relative to each other based at least in part on the captured movement data,
and wherein the providing of the generated mapping information includes displaying the generated at least partial floor plan for the building to a user, to enable identification of additional areas of the building at which to acquire additional panorama images.

15. The system of claim 12 wherein the mobile computing device is the one or more computing devices, and wherein the determining of the shape of each of the two or more rooms further includes determining a three-dimensional (3D) shape of that room based on a combination of the visual data of the at least one image captured in that room by the camera device and the additional visual data of the at least one additional image captured in that room by the mobile computing device.

16. The system of claim 15 wherein the automated operations further include obtaining additional motion data captured in the two or more rooms by one or more inertial measurement units (IMUs) of the mobile computing device, and wherein the determining of the shape of each of the two or more rooms is further based in part on the additional motion data.

17. The system of claim 12 wherein the stored instructions include software instructions that, when executed by the one or more computing devices, cause the one or more computing devices to perform further automated operations including using at least one of operations (a)-(g) as follows:
(a) determining the second location in each of the two or more rooms of the camera device relative to the first location in that room of the mobile computing device, including analyzing the additional visual data of the at least one additional image that is captured by the mobile computing device in that room to identify the camera device in that additional visual data, and using a position of the identified camera device in that additional visual data as part of the determining of the second location in that room of the camera device; or
(b) determining the second location in each of the two or more rooms of the camera device relative to the first location in that room of the mobile computing device, including analyzing the additional visual data of the at least one additional image that is captured by the mobile computing device in that room to identify one or more markers located on the camera device in that additional visual data, and using one or more positions of the identified one or more markers in that additional visual data as part of the determining of the second location in that room of the camera device; or
(c) determining the second location in each of the two or more rooms of the camera device relative to the first location in that room of the mobile computing device, including analyzing the visual data of the at least one image captured in that room by the camera device to generate a first estimated shape of that room, analyzing the additional visual data of the at least one additional image that is captured by the mobile computing device in that room to generate a second estimated shape of that room, and comparing the first and second estimated shapes to identify a position within the second estimated shape at which the visual data of the at least one image in that room is captured; or
(d) determining the second location in each of the two or more rooms of the camera device relative to the first location in that room of the mobile computing device, including analyzing the visual data of the at least one image captured in that room by the camera device to generate a first estimated shape of that room, analyzing further depth data that is captured by the mobile computing device in that room to generate a second estimated shape of that room, and comparing the first and second estimated shapes to identify a position within the second estimated shape at which the visual data of the at least one image in that room is captured; or (e) determining the second location in each of the two or more rooms of the camera device relative to the first location in that room of the mobile computing device, including analyzing the visual data of the at least one image captured in that room by the camera device and the additional visual data of the at least one additional image that is captured by the mobile computing device in that room to identify features visible in both that visual data and that additional visual data, and using positions of the identified features as part of the determining of the second location in that room of the camera device; or (f) determining the second location in each of the two or more rooms of the camera device relative to the first location in that room of the mobile computing device, including analyzing movement data by the mobile computing device in that room as the mobile computing device moves to and/or from a position at which the camera device captured the at least one image in that room to identify that position, and using that identified position as part of the determining of the second location in that room of the camera device; or (g) determining the second location in each of the two or more rooms of the camera device relative to the first location in that room of the mobile computing device, including analyzing visual data of two or more images captured in that room to identify features visible in both the two or more images, and using positions of the identified features to determine a common coordinate system for the two or more images and as part of the determining of the second location in that room of the camera device.

18. The system of claim 17 wherein the mobile computing device is the one or more computing devices, and wherein the using of the at least one operations (a)-(g) for each of the two or more rooms includes combining information from multiple of the operations (a)-(g) for that room by using at least one of confidence information generated for the multiple analysis operations or a statistical analysis performed for the multiple analysis operations.

19. The system of claim 17 wherein the determining, for each of the two or more rooms, of the second location in that room of the camera device relative to the first location in that room of the mobile computing device further includes determining an orientation in each of the two or more rooms of the camera device during capturing of each of the at least one images in that room, wherein the generating of the mapping information is further based in part on the determined orientation for each of the two or more rooms and each of the at least one images captured in that room, and wherein the using of the at least one operations (a)-(g) for each of the two or more rooms includes combining, by the one or more computing devices, information from all of the operations (a)-(g) for that room.

20. A system comprising:
one or more hardware processors of one or more computing devices; and
one or more memories with stored instructions that, when executed by at least one of the one or more hardware processors, cause the one or more computing devices to perform automated operations including at least:

obtaining multiple images having visual data captured by a camera device in two or more rooms of a building, and multiple additional images having additional visual data that is captured in the two or more rooms by a mobile computing device separate from the camera device;

determining a shape of each of the two or more rooms using at least one of the visual data of the multiple images captured by the camera device or the additional visual data of the multiple additional images captured by the mobile computing device;

determining, for each of the two or more rooms,
a first location of the mobile computing device in that room during capturing of one or more of the additional images in that room based at least in part on the additional visual data of the one or more additional images, and
a second location of the camera device in that room during capturing of at least one of the multiple images in that room, wherein the second location in that room is determined relative to the first location in that room;

generating mapping information that includes the determined shape of each of the two or more rooms positioned relative to each other and that further includes, for each of the two or more rooms, a position within the determined shape of that room of the at least one image captured in that room, including using the second location of the camera device in that room as part of determining the position of the at least one image for that room, wherein the generating of the mapping information includes generating at least a partial floor plan for the building having representations of the two or more rooms of the building;

providing the generated mapping information for the one or more rooms, to enable display of the generated mapping information, wherein the providing of the generated mapping information includes displaying the generated at least partial floor plan to a user; and after the displaying of the generated at least partial floor plan:
receiving an indication from the user of an additional room of the building separate from the two or more rooms;
obtaining a further image that is captured in the additional room by the camera device, and a further additional image that is captured in the additional room by the mobile computing device, and further motion data that is captured in the additional room from one or more inertial measurement unit (IMU) sensors of the mobile computing device;
determining a position of the further image within a shape of the additional room that is determined based on a combination of visual data of the further image and of additional visual data of the further additional image and of the further motion data that is captured in the additional room;
updating the at least partial floor plan to position the shape of the additional room relative to a determined room shape of at least one of the two or more rooms; and
displaying the updated at least partial floor plan for the building.

* * * * *